(12) United States Patent
Cohen et al.

(10) Patent No.: US 8,111,622 B2
(45) Date of Patent: Feb. 7, 2012

(54) SIGNAL ROUTING DEPENDENT ON A NODE SPEED CHANGE PREDICTION

(75) Inventors: Alexander J. Cohen, Mill Valley, CA (US); Edward K. Y. Jung, Bellevue, WA (US); Robert W. Lord, Seattle, WA (US); John D. Rinaldo, Jr., Bellevue, WA (US); Clarence T. Tegreene, Bellevue, WA (US); Royce A. Levien, Lexington, MA (US); Mark A. Malamud, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1124 days.

(21) Appl. No.: 11/252,258

(22) Filed: Oct. 17, 2005

(65) Prior Publication Data

US 2007/0086427 A1    Apr. 19, 2007

Related U.S. Application Data

(63) Continuation-in-part of application No. 11/252,206, filed on Oct. 17, 2005, and a continuation-in-part of application No. 11/252,205, filed on Oct. 17, 2005.

(51) Int. Cl.
*H04L 12/26* (2006.01)
(52) U.S. Cl. .................. 370/236; 370/252; 370/338
(58) Field of Classification Search .................. None
See application file for complete search history.

(56) References Cited

U.S. PATENT DOCUMENTS

| | | | |
|---|---|---|---|
| 4,742,516 A | 5/1988 | Yamaguchi | |
| 5,583,869 A | 12/1996 | Grube et al. | |
| 5,870,391 A | 2/1999 | Nago | |
| 6,049,549 A | 4/2000 | Ganz et al. | |
| 6,128,327 A | 10/2000 | Bird et al. | |
| 6,198,765 B1 | 3/2001 | Cahn et al. | |
| 6,272,117 B1 | 8/2001 | Choi et al. | |
| 6,429,771 B1 | 8/2002 | Dorenbosch et al. | |
| 6,504,833 B1 | 1/2003 | Ishii et al. | |
| 6,535,498 B1 | 3/2003 | Larsson et al. | |
| 6,728,215 B1 | 4/2004 | Alperovich et al. | |
| 6,771,633 B1 | 8/2004 | Mizoguchi | |
| 6,775,707 B1 | 8/2004 | Bennett et al. | |
| 6,810,257 B1 | 10/2004 | Amin | |
| 6,870,487 B2 | 3/2005 | Nuesser et al. | |
| 6,885,637 B1 | 4/2005 | Shvodian | |
| 6,885,877 B1 | 4/2005 | Ozaki et al. | |
| 6,957,077 B2 | 10/2005 | Dehlin | |
| 6,980,524 B1* | 12/2005 | Lu et al. ..................... 370/254 |

(Continued)

FOREIGN PATENT DOCUMENTS

DE        19733586 C1      2/1999

(Continued)

OTHER PUBLICATIONS

U.S. Appl. No. 11/262,304, Cohen et al.

(Continued)

*Primary Examiner* — Nittaya Juntima
*Assistant Examiner* — Tito Pham

(57) ABSTRACT

A device, method, computer program product, and network subsystem are described for determining a node-speed-change-prediction-dependent signal route and routing wireless data along the determined node-speed-change-prediction-dependent signal route.

34 Claims, 42 Drawing Sheets

U.S. PATENT DOCUMENTS

| | | |
|---|---|---|
| 7,024,782 B1 | 4/2006 | Bork |
| 7,062,279 B2 | 6/2006 | Cedervall et al. |
| 7,072,977 B1 | 7/2006 | Bernard et al. |
| 7,149,537 B1 | 12/2006 | Kupsh et al. |
| 7,346,015 B2 | 3/2008 | Shipman |
| 7,617,042 B2 | 11/2009 | Horvitz et al. |
| 2001/0022558 A1 | 9/2001 | Karr, Jr. et al. |
| 2002/0044549 A1 | 4/2002 | Johansson et al. |
| 2002/0061744 A1 | 5/2002 | Hamalainen et al. |
| 2002/0075941 A1 | 6/2002 | Souissi et al. |
| 2002/0077151 A1 | 6/2002 | Matthews et al. |
| 2002/0122410 A1 | 9/2002 | Kulikov et al. |
| 2002/0198005 A1 | 12/2002 | Hilton et al. |
| 2003/0007473 A1 | 1/2003 | Strong et al. |
| 2003/0033394 A1 | 2/2003 | Stine |
| 2003/0053424 A1 | 3/2003 | Krishnamurthy et al. |
| 2003/0072306 A1 | 4/2003 | Hunzinger |
| 2003/0100317 A1 | 5/2003 | Kaplan et al. |
| 2003/0125067 A1 | 7/2003 | Takeda et al. |
| 2003/0146871 A1 | 8/2003 | Karr et al. |
| 2003/0156058 A1 | 8/2003 | Edwards et al. |
| 2003/0199275 A1 | 10/2003 | Sakoda et al. |
| 2003/0202468 A1* | 10/2003 | Cain et al. ............... 370/229 |
| 2003/0202476 A1 | 10/2003 | Billhartz et al. |
| 2003/0224840 A1 | 12/2003 | Frank et al. |
| 2003/0229900 A1 | 12/2003 | Reisman |
| 2004/0009794 A1 | 1/2004 | Proctor, Jr. et al. |
| 2004/0058678 A1 | 3/2004 | deTorbal |
| 2004/0093426 A1 | 5/2004 | Sahasrabudhe et al. |
| 2004/0124977 A1 | 7/2004 | Biffar |
| 2004/0125776 A1* | 7/2004 | Haugli et al. ............ 370/338 |
| 2004/0147223 A1* | 7/2004 | Cho ........................ 455/41.2 |
| 2004/0156355 A1 | 8/2004 | Stumpert |
| 2004/0157549 A1 | 8/2004 | Dold et al. |
| 2004/0160943 A1 | 8/2004 | Cain |
| 2004/0190447 A1 | 9/2004 | Dacosta |
| 2004/0192353 A1 | 9/2004 | Mason et al. |
| 2004/0196834 A1 | 10/2004 | Ofek et al. |
| 2004/0203380 A1 | 10/2004 | Hamdi et al. |
| 2004/0203435 A1* | 10/2004 | Karlquist et al. ......... 455/67.11 |
| 2004/0203718 A1 | 10/2004 | Knauerhase et al. |
| 2004/0203779 A1 | 10/2004 | Gabara |
| 2004/0203820 A1* | 10/2004 | Billhartz ................. 455/452.1 |
| 2004/0203855 A1 | 10/2004 | Veerasamy et al. |
| 2004/0213181 A1 | 10/2004 | Grech et al. |
| 2004/0213231 A1 | 10/2004 | Cho et al. |
| 2004/0215373 A1* | 10/2004 | Won et al. ................. 701/1 |
| 2004/0218605 A1 | 11/2004 | Gustafsson et al. |
| 2004/0219909 A1* | 11/2004 | Kennedy et al. .......... 455/422.1 |
| 2004/0233840 A1 | 11/2004 | Bye |
| 2004/0233855 A1 | 11/2004 | Gutierrez et al. |
| 2004/0246144 A1* | 12/2004 | Siegel et al. .............. 340/902 |
| 2004/0266457 A1 | 12/2004 | Dupray |
| 2005/0014464 A1 | 1/2005 | Larsson |
| 2005/0030921 A1 | 2/2005 | Yau |
| 2005/0050219 A1 | 3/2005 | Choi et al. |
| 2005/0054346 A1 | 3/2005 | Windham et al. |
| 2005/0075119 A1* | 4/2005 | Sheha et al. ............... 455/456.6 |
| 2005/0090201 A1 | 4/2005 | Lengies et al. |
| 2005/0128995 A1 | 6/2005 | Ott et al. |
| 2005/0143005 A1 | 6/2005 | Moore, III |
| 2005/0169238 A1* | 8/2005 | Yang et al. ................. 370/351 |
| 2005/0190717 A1* | 9/2005 | Shu et al. ................... 370/328 |
| 2005/0192056 A1 | 9/2005 | Karaki |
| 2005/0215234 A1 | 9/2005 | Fukuzawa et al. |
| 2006/0057974 A1 | 3/2006 | Ziarno et al. |
| 2006/0089157 A1 | 4/2006 | Casey et al. |
| 2006/0126524 A1* | 6/2006 | Tateson ..................... 370/252 |
| 2006/0187847 A1 | 8/2006 | Pelton et al. |
| 2006/0252428 A1 | 11/2006 | Agashe et al. |
| 2007/0030832 A1 | 2/2007 | Gonia et al. |
| 2007/0054617 A1* | 3/2007 | Nikolajevic et al. ......... 455/41.2 |
| 2007/0087758 A1 | 4/2007 | Norris et al. |
| 2007/0274268 A1 | 11/2007 | Axelsson et al. |

FOREIGN PATENT DOCUMENTS

| | | |
|---|---|---|
| DE | 19849294 A1 | 4/2000 |
| WO | WO 99/46899 | 9/1999 |

OTHER PUBLICATIONS

U.S. Appl. No. 11/396,367, Cohen et al.
U.S. Appl. No. 11/252,206, Cohen et al.
U.S. Appl. No. 11/252,205, Cohen et al.
Aloi, Daniel N.; Dessert, Patrick E.; Willer, Mike; Fay, Luke; Ronning, Matt; "GPS Car Talk"; GPS World; bearing a date of Sep. 1, 2003; pp. 1-7; with additional figures and tables pp. 1-4; located at: http://www.gpsworld.com/gpsworld/article/articleDetail.jsp?id=68463; printed on Sep. 1, 2005.
Ko, Young-Bae; Vaidya, Nitin H.; "Location-Aided Routing (LAR) in mobile ad hoc networks"; Wireless Networks; 2000; vol. 6; pp. 307-321; J.C. Baltzer AG, Science Publishers.
U.S. Appl. No. 12/592,158, Cohen et al.

* cited by examiner

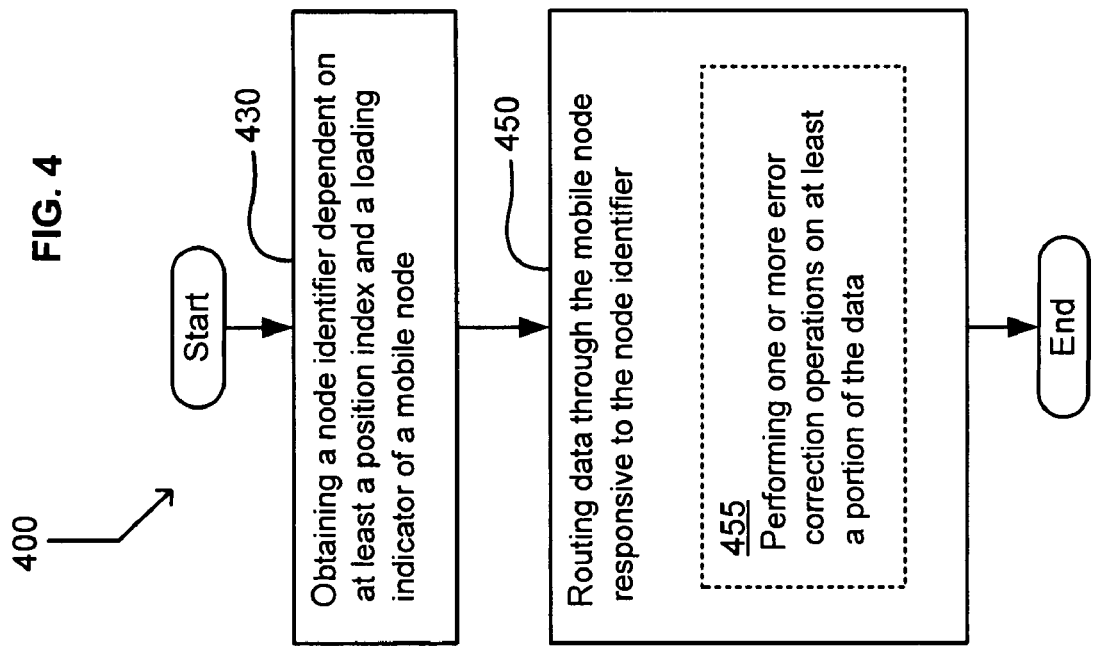
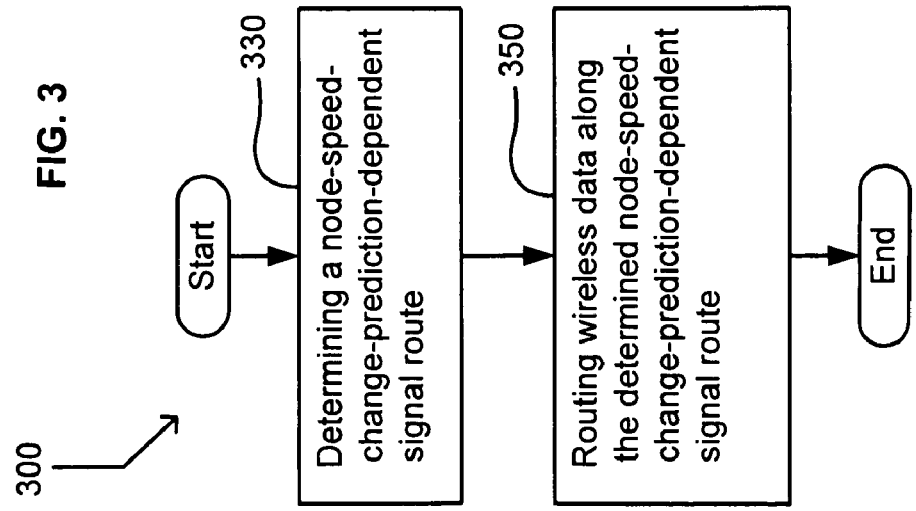

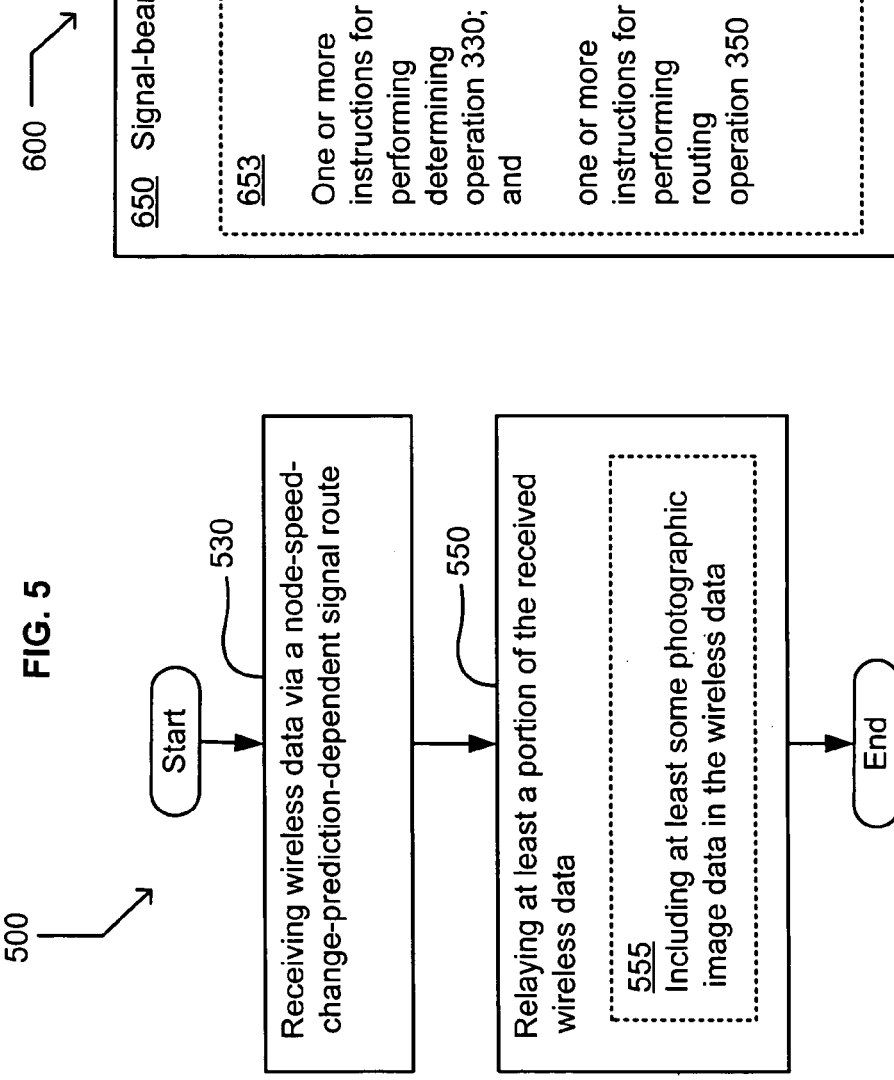

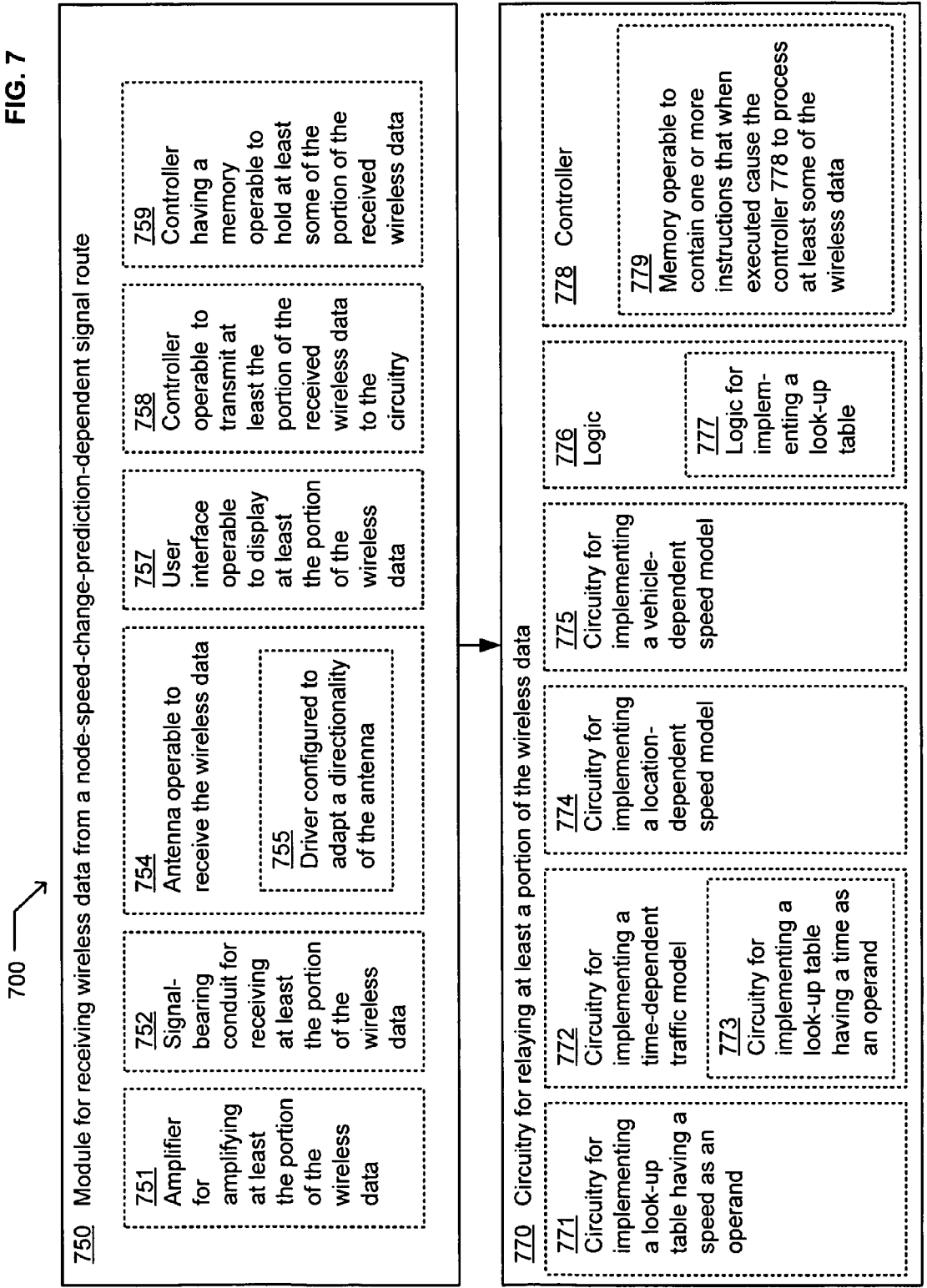

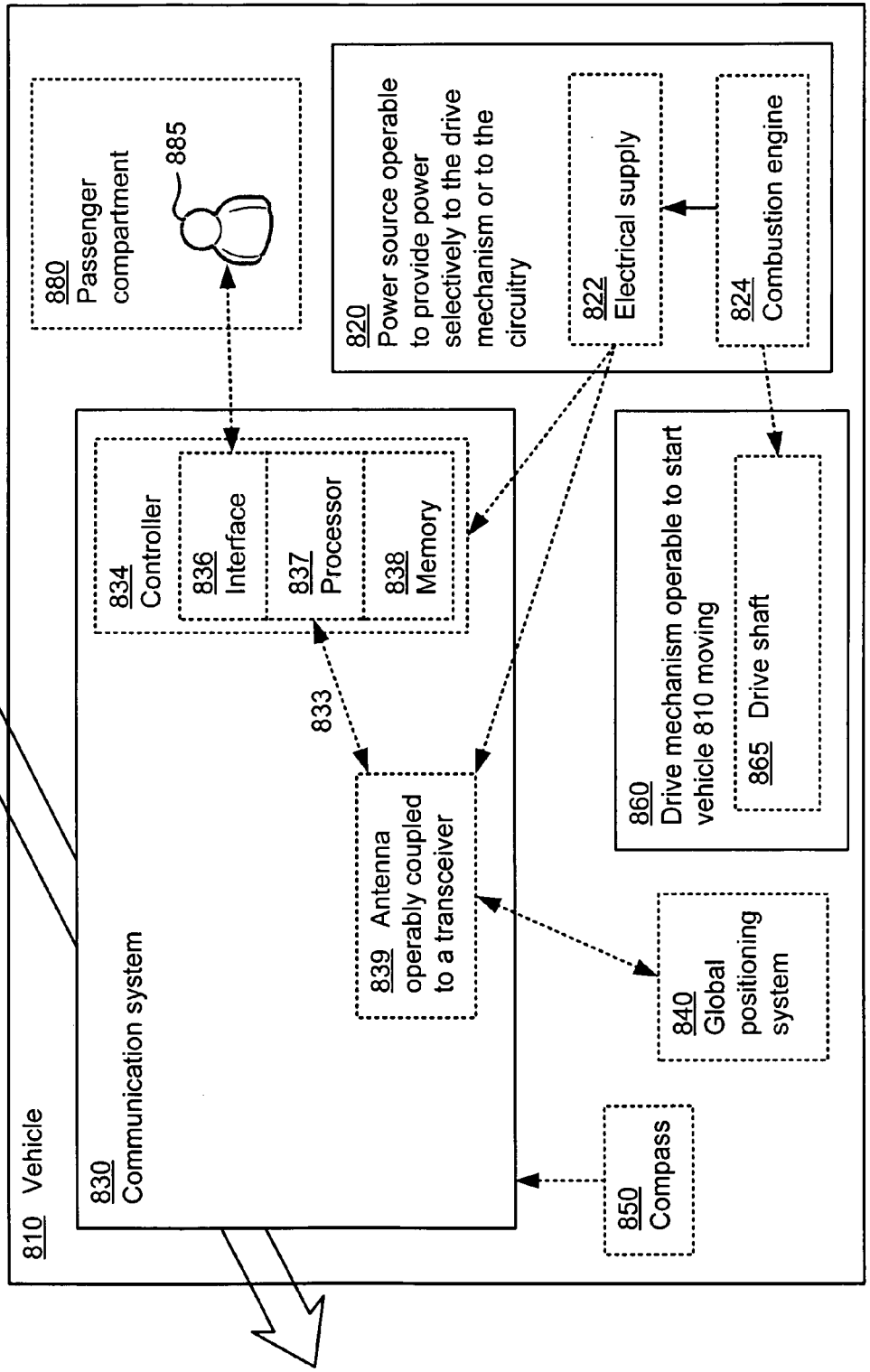

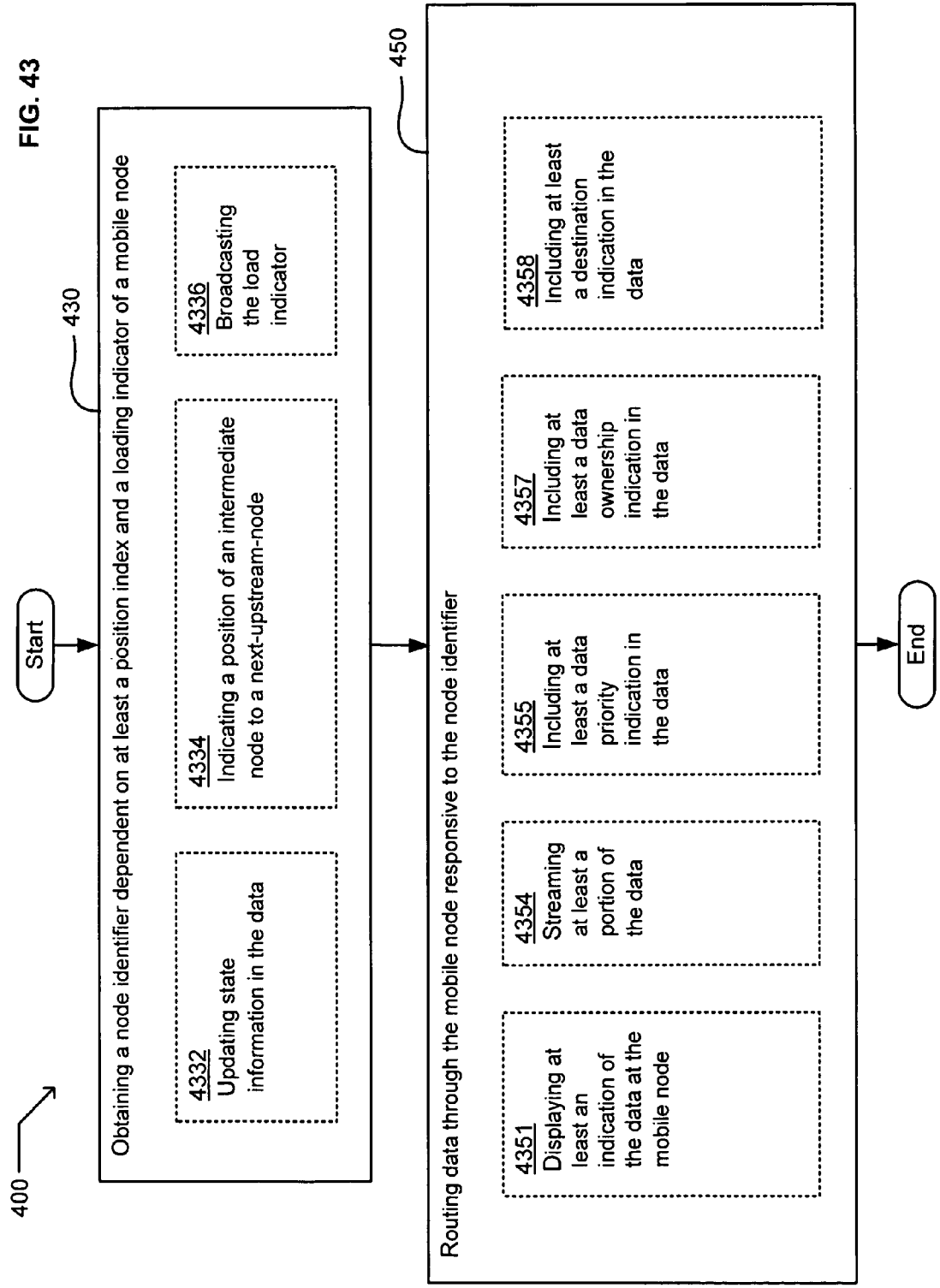

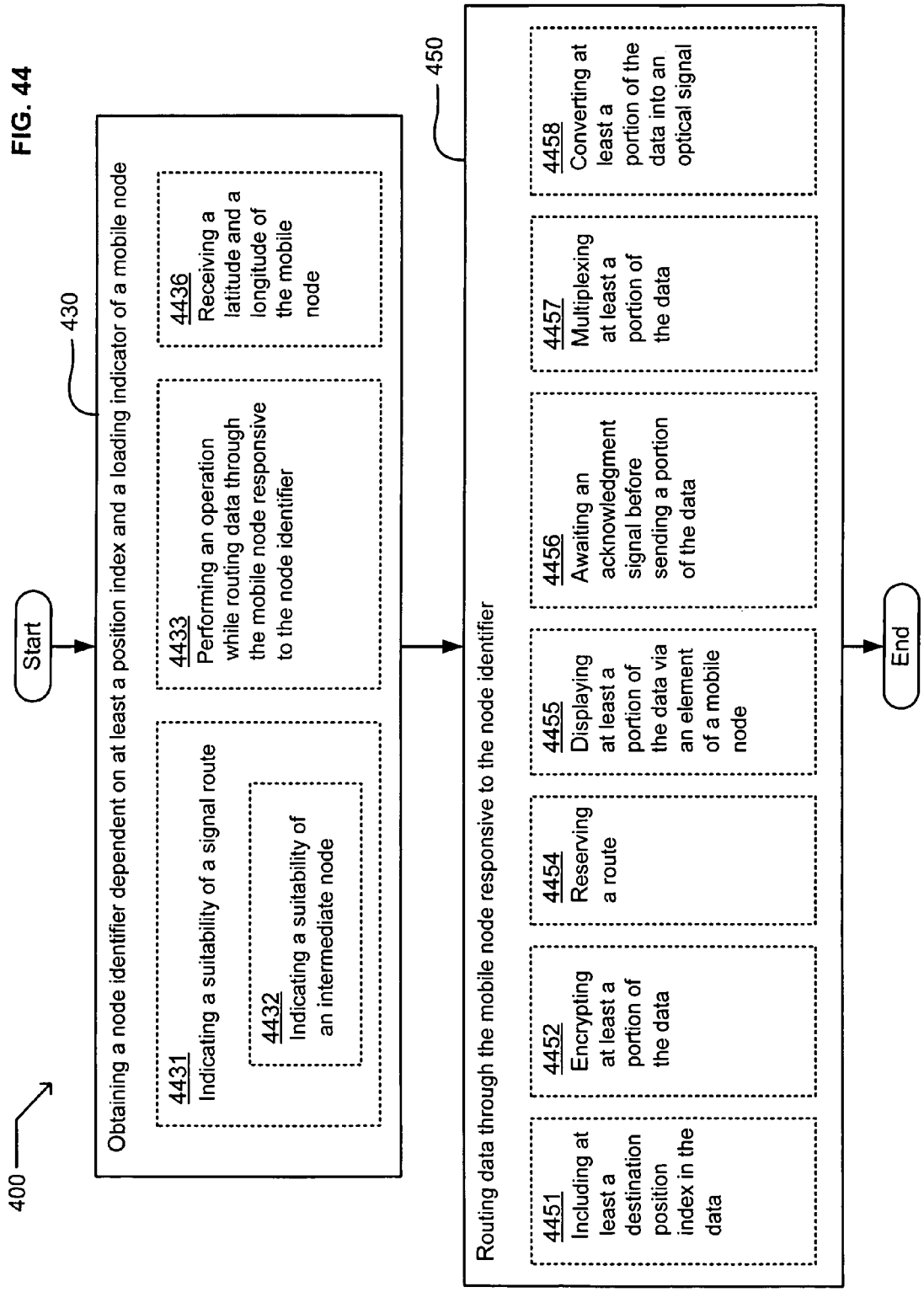

SIGNAL ROUTING DEPENDENT ON A NODE SPEED CHANGE PREDICTION

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. Stephen G. Kunin, *Benefit of Prior-Filed Application*, USPTO Electronic Official Gazette, Mar. 18, 2003 found at the USPTO official website, Official Gazette printing which is found by adding to the official, governmental and non-commercial website the following text: /web/offices/com/sol/og/2003/week11/patbene.htm. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

RELATED APPLICATIONS

1. For purposes of the USPTO extra-statutory requirements, the present application constitutes a continuation-in-part of United States patent application entitled SIGNAL ROUTING DEPENDENT ON A LOADING INDICATOR OF A MOBILE NODE, naming Alexander J. Cohen; Edward K.Y. Jung; Robert W. Lord; John D. Rinaldo, Jr.; and Clarence T. Tegreene as inventors, USAN: To Be Assigned, filed contemporaneously herewith application Ser. No. 11/252,206 filed Oct. 17, 2005.

2. For purposes of the USPTO extra-statutory requirements, the present application constitutes a continuation-in-part of United States patent application entitled USING A SIGNAL ROUTE DEPENDENT ON A NODE SPEED CHANGE PREDICTION, naming Alexander J. Cohen; Edward K.Y. Jung; Robert W. Lord; John D. Rinaldo, Jr.; and Clarence T. Tegreene as inventors, USAN: To Be Assigned, filed contemporaneously herewith application Ser. No. 11/252,205 filed Oct. 17, 2005, now U.S. Pat. No. 7,646,712.

SUMMARY

An embodiment provides a communication method. In one implementation, the method includes but is not limited to determining a node-speed-change-prediction-dependent signal route and routing wireless data along the determined node-speed-change-prediction-dependent signal route. In addition to the foregoing, other communication method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a computer program product. In one implementation, the computer program product includes but is not limited to a signal-bearing medium bearing at least one of one or more instructions for determining a node-speed-change-prediction-dependent signal route; and one or more instructions for routing wireless data along the determined node-speed-change-prediction-dependent signal route. In addition to the foregoing, other computer program product aspects are described in the claims, drawings, and text forming a part of the present disclosure.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE FIGURES

FIG. 3 shows an operational flow having operations that facilitate a desirable form of data transfer.

FIG. 4 shows other flow embodiments that have operations that facilitate another desirable form of data transfer.

FIG. 5 shows other flow embodiments that have operations that facilitate another desirable form of data transfer.

FIG. 6 shows a device such as a computer program product including a signal bearing medium such as a conduit, a memory element, or a display medium.

FIG. 7 shows a network subsystem embodiment in schematic form.

FIG. 8 shows another network subsystem embodiment that includes a vehicle.

FIG. 43 shows several optional features each defining variants of the flows of FIG. 4 or their variants of FIG. 42.

FIG. 44 shows several other optional features each defining variants of the flows of FIG. 4 or their variants.

The use of the same symbols in different drawings typically indicates similar or identical items.

DETAILED DESCRIPTION

Figure 1:
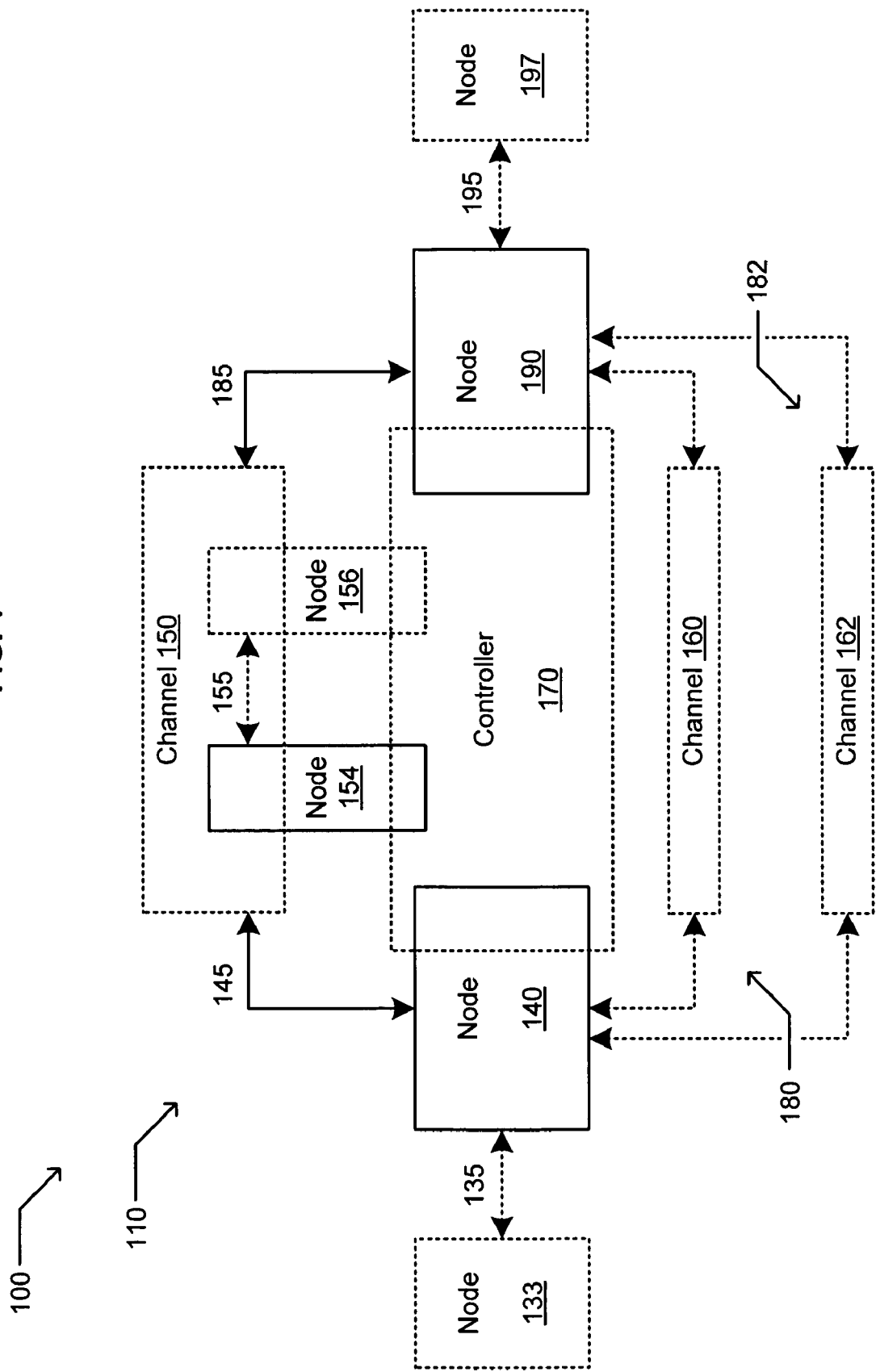
FIG. 1 shows a schematic diagram of a network in which a subsystem is an embodiment.

FIG. 1 shows a schematic diagram of a network 100 having a subsystem 110 with data routed via route 180 between node 140 and node 190, which are physically remote from one another (separated by about 10 meters or more, e.g.). Route 180 can include channel 150 or one or more parallel channels 160. Channel 150 can be arranged in series with an upstream wireless link 145 and a downstream wireless link 185. Channel 150 includes node 154 through which channel 150 passes. Channel 150 may also include one or more in-channel links 155 and one or more additional channel nodes 156. Subsystem 110 optionally includes channel controller 170 that can include circuitry of node 140, node 190, or the in-channel node(s) 154, 156 as shown. Channel controller 170 can also be composed partially or entirely outside of all intermediate nodes available for routing the data As described below, route 180 can also include a linkage 135 to one or more source nodes 133 further upstream, optionally outside network 100. Route 180 can likewise include a linkage 195 to one or more destination nodes 197, optionally outside network 100. Alternatively or additionally, node 140 can communicate with node 190 by one or more other routes 182 such as by channel 162.

Figure 2:
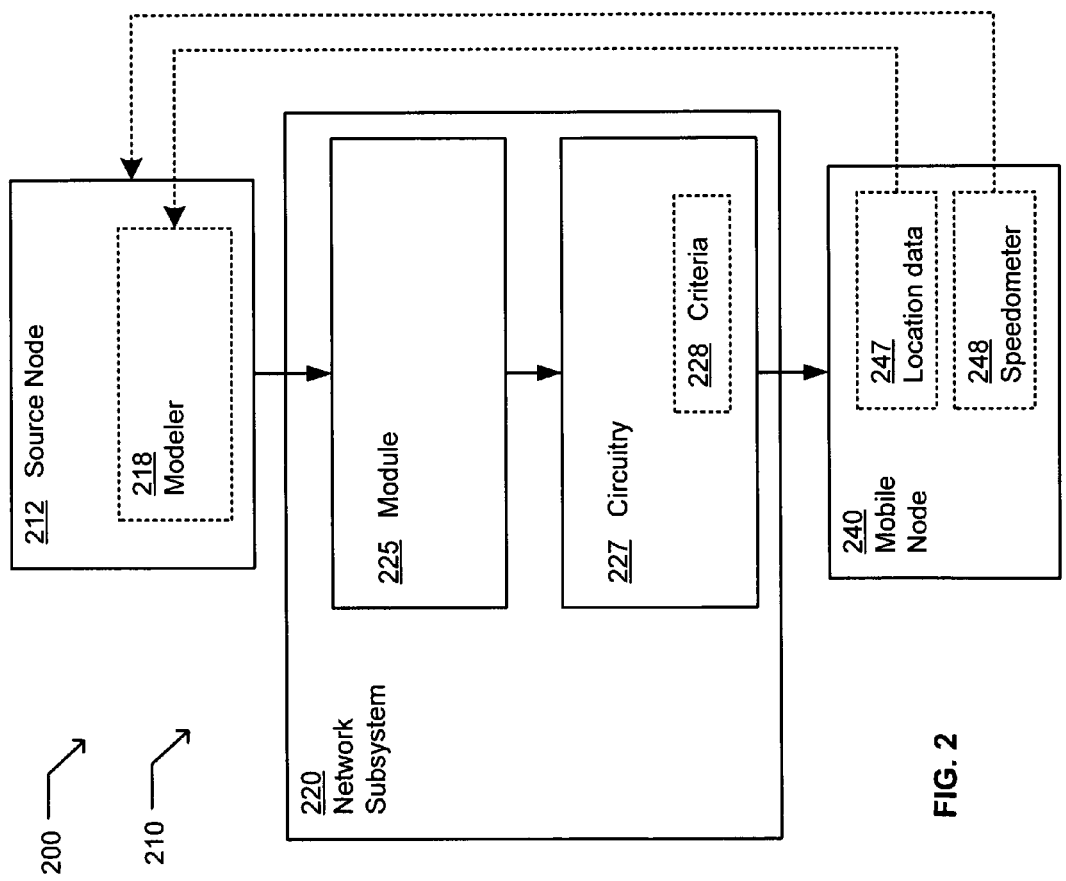
FIG. 2 shows a network in a schematic form including a network subsystem that can interact with or become part of a signal route from a source node to a mobile node.

Referring now to FIG. 2, there is shown a network 200 in a schematic form, including a network subsystem 220 that can interact with or become part of a signal route 210 from source node 212 to a mobile node 240. Source node 212 is optionally configured to receive data from speedometer 248 of mobile node 240, and can also include a modeler 218 that can receive location data 247 from mobile node 240. Network subsystem 220 includes a module 225 configured to receive data directly or indirectly from source node 212 and to provide information to circuitry 227. Circuitry 227 can optionally apply one or more criteria 228 to the data in determining how, when, or where to transmit the data, as explained below.

Referring now to FIG. 3, there is shown an operational flow 300 having operations that facilitate a desirable form of data transfer. After a start operation, flow 300 moves to a determining operation 330 of determining a node-speed-change-prediction-dependent signal route and to a routing operation 350 of routing wireless data along the determined node-speed-change-prediction-dependent signal route. A "prediction" or predictive value may include a function of time, a quantity, an identifier, a single Boolean value, a prose description, a probabilistic model of future or other uncertain attributes or behaviors, or some other characterization of a prediction. As described below, operation 330 and operation 350 can be performed by source node 212 or by network subsystem 220 of FIG. 2. After completing routing operation 350, flow 300 moves to an end operation. More generally, flows described herein need not occur in the prescribed order, and in some cases may warrant some interspersion or other overlap.

Referring now to FIG. 4, there are shown alternative operational flows 400 having operations that facilitate another desirable form of data transfer. After a start operation, flows 400 move to an obtaining operation 430 of obtaining a node identifier dependent on at least a position index and a loading indicator of a mobile node and to a routing operation 450 of routing data through the mobile node responsive to the node identifier. As described below, operation 430 and operation 450 can be performed by source node 212 or by network subsystem 220 of FIG. 2. They can likewise be performed by controller 170 or by any of several nodes of FIG. 1. Node 190 can perform a variant of flow 400, for example, by including in the routing operation 450 an operation 455 of performing one or more error correction operations on at least a portion of the data.

Referring now to FIG. 5, there are shown alternative operational flows 500 having operations that facilitate another desirable form of data transfer. After a start operation, flow 500 moves to a receiving operation 530 of receiving wireless data via a node-speed-change-prediction-dependent signal route and to a relaying operation 550 of relaying at least a portion of the wireless data. As described below, operation 530 and operation 550 can be performed by source node 212 or by network subsystem 220 of FIG. 2, for example. They can likewise be performed by controller 170, by any of several nodes of FIG. 1, or by a combination of more than one of these. Controller 170 can perform a variant of flow 500 by including in relaying operation 550 an operation 555 of including at least some photographic image data in the wireless data.

Referring now to FIG. 6, there is shown a device 600 such as a computer program product including a signal bearing medium 650 such as a conduit, a memory/storage element, a display medium, or a combination of more than one type of medium. With reference to FIG. 3, medium 653 can bear one or more instructions for performing determining operation 330 and one or more instructions for performing routing operation 350. Alternatively or additionally, with reference to FIG. 4, medium 654 can bear one or more instructions for performing obtaining operation 430 and one or more instructions for performing routing operation 450. Alternatively or additionally, with reference to FIG. 5, medium 656 can bear at least one or more instructions for performing receiving operation 530 and one or more instructions for performing relaying operation 550.

Referring now to FIG. 7, there is shown a network subsystem 700 in schematic form. Subsystem 700 includes a module 750 for receiving wireless data from a node-speed-change-prediction-dependent signal route and circuitry 770 for relaying at least a portion of the wireless data. (Although these are distinct in schematic form, circuitry 770 can overlap or even occupy module 750 physically.)

Optionally, module 750 can include an amplifier 751 for amplifying at least the portion of the wireless data. Alternatively or additionally, module 750 can include a signal-bearing conduit 752 for receiving at least the portion of the wireless data. Module 750 can likewise include an antenna 754 operable to receive the wireless data and optionally a driver 755 configured to adapt a directionality of the antenna. Module 750 can also include a user interface 757 operable to display at least the portion of the wireless data. Alternatively or additionally, module 750 can include a controller 758 operable to transmit at least the portion of the received wireless data to the circuitry and/or a controller 759 having a memory operable to hold at least some of the portion of the received wireless data.

Circuitry 770 optionally includes a controller 778 having a memory 779 operable to contain one or more instructions that when executed cause the controller 778 to process at least some of the wireless data. For example, the instruction(s) can include machine code for transferring a portion of the wireless data to or from a register. Circuitry 770 can likewise include one or more of circuitry 771 for implementing a look-up table having a speed as an operand, circuitry 772 for implementing a time-dependent traffic model, circuitry 774 for implementing a location-dependent speed model, or circuitry 775 for implementing a vehicle-dependent speed model. In one embodiment, the circuitry 772 for implementing a time-dependent traffic model includes circuitry 773 for implementing a look-up table having a time as an operand. More generally, circuitry 770 can include logic 776, such as logic 777 for implementing a look-up table. For example, logic 777 can include logic for accessing a storage element containing part or all of the table.

Referring now to FIG. 8, there is shown a network subsystem 800 embodiment. Any or all of the nodes of FIG. 1 can be embodied as vehicle 810 of network subsystem 800, for example. Vehicle 810 includes a communication system 830, a drive mechanism 860 operable to start vehicle 810 moving, and a common power source 820. Power source 820 can be operable to provide power selectively to drive mechanism 860 (optionally via drive shaft 865) or to the circuitry such as communication system 830. For example, power source 820 can include a combustion engine 824 operable to provide power to drive shaft 865 and to an electrical supply 822 of power source 820. Electrical supply 822 can selectively provide power to controller 834 or to antenna system 839, an antenna operably coupled to a transceiver. Controller 834 can include a processor 837 operably coupled to an interface 836 and a memory 838. Antenna system 839 can be coupled to controller 834, such as by a conduit 833 coupled to processor 837. Interface 836 can be accessible to a user 885 in a passenger compartment 880 of vehicle 810. User 885 can be a driver, pilot, or other passenger. Memory 838 can be configured as the signal-bearing medium 650 in any of the configurations of FIG. 6. Processor 837 can thus perform one or more of flows 300, 400 or 500 as described herein.

The network subsystem 800 can include a module (antenna system 839, e.g.) for receiving wireless data from a node-speed-change-prediction-dependent signal route (channel 870, e.g.) and circuitry (controller 834, e.g.) for relaying at least a portion of the wireless data.

In an embodiment in which power source 820 is operable to provide power selectively to the drive mechanism 860 (to drive shaft 865, e.g.) or to the circuitry of controller 834, network subsystem 800 can further include a combustion engine 824 operatively coupled (via electrical supply 822, e.g.) to provide power to the circuitry. Also GPS 840 or compass 850 can be coupled (via a short range wireless connection to antenna system 839, e.g.) to provide a signal to the processor 837.

Figure 9:
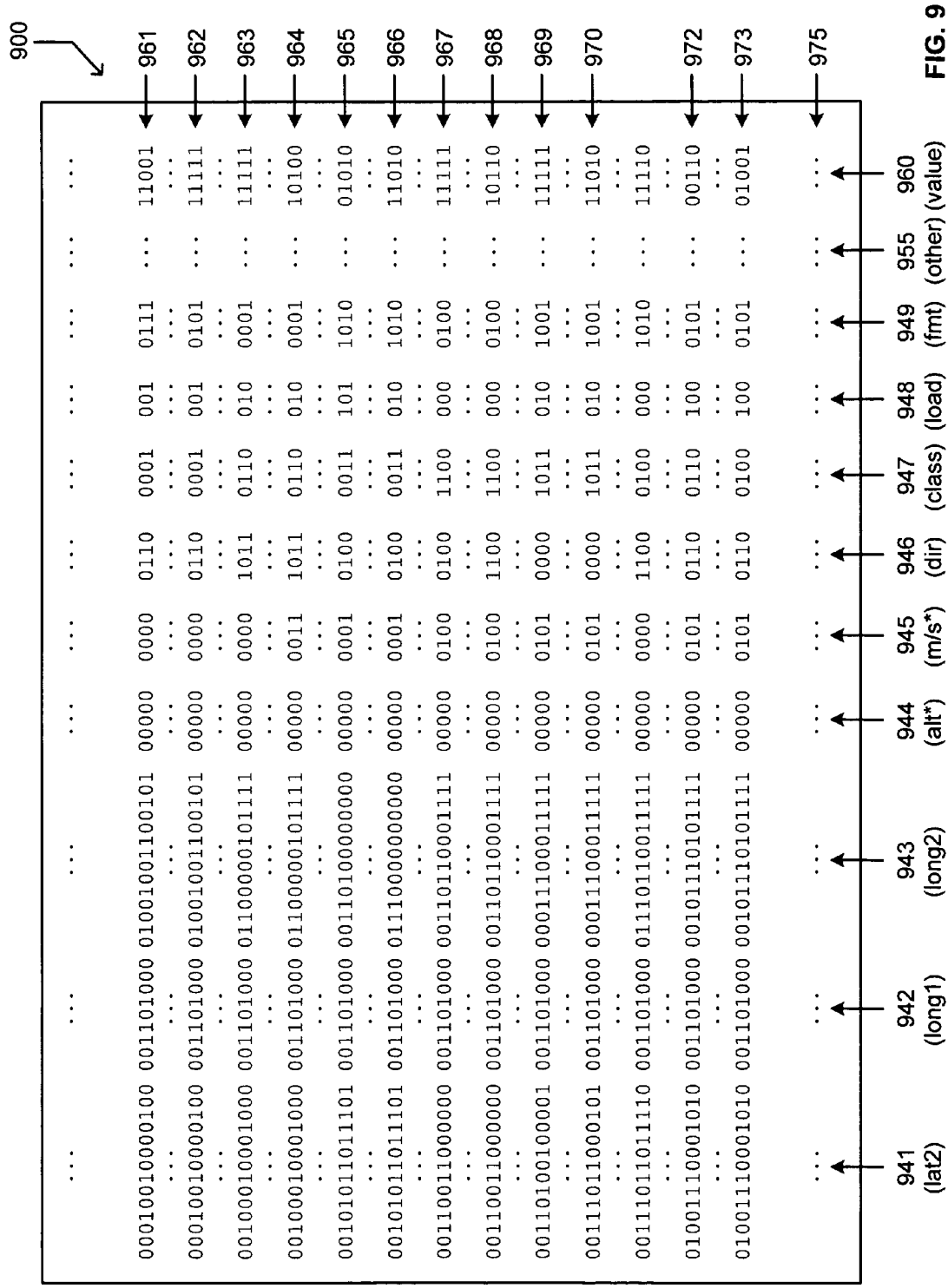
FIG. 9 shows a look-up table that can be used for determining a suitability value at least partly based on each of several operands.

Turning now to FIG. 9, there is shown a look-up table 900 that can be used for determining a suitability value 960 at least partly based on each of several operands including operand 941 through operand 949. In the network subsystem 700 of FIG. 7, for example, table 900 can be implemented in logic 777. Alternatively, in the vehicle 810 of FIG. 8, table 900 can be stored in memory 838. Optionally at least part of table 900 can be in a random-access storage device such as a disk drive.

Operand 941 is (a fractional-degree portion of) a latitude coordinate. Operand 942 is (a whole-degree portion of) a longitude coordinate. Operand 943 is (a fractional-degree portion of) a longitude coordinate complementing operand 941. Operand 944 is an altitude expressed in meters relative to ground or sea level, providing for altitude-dependent suitability indicators of aircraft that are passenger vehicles. Operand 945 is a speed of a node, relative or absolute, expressed in meters per second. Operand 944 and operand 945 are marked with asterisks to indicate an exponential scale in which each binary number is taken to be a power of 2. For the operand vector of row 973, for example, the indicated altitude is approximately 2 to the power of 0 (=1) meter above ground and the indicated speed is approximately 2 to the power of 6=64 meters per second.

Operand 946 is a node heading in which (magnetic) North=0000 and the other compass points increase clockwise to 1111 (NNW). Operand 946 is ignored, however, for rows in which operand 945=0000. (In effect, speeds of 1 meter per second or less are treated as being stationary, in this model.)

Operand 949 is an information format indicator, which can be encoded to indicate video, audio, proprietary, encoded, or any of the other format-indicative descriptors used in this document as a matter of design choice in light of present teachings. Additional operands 955 can also be used in determining suitability value 960.

Figure 10:
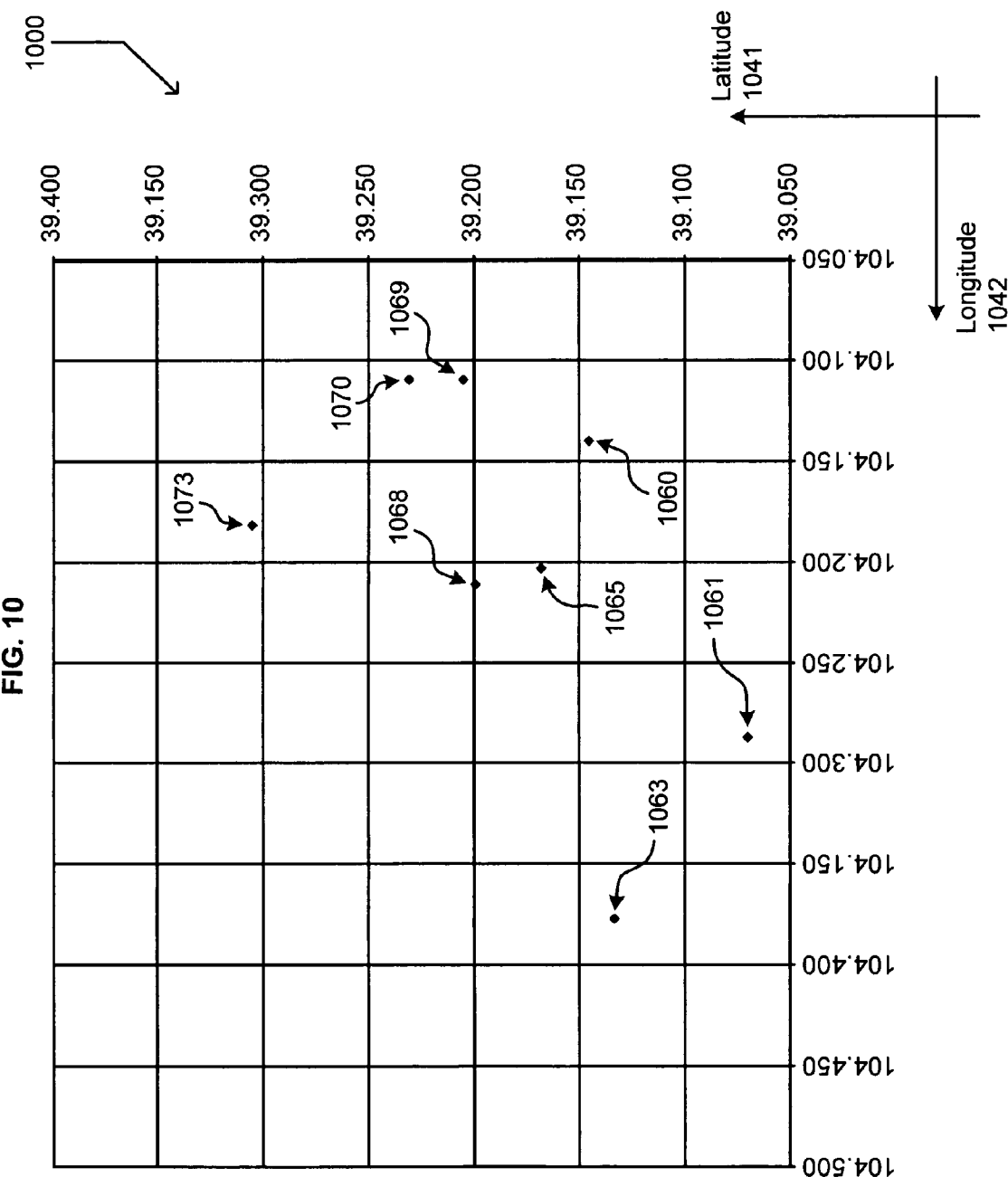
FIG. 10 shows a map plotting each of several nodes described in relation to the table of FIG. 9.

Referring now to FIG. 10 in light of FIG. 9, FIG. 10 shows a map 1000 plotting latitude 1041 against longitude 1042. A location of each of node 1060 through node 1073 is also plotted on map 1000, some or all of which are suitable for relaying information. Node 1061 is shown at 39.070 degrees North, 104.287 degrees West, for example, in this detailed illustration. Referring again to FIG. 9, row 961 corresponds to operands that describe node 1061. Node 1061 is therefore essentially stationary, as indicated by the 0000 in the column of operands 945.

Row 962 is identical to row 961 except for the data format (at column 949, e.g.) and the suitability value (at the column of values 960). Row 961 has a suitability value of 11001, a binary number that indicates a high suitability. Row 962 indicates an even higher suitability, though, illustrating that the model implemented in table 900 has a format-dependent suitability indicator at the column of values 960.

Row 963 of FIG. 9 corresponds to operands that describe node 1063 of FIG. 10. Row 963 and row 964 illustrate that the model implemented in table 900 has a speed-dependent suitability indicator (in the column of values 960), having operand values that are identical except for speed (in the column of operands 945). Therefore the suitability indicator of node 1063 would decrease (from 11111 to 10100, according to table 900) if the speed of node 1063 were about 8 meters per second rather than being at most about 1 meter per second.

Row 965 of FIG. 9 corresponds to operands that describe node 1065 of FIG. 10. Operand 948 is a binary load indicator such that 000 indicates no loading and 111 indicates saturation, in terms of a fractional usage of a critical resource such as a maximum data transfer rate and/or a reduction of available space in a memory such as memory 838 in the embodiment of FIG. 8 described above. Row 965 and row 966 illustrate that the model implemented in table 900 has a load-dependent suitability indicator, having operands that are identical except for load (in the column of operands 948). Therefore the suitability indicator of node 1065 would increase (from 01010 to 11010, according to table 900) if the load indicator of node 1065 were 010 rather than being 101.

Row 968 of FIG. 9 corresponds to operands that describe node 1068 of FIG. 10. Row 967 and row 968 illustrate that the model implemented in table 900 has a heading-dependent suitability indicator (in the column of values 960), having operand values that are identical except for heading (in the column of operands 946). Therefore the suitability indicator of node 1068 would increase (from 10110 to 11111, according to table 900) if the heading of node 1068 were eastward (dir=0100) rather than westward (dir=1100).

Rows 969 & 970 of FIG. 9 correspond respectively to operands that describe nodes 1069 & 1070 of FIG. 10. Rows 969 & 970 illustrate that the model implemented in table 900 has a position-index-dependent suitability indicator (in the column of values 960), having operand values that are identical except for latitude (in the column of operands 941). Node 1069 and node 1070 are both traveling north at about 32 m/s. The suitability indicator of node 1069 is higher than that of node 1070, according to table 900, just because it is not as far north.

Row 973 of FIG. 9 corresponds to operands that describe node 1073 of FIG. 10. Operand 947 is a node class indicator corresponding to attributes of a given node that affect its ability to provide service. Operand 947 can indicate some combination of a nominal antenna range, a nominal transmitter power, a nominal bandwidth, a nominal gain-bandwidth product, a nominal data rate, a wireless protocol, a service provider, or a service level, for example. In one implementation, operand 947=0011 uniquely indicates a combination of node attributes that include a nominal operating frequency of 900 MHz and/or 1,800 MHz and an unlimited-duration service. Other values of operand 947 shown indicate no such nominal operating frequency and/or limited-duration service, for example, when table 900 is used in any of the above-described flows.

Row 972 and row 973 illustrate that the model implemented in table 900 has a load-dependent suitability indicator, having operand values that are identical except for node class (in the column of operands 947). Therefore the suitability indicator of node 1073 would decrease (from 01001 to 00110, according to table 900) if the class of node 1073 were 0110 rather than being 0100.

Additional rows 975 are too numerous to be shown effectively on paper. Table 900 is large, in fact, and in some contexts it would be convenient to use a simpler model. One way to do this would be to implement a table in a stationary router for a given area of land, and to use a local model that assumes a local value of one or more position indices within a zone (by omitting column of operands 942, for example). Part of the model can be executed before looking up the suitability value, alternatively or additionally, such as by using a route that includes one or more predicted speeds to predict a location at a given future point in time. By using a prediction that has been computed in a prior computational operation, for example, the heading or speed operands can be omitted from the look-up operation.

Figure 11:
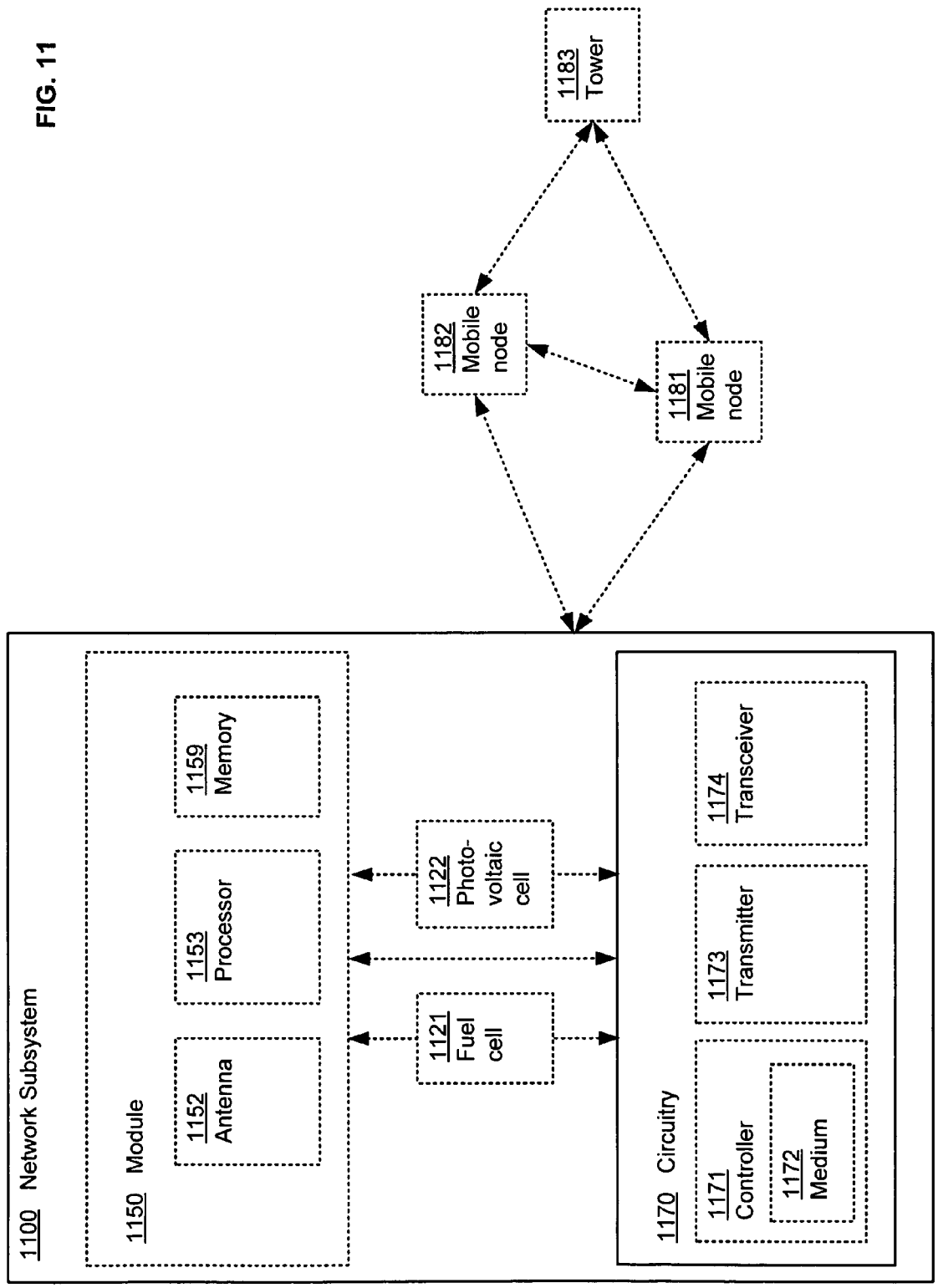
FIG. 11 shows another network subsystem in schematic form.

Referring now to FIG. 11, there is shown another network subsystem 1100 including a module 1150 and circuitry 1170 in schematic form. Module 1150 can be configured for receiving wireless data from a node-speed-change-prediction-dependent signal route and include circuitry 1170 configured for relaying at least a portion of the wireless data. Subsystem 1100 can further include a power source such as a fuel cell 1121 or photovoltaic cell 1122 operatively coupled to provide power to the components of circuitry 1170 or module 1150. Module 1150 can include an antenna 1152, a processor 1153, or a memory 1159.

Alternatively or additionally, module 1150 can be configured for obtaining a node identifier dependent on at least a position index and a loading indicator of a mobile node, and circuitry 1170 can be configured for routing data through the mobile node responsive to the node identifier. Circuitry 1170 can include a transmitter 1173 or transceiver 1174 operable to communicate with the mobile node. For example, the transceiver can receive the position index and the loading indicator, which processor 1153 can use to generate the node identifier of whichever of the available nodes (of mobile node 1181 and mobile node 1182, e.g.) is most suitable for relaying a signal to a stationary node (tower 1183, e.g.). Circuitry 1170 can also include a controller 1171, optionally one with access to a medium 1172 configured as medium 1240 of FIG. 12. Alternatively, medium 1172 can be a transmission medium (such as a conduit) or a medium of communication (such as a display, e.g.).

Figure 12:
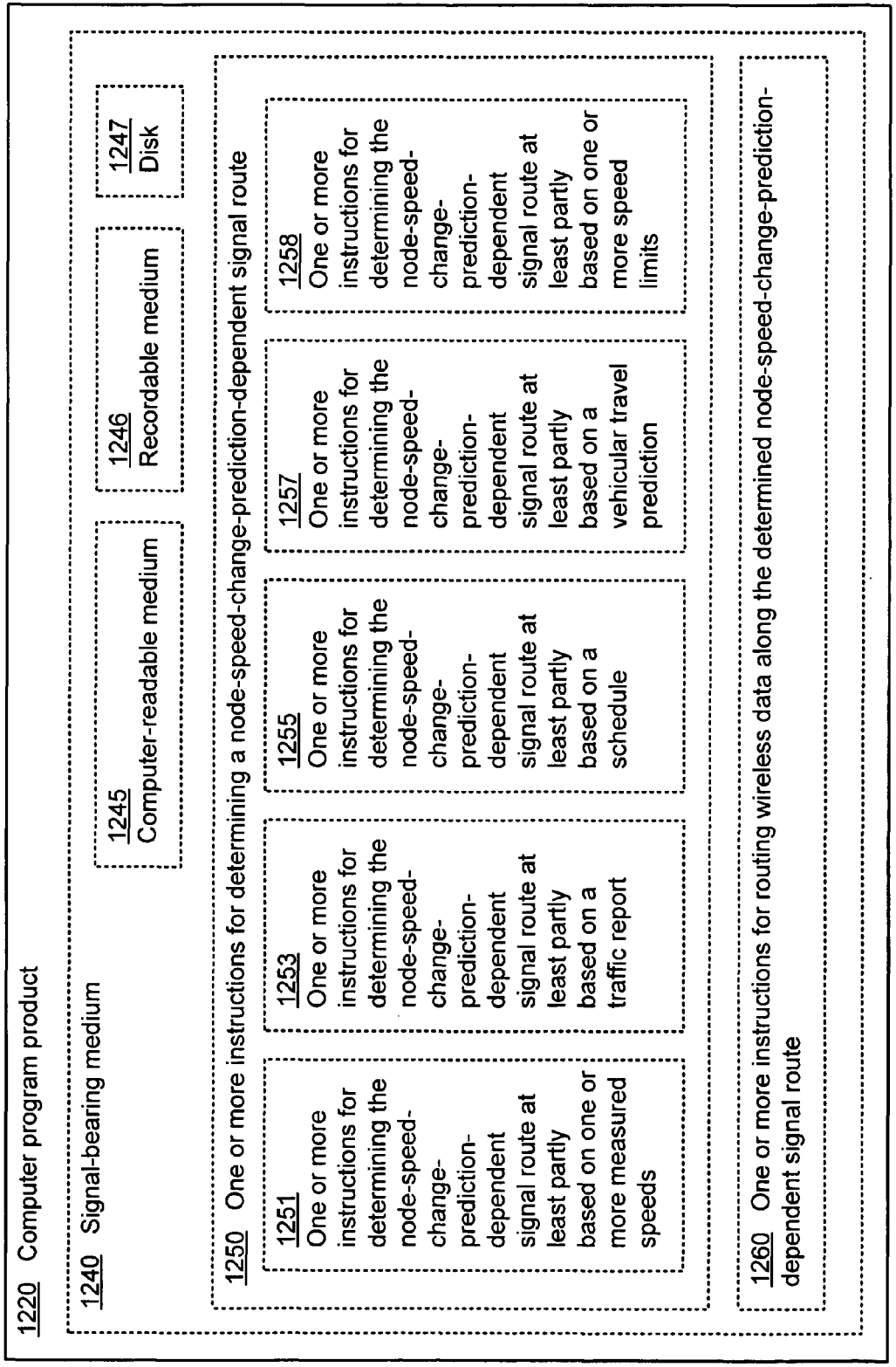
FIG. 12 shows another system embodiment.

Referring now to FIG. 12, there is shown a system 1200 (which can be network subsystem 1100 or a computer program product 1220, e.g.) that includes at least a signal-bearing medium 1240. Signal bearing medium 1240 can include one or more of a computer-readable medium 1245, a recordable medium 1246, a disk 1247, one or more determining instruction(s) 1250, or one or more routing instruction(s) 1260. The determining instruction(s) 1250 can be one or more instructions for determining a node-speed-change-prediction-dependent signal route. This instruction set can include one or more of instruction(s) 1251, instruction(s) 1253, instruction(s) 1255, instruction(s) 1257, or instruction(s) 1258. Instruction(s) 1251 refers to one or more instructions for determining the node-speed-change-prediction-dependent signal route at least partly based on one or more measured speeds. Instruction(s) 1253 refers to one or more instructions for determining the node-speed-change-prediction-dependent signal route at least partly based on a traffic report. Instruction(s) 1255 refers to one or more instructions for determining the node-speed-change-prediction-dependent signal route at least partly based on a schedule. Instruction(s) 1257 refers to one or more instructions for determining the node-speed-change-prediction-dependent signal route at least partly based on a vehicular travel prediction. Instruction(s) 1258 refers to one or more instructions for determining the node-speed-change-prediction-dependent signal route at least partly based on one or more speed limits. One or more routing instruction(s) 1260 refers to one or more instruction(s) for routing wireless data along the determined node-speed-change-prediction-dependent signal route.

Figure 13:
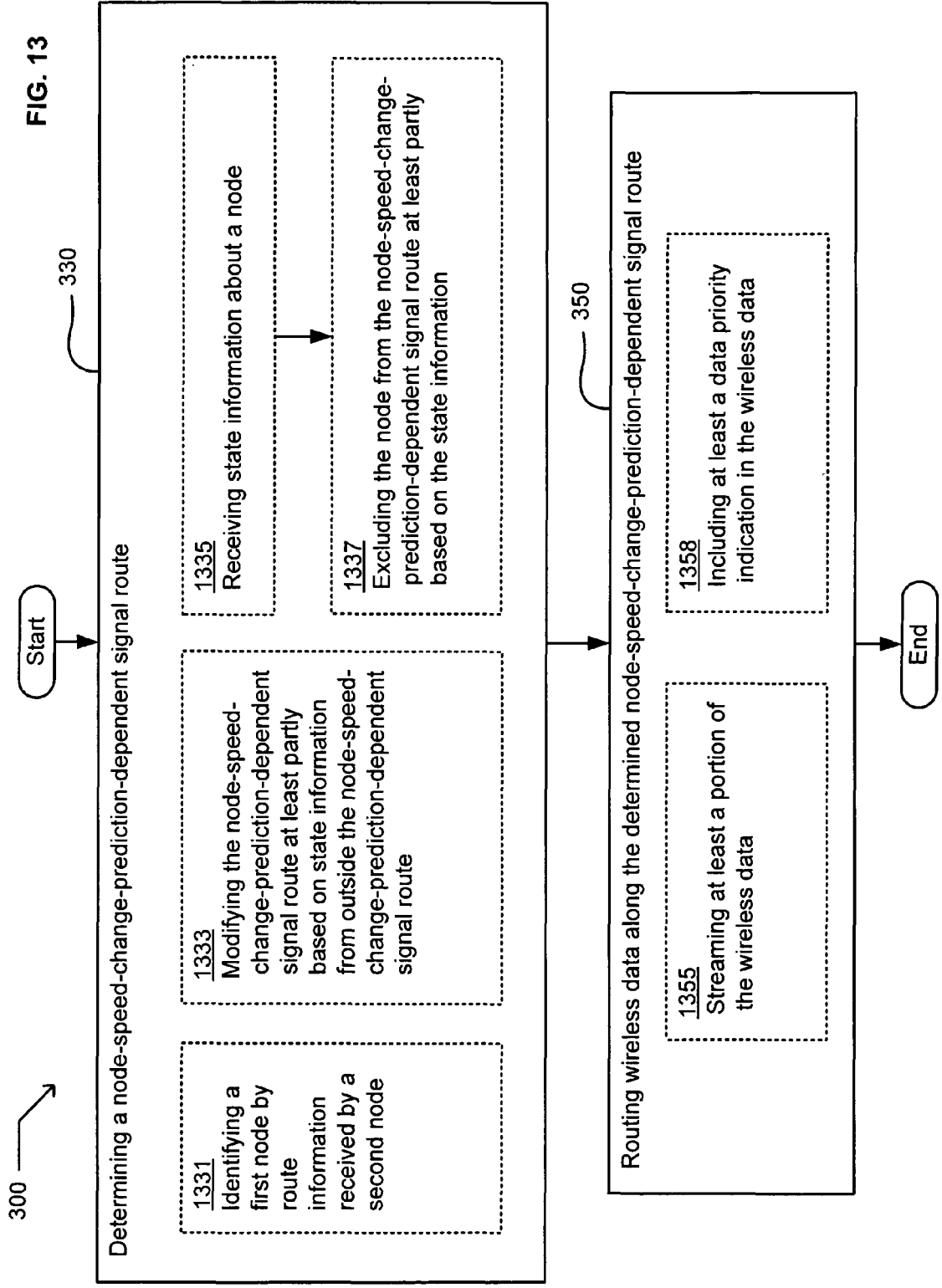
FIG. 13 shows several variants of the flow of FIG. 3.

Referring now to FIG. 13, there are shown several variants of flow 300 of FIG. 3. For example, the operation 330 of determining a node-speed-change-prediction-dependent signal route can include one or more of operation 1331, operation 1333, operation 1335, or operation 1337. Operation 1331 includes identifying a first node by route information received by a second node. Operation 1333 includes modifying the node-speed-change-prediction-dependent signal route at least partly based on state information from outside the node-speed-change-prediction-dependent signal route. (An item "outside" a route or set is not limited to permanently excluded items, but also refers to candidates for inclusion within the route or set., e.g.) A flow is also shown including operation 1335 of receiving state information about a node and operation 1337 of excluding the node from the node-speed-change-prediction-dependent signal route at least partly based on the state information.

Any of these features can optionally be used in combination with any of the variants of operation 350, routing wireless data along the determined node-speed-change-prediction-dependent signal route. Operation 350 can include an operation 1355 of streaming at least a portion of the wireless data. The data streaming is not limited to directing unidirectional data flow in a single channel, but can include any technique for handling data at one or more stages in a steady and continuous stream, typically facilitated by buffering and/or multiplexing at least some of the data. Alternatively or additionally, operation 350 can include an operation 1358 of including at least a data priority indication in the wireless data. A high priority may indicate that the data is of a time-sensitive nature, that the data is likely to be relatively small, or that the sender, owner or receiver has a high status relative to that of some other messages.

Figure 14:
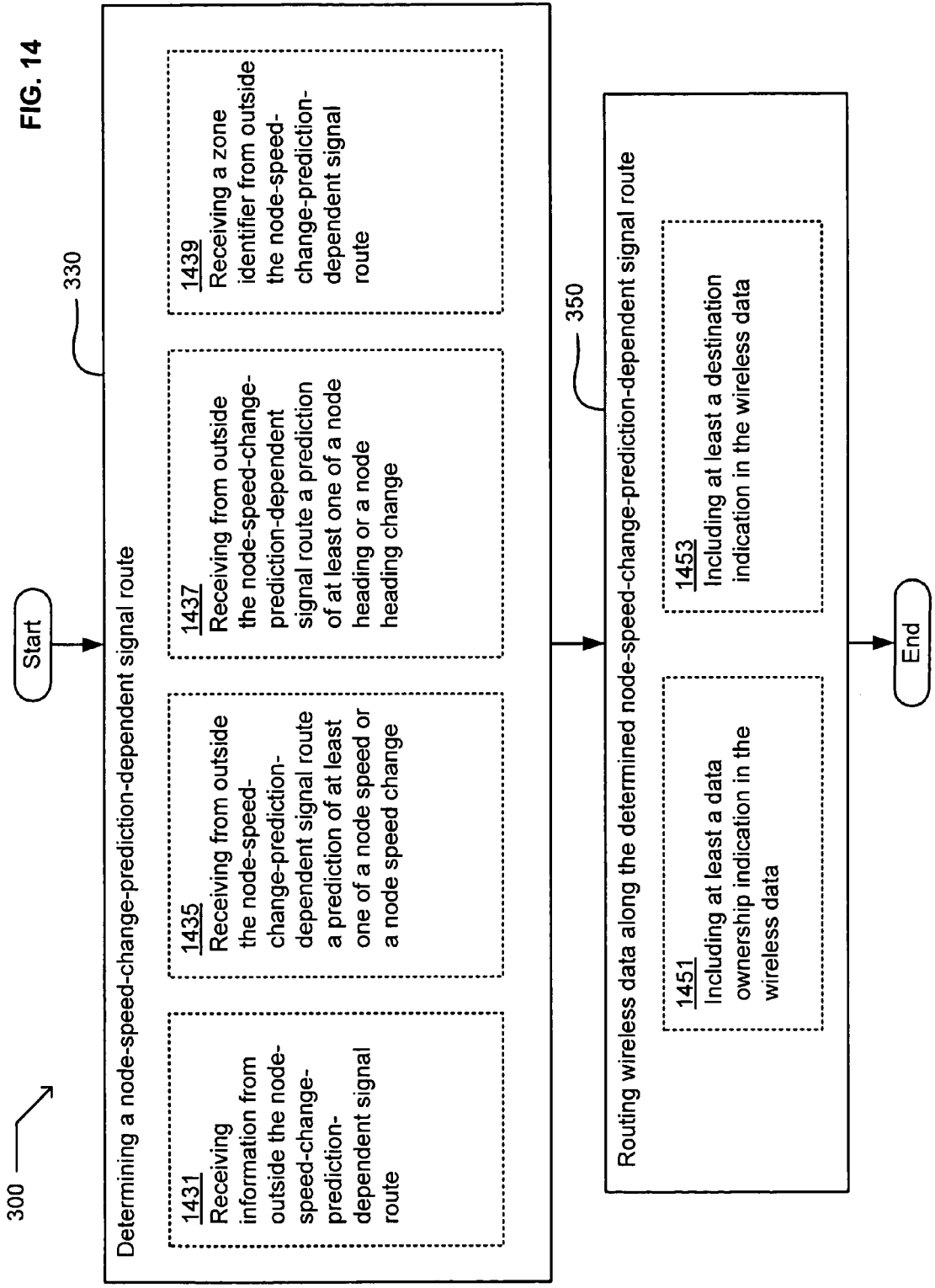
FIG. 14 shows several other variants and optional features of the flow of FIG. 3 or of its variants shown in FIG. 13.

Referring now to FIG. 14, there are shown several other variants and optional features of flow 300 of FIGS. 3 & 13. For example, the operation 330 of determining a node-speed-change-prediction-dependent signal route can include one or more of operation 1431, operation 1435, operation 1437, or operation 1439. Operation 1431 includes receiving information from outside the node-speed-change-prediction-dependent signal route. In performing flow 300, node 140 can receive state information from node 154 in FIG. 1, for example, indicating that node 154 is expected to be stopped and unavailable for service imminently. If node 140 then receives a transmission along a signal route 180 that only includes a linkage 135 from source node 133 to intermediate node 140, for example, node 140 can then respond by appending channel 160 to signal route 180 responsive to the node speed change prediction from node 154.

Alternatively or additionally, node 140 can receive from outside the node-speed-change-prediction-dependent signal route a prediction of at least one of a node speed or a node speed change (by operation 1435, e.g.) or of a node heading or a node heading change (by operation 1437, e.g.). Node 140 can use one or more of these items of information to predict a node speed change from which to determine at least part of signal route 180.

In lieu of any of receiving operations 1431, 1435, and 1437, node 140 can instead receive a zone identifier from outside the node-speed-change-prediction-dependent signal route (such as route 180, by operation 1439, e.g.). For example, node 140 can receive the zone identifier as an indication of where node 154 will be at a given moment, based on a speed change prediction. Node 140 can use this node-speed-change-prediction-dependent zone identifier in determining to append channel 150 in lieu of channel 160 (by operation 330, e.g.).

In combination with any of the above-described variants of operation 330, the routing operation 350 can also comprise operation 1451 or operation 1453. Operation 1451 comprises including at least a data ownership indication in the wireless data. This is not limited to a copyright notice but can also be an anonymous indication that the data is proprietary. Operation 1453 comprises including at least a destination indication in the wireless data. For example, the indication can be a geographic zone, a destination network, or a particular node or entity.

Figure 15:
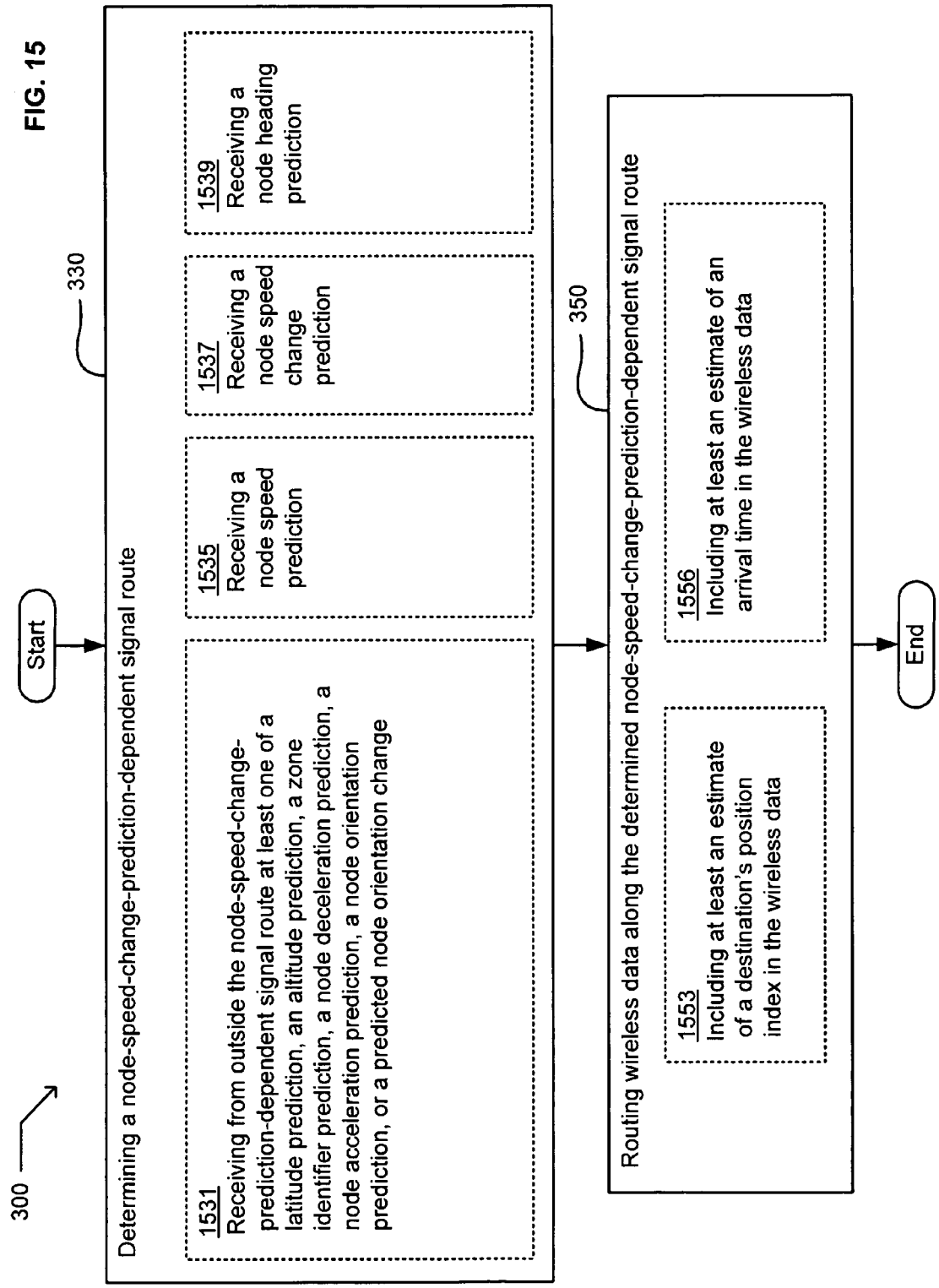
FIG. 15 shows several further variants and optional features of the flow of FIG. 3 or its variants.

Referring now to FIG. 15, there are shown several further variants and optional features of flow 300 of FIGS. 3, 13, and 14. For example, the operation 330 of determining a node-speed-change-prediction-dependent signal route can include one or more of operation 1531, operation 1535, operation 1537, or operation 1539. Operation 1531 includes receiving from outside the node-speed-change-prediction-dependent signal route at least one of a latitude prediction, an altitude prediction, a zone identifier prediction, a node deceleration prediction, a node acceleration prediction, a node orientation prediction, or a predicted node orientation change. For example, the received information can include a description of a node that is a candidate for addition to the node-speed-change-prediction-dependent signal route. Similarly, the determining operation 330 can include receiving a node speed prediction (by operation 1535, e.g.), receiving a node speed change prediction (by operation 1537, e.g.), or receiving a node heading prediction (by operation 1539, e.g.).

Alternatively or in combination with any of the above-described variants of operation 330 or operation 350, the routing operation 350 can further comprise including at least an estimate of a destination's position index (by operation 1553, e.g.) or including at least an estimate of an arrival time (by operation 1556, e.g.) in the wireless data. For example, the position index can be an altitude, a set of coordinates, or an offset distance from some reference point. The arrival time is not limited to an arrival time of a signal but can alternatively describe a planned or otherwise approximate arrival of one or more nodes or other physical objects.

Figure 16:
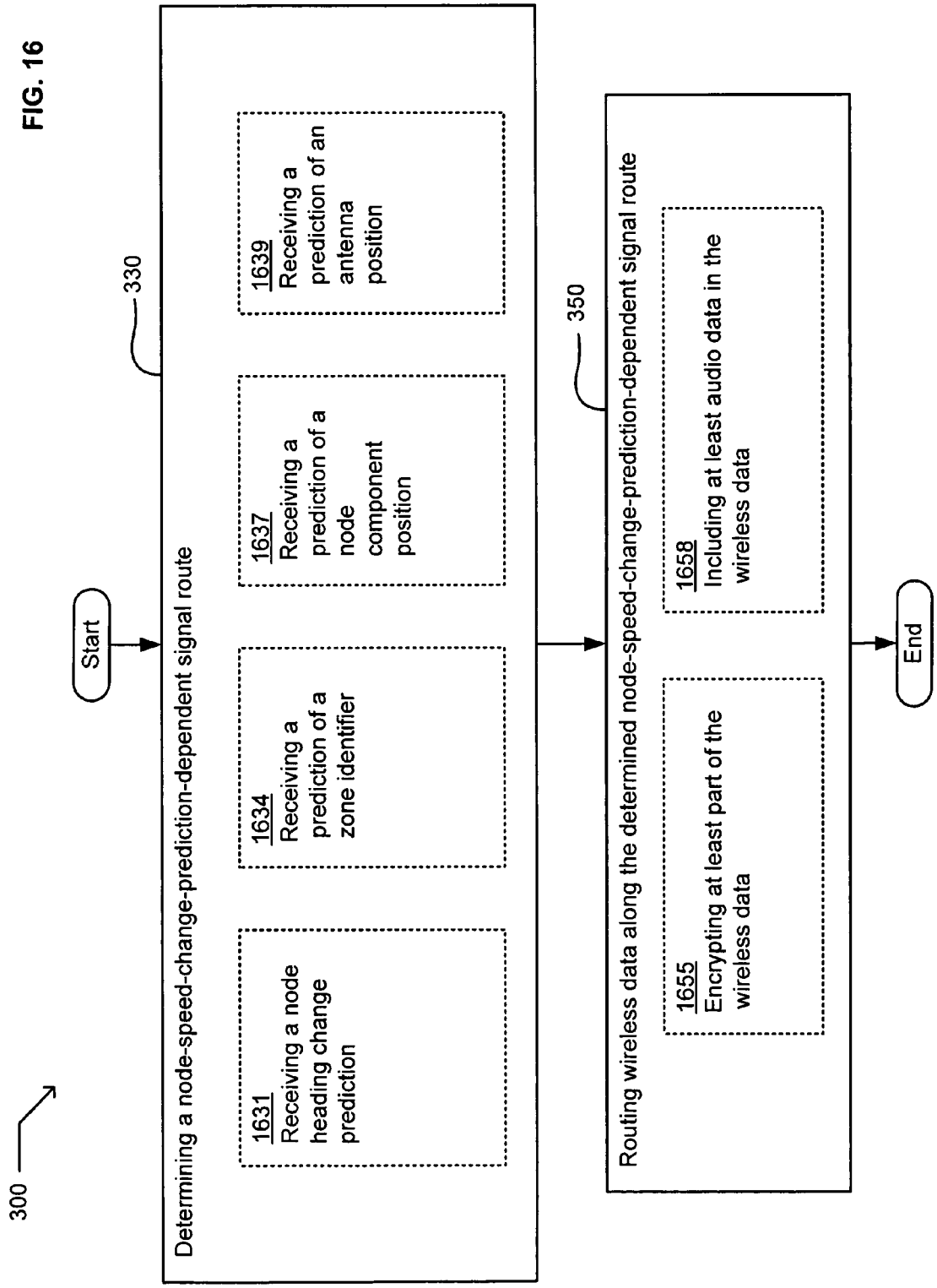
FIG. 16 shows several further variants and optional features of the flow of FIG. 3 or its variants.

Referring now to FIG. 16, there are shown several further variants and optional features of flow 300 of FIG. 3, 13, 14, or 15. For example, the operation 330 of determining a node-speed-change-prediction-dependent signal route can include one or more of operation 1631, operation 1634, operation 1637, or operation 1639. The operation 350 can similarly include one or more of operation 1655 or operation 1658.

For example, referring again to FIG. 1, node 154 can receive a node heading change prediction (by operation 1631, e.g.) or receive a prediction of a zone identifier (by operation 1634, e.g.) that node 154 uses for determining a node-speed-change-prediction-dependent signal route (by operation 330, e.g.). For example, node 154 can be a stationary node that receives one or more predictions bearing upon the availability and suitability of a mobile node, which can be node 156. Node 154 can use the one or more predictions to determine a route, which can be route 180 amended to include channel 150. Node 154 can respond by routing wireless data along the determined node-speed-change-prediction-dependent signal route (by operation 350, e.g.), and optionally by encrypting at least part of the wireless data (by operation 1655, e.g.) before completing the routing operation 350.

In another example, node 156 can receive a prediction of an antenna position (by operation 1639, e.g.) or another node component position (by operation 1637, e.g.) in performing the determining operation 330. For example, node 156 can receive a prediction that a component of node 190 will be in a given position enabling transmission through node 156 at a given time. Node 156 can use this prediction in responding to a routing request broadcast indicating that node 140 has a message for node 197. Node 156 can determine a node-speed-change-prediction-dependent signal route (by operation 330, e.g.) at least to node 190 and route wireless data along the route (by operation 350, e.g.) by transmitting the route to node 140.

In another example in which node 140 is a source node, node 140 can perform one of the above-described variants of flow 300 in which the routing operation 350 comprises including at least audio data in the wireless data (by operation 1658, e.g.). Audio data included by operation 1658 is not limited to telephonic data, but can also include music, speech, or other recordings or artificial sounds. The audio data is optionally encrypted by node 140 also, such as by operation 1655.

Figure 17:
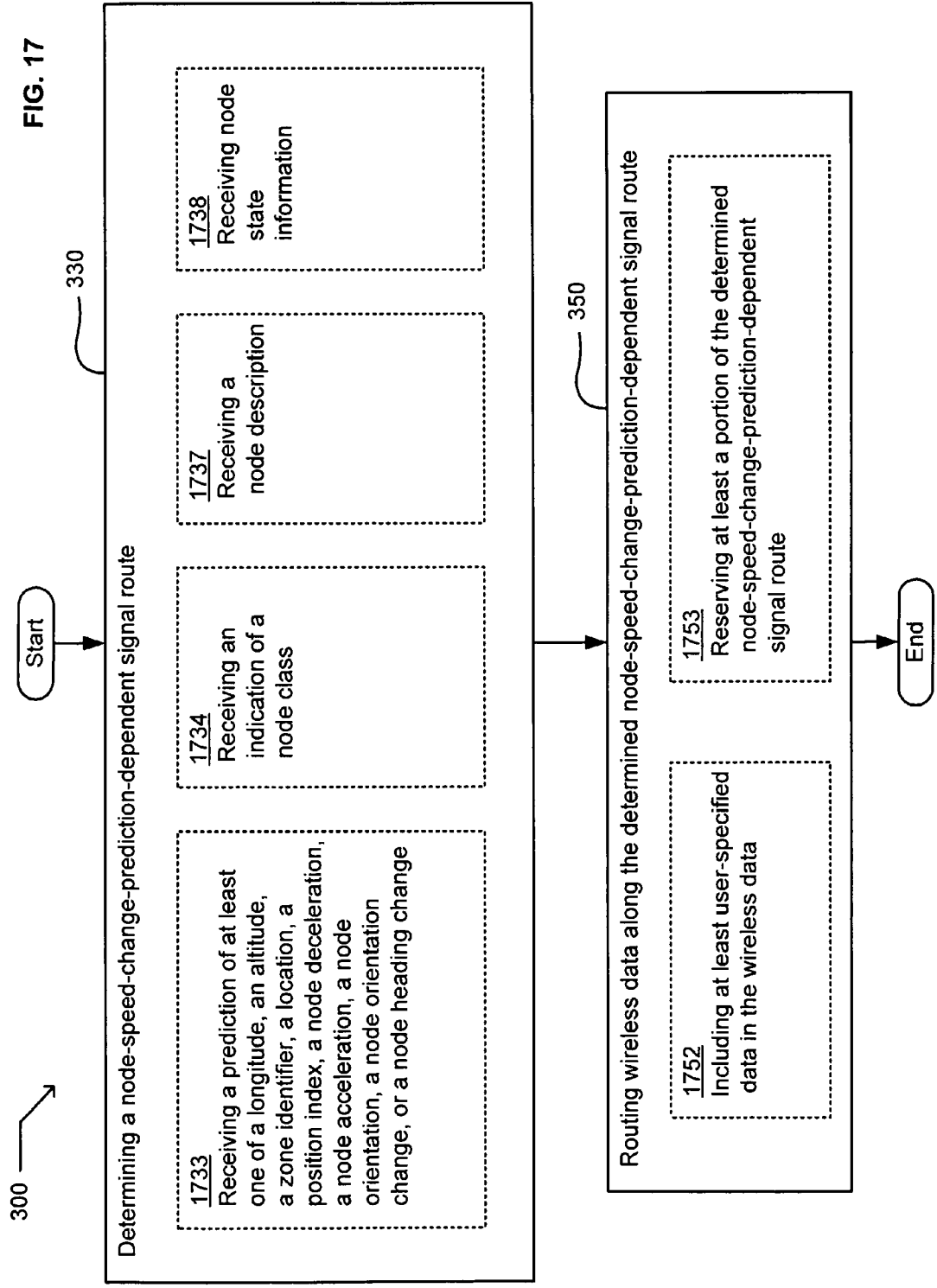
FIG. 17 shows several further variants and optional features of the flow of FIG. 3 or its variants.

Referring now to FIG. 17, there are shown several further variants and optional features of flow 300 of FIG. 3, 13, 14, 15, or 16. For example, the operation 330 of determining a node-speed-change-prediction-dependent signal route can include one or more of operation 1733, operation 1734, operation 1737, or operation 1738. The operation 350 can similarly include one or more of operation 1752 or operation 1753. Operation 1733 includes receiving a prediction of at least one of a longitude, an altitude, a zone identifier, a location, a position index, a node deceleration, a node acceleration, a node orientation, a node orientation change, or a node heading change. For example, source node 212 of FIG. 2 can receive any or all of these in describing mobile node 240. Node 212 can use this information in the determining operation 330 and respond by performing the routing operation 350. Optionally the routing operation 350 can comprise including at least user-specified data in the wireless data (by operation 1752, e.g.). The routing operation 350 can also comprise routing one or more information describing one remote node (node 240, e.g.) to another remote node (one that includes module 225, e.g.).

In one example, network subsystem 220 receives a node description (by operation 1737, e.g.) in performing the determining operation 330. For example, network subsystem 220 can receive an indication of a node class (by operation 1734, e.g.) or can receive node state information (by operation 1738, e.g.) from source node 212. Network subsystem 220 can complete the determining operation 330 by deciding to route data along a signal route to mobile node 240. Optionally network subsystem 220 reserves at least a portion of the determined node-speed-change-prediction-dependent signal route (by operation 350 and including operation 1753, e.g.).

Figure 18:
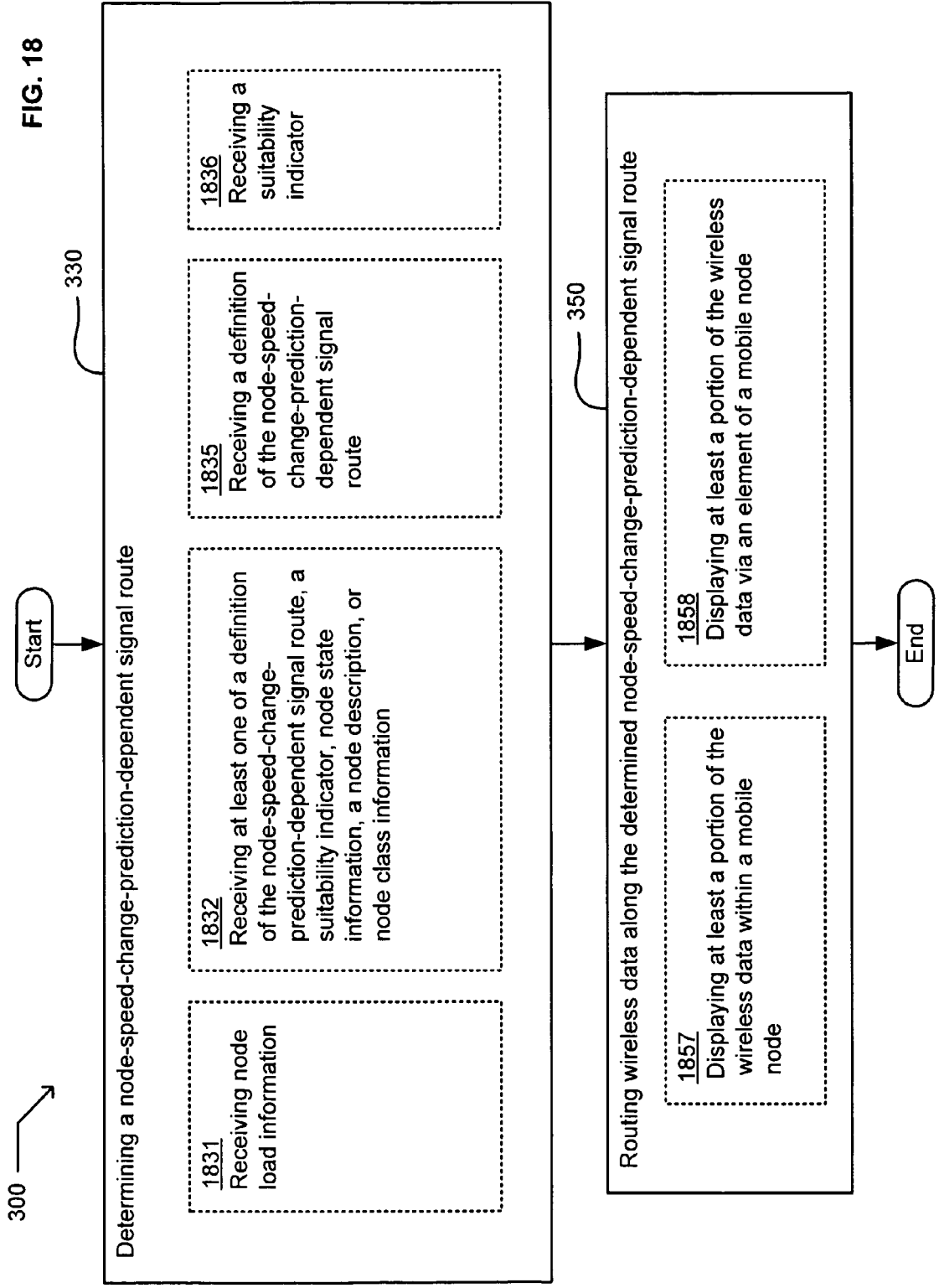
FIG. 18 shows several further variants and optional features of the flow of FIG. 3 or its variants.

Referring now to FIG. 18, there are shown several further variants and optional features of flow 300 of FIG. 3, 13, 14, 15, 16, or 17. For example, the operation 330 of determining a node-speed-change-prediction-dependent signal route can include one or more of operation 1831, operation 1832, operation 1835, or operation 1836. The operation 350 can similarly include one or more of operation 1857 or operation 1858. For example, module 1150 of FIG. 11 can perform any of these variants of the determining operation 330, including receiving node load information 1831, receiving a definition of the node-speed-change-prediction-dependent signal route 1835, or receiving a suitability indicator 1836. Alternatively or additionally, module 1150 can receive at least one of a definition of the node-speed-change-prediction-dependent signal route, a suitability indicator, node state information, a node description, or node class information 1832.

Circuitry 1170 can route wireless data along the signal route determined by module 1150, such as by a route through mobile node 1181 to tower 1183. Circuitry 1170 can also perform operation 1857 by displaying at least a portion of the wireless data within a mobile node (within subsystem 1100, which may be a vehicle, e.g., via medium 1172). If network subsystem 1100 is not a vehicle, circuitry 1170 can still display at least a portion of the wireless data via an element of a mobile node (by performing displaying operation 1858, e.g., via medium 1172).

Figure 19:
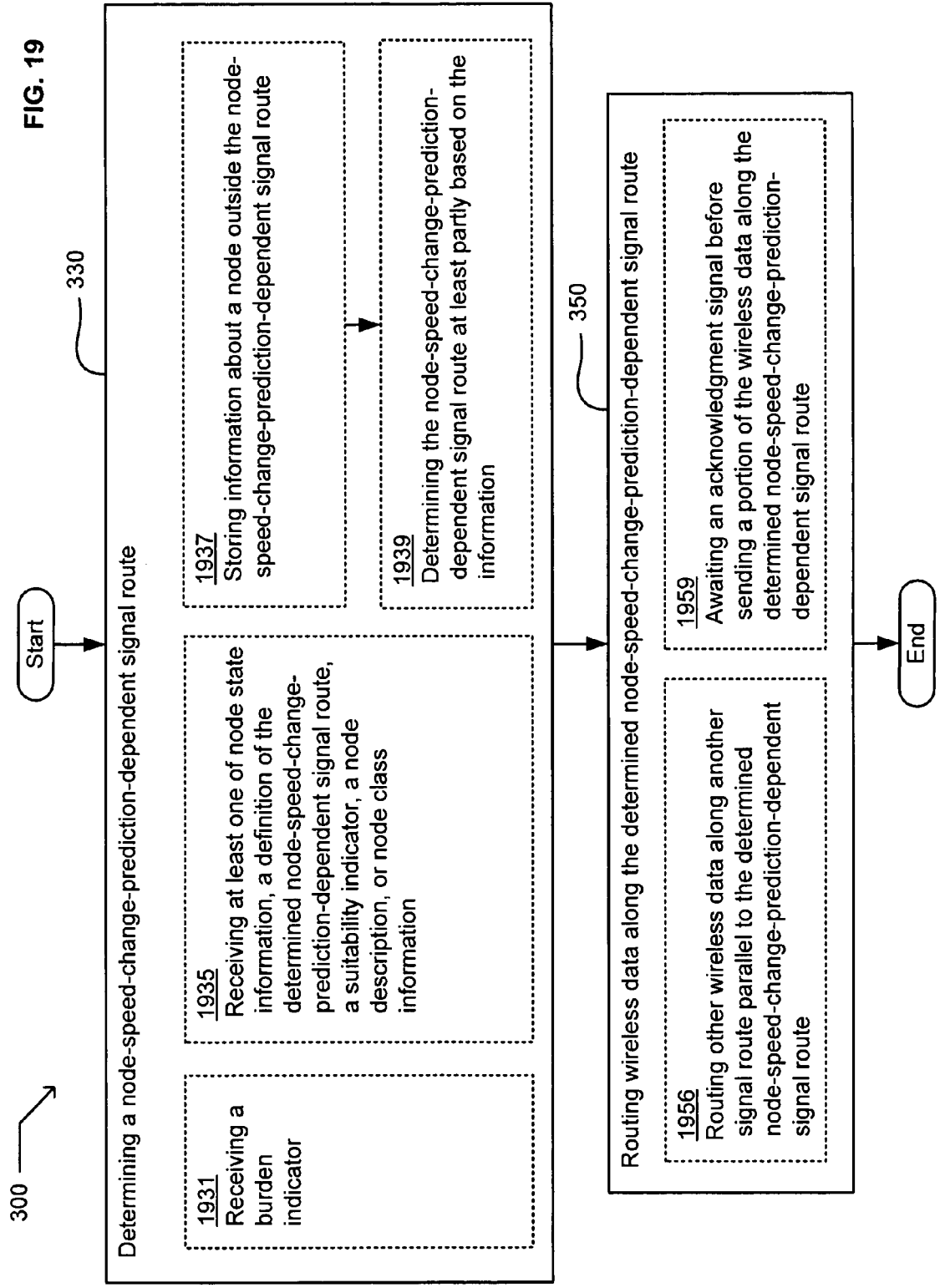
FIG. 19 shows further optional features defining variants of the flow of FIG. 3 or its variants.

Referring now to FIG. 19, there are further optional features defining variants of flow 300 of FIG. 3, 13, 14, 15, 16, 17, or 18. For example, the operation 330 of determining a node-speed-change-prediction-dependent signal route can include one or more of operation 1931, operation 1935, operation 1937, or operation 1939. For example, network subsystem 800 of FIG. 8 can perform many of these variants. Antenna system 839 can perform the operation 1931 of receiving a burden indicator, for example, optionally in combination with operation 1537 of receiving a node speed change prediction. Alternatively or additionally, antenna subsystem 839 can perform the operation 1935 of receiving at least one of node state information, a definition of the determined node-speed-change-prediction-dependent signal route, a suitability indicator, a node description, or node class information.

Similarly, controller 834 can perform the operation 1937 of storing information about a node outside the node-speed-change-prediction-dependent signal route and the operation 1939 of determining the node-speed-change-prediction-dependent signal route at least partly based on the information. Controller 834 can receive and store node state information and other descriptions from or about nearby nodes, for example, in memory 838. In response to a route request, processor 837 can then use or provide the stored information for the determining operation 1937.

Optionally, the routing operation 350 can include one or more of operation 1956 or operation 1959. Communication system 830 can route other wireless data along another signal route parallel to the determined node-speed-change-prediction-dependent signal route (at operation 1956, e.g.). For example, system 830 can determine two or more parallel channels across which to spread received data, such as by code division or time division multiplexing. Alternatively or additionally, communication system 830 can await an acknowledgment signal before sending a portion of the wireless data along the determined node-speed-change-prediction-dependent signal routes (at operation 1959, e.g.).

Figure 20:
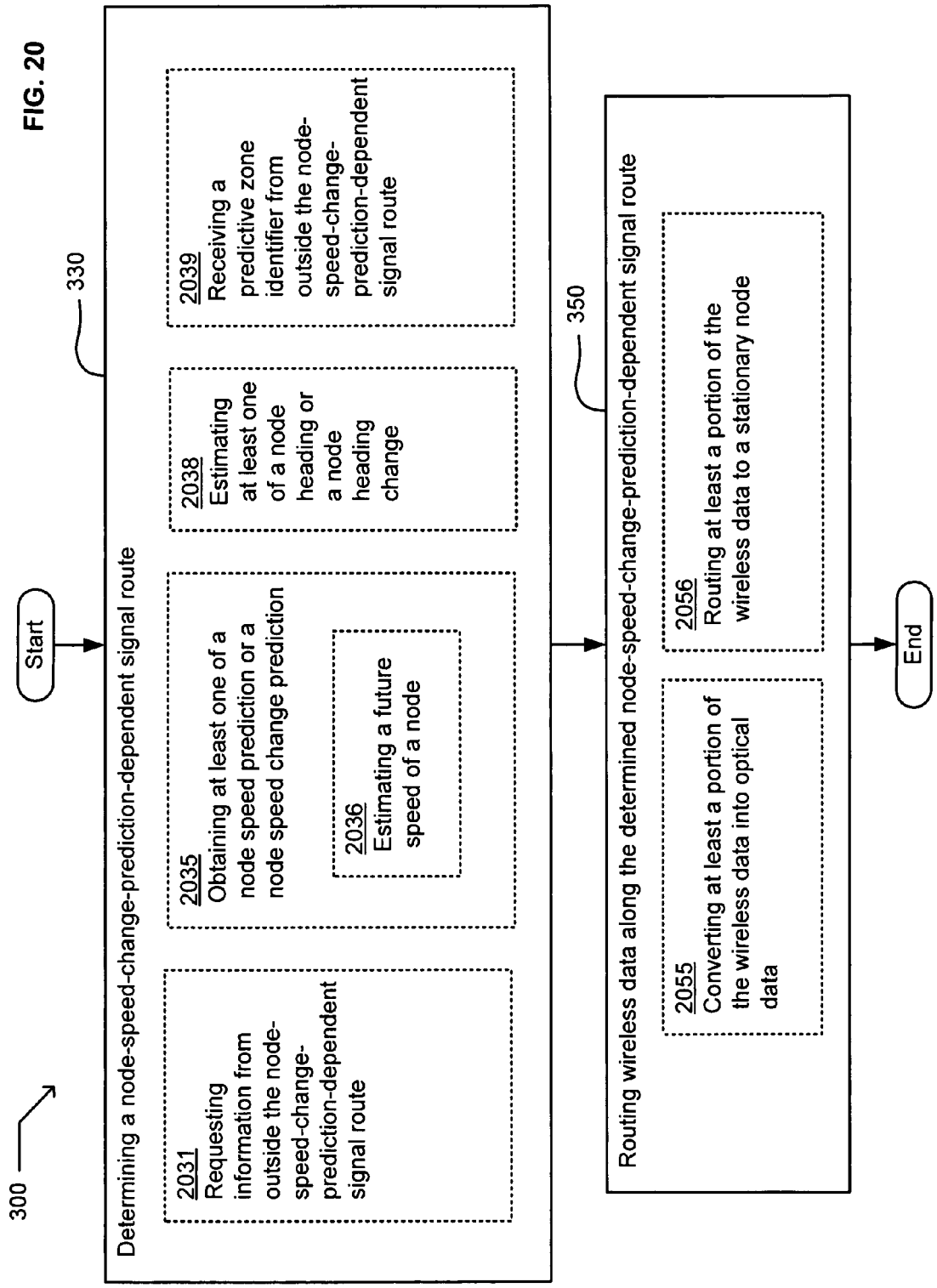
FIG. 20 shows further optional features defining variants of the flow of FIG. 3 or its variants.

Referring now to FIG. 20, there are further optional features defining variants of flow 300 of FIG. 3, 13, 14, 15, 16, 17, 18, or 19. For example, the operation 330 of determining a node-speed-change-prediction-dependent signal route can include one or more of operation 2031, operation 2035, operation 2036, operation 2038, or operation 2039. For example, node 140 of FIG. 1 can be configured as a device 600 that includes a signal bearing medium 650 containing instructions 653. The one or more instructions for performing determining operation 330 can enable node 140 to request information from outside the node-speed-change-prediction-dependent signal route (at operation 2031, e.g.) in performing flow 300. Node 140 can poll all nodes within a direct-transmission zone of node 140 for a route table, for example, which includes information about a plurality of channels not yet on a given signal's defined route. These channels can include channel 150, channel 160, and channel 162, for example. Node 140 can use this information in determining route 180, such as by appending channel 150 to whatever route through which node 140 receives the data.

Node 140 can also perform operation 2035 of obtaining at least one of a node speed prediction or a node speed change prediction, optionally by operation 2036 of estimating a future speed of a node such as node 154. Node 140 can estimate at least one of a node heading or a node heading change 2038 (of node 154, e.g.). Alternatively or additionally, node 140 can perform operation 2039 of receiving a predictive zone identifier from outside the node-speed-change-prediction-dependent signal route. For example, node 140 can receive from node 156 a predictive or other zone identifier describing a past or future location of node 156, and use this information in determining the node-speed-change-prediction-dependent signal route through channel 150. Optionally, the full signal route definition (i.e. all the way from a source node) can be included in a transmission sent to node 154 and node 156.

Optionally, the same network subsystem that performs the determining operation 330 can perform one or both of operation 2055 or operation 2056. Operation 2055 includes converting at least a portion of the wireless data into optical data. For example, in an embodiment in which linkage 195 includes a fiberoptic or other optical communication link, node 190 of subsystem 110 can perform the converting operation 2055. Node 190 can also perform flow 300, alternatively or additionally, by routing at least a portion of the wireless data to a stationary node (to node 197 by operation 2056, e.g.).

Figure 21:
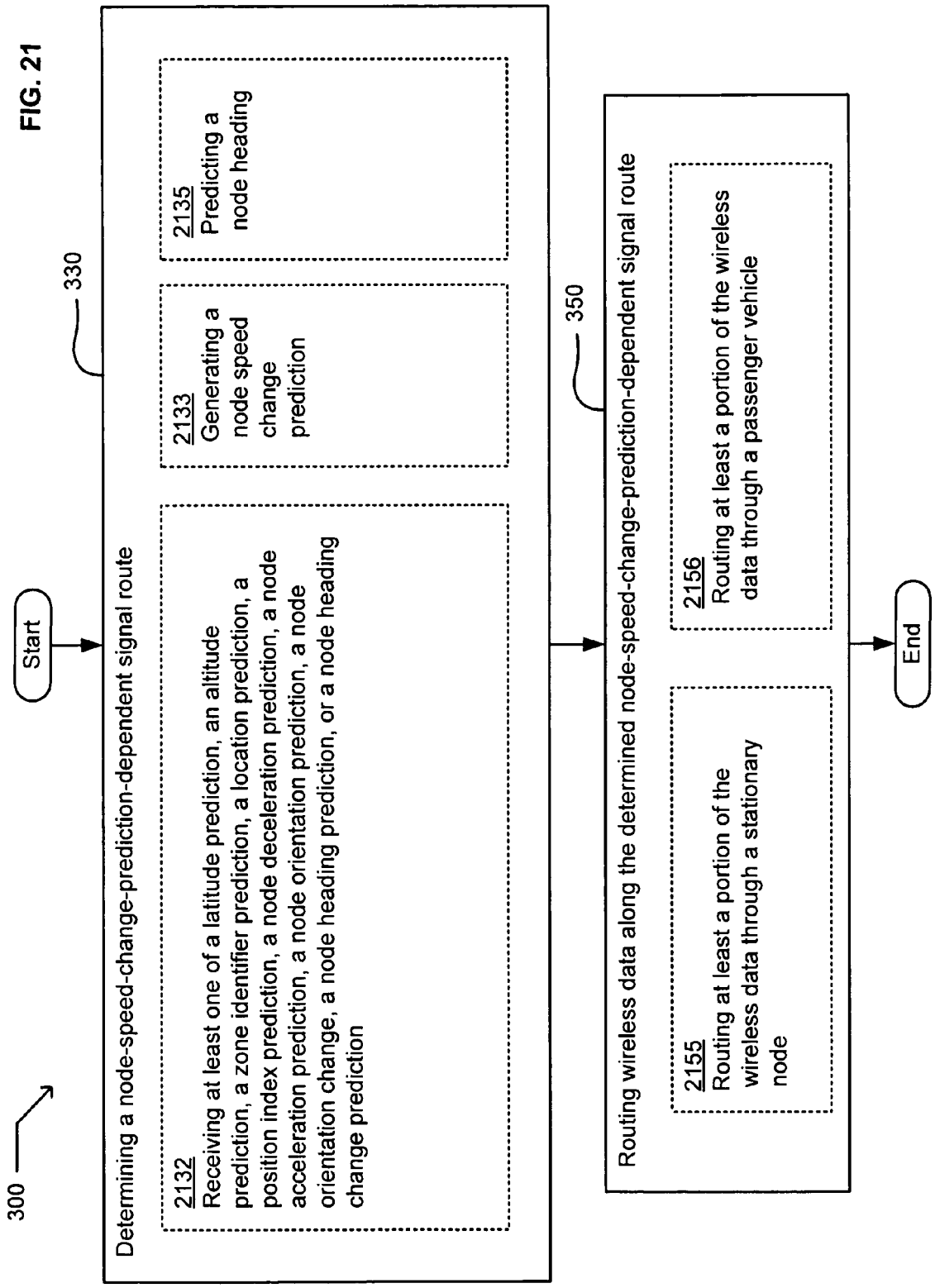
FIG. 21 shows further optional features defining variants of the flow of FIG. 3 or its variants.

Referring now to FIG. 21, there are further optional features defining variants of flow 300 of FIG. 3, 13, 14, 15, 16, 17, 18, 19, or 20. For example, network subsystem 1100 of FIG. 11 can perform one or more of operation 2132, operation 2133 or operation 2135. Operation 2132 includes receiving at least one of a latitude prediction, an altitude prediction, a zone identifier prediction, a location prediction, a position index prediction, a node deceleration prediction, a node acceleration prediction, a node orientation prediction, a node orientation change, a node heading prediction, or a node heading change prediction. Operation 2133 includes generating a node speed change prediction, optionally based on one or more items received in operation 2132 or one or more of operations 1531-1539. ("Generating" or "predicting" a value is not limited to computing a value anew, but can also include translating, updating or otherwise adjusting another value, for example, such as a prediction received at operation 1535 or operation 1537, e.g.) Network subsystem 1100 can also predict a node heading (by operation 2135, e.g.).

Referring again to FIG. 11, circuitry 1170 can perform operation 350 by performing operation 2155 or operation 2156. Circuitry 1170 can route at least a portion of the wireless data through a stationary node (such as tower 1183, by operation 2155). Alternatively or additionally, circuitry 1170 can route at least a portion of the wireless data through a passenger vehicle (such as through node 1182, which can be a passenger vehicle, by operation 2156).

Figure 22:
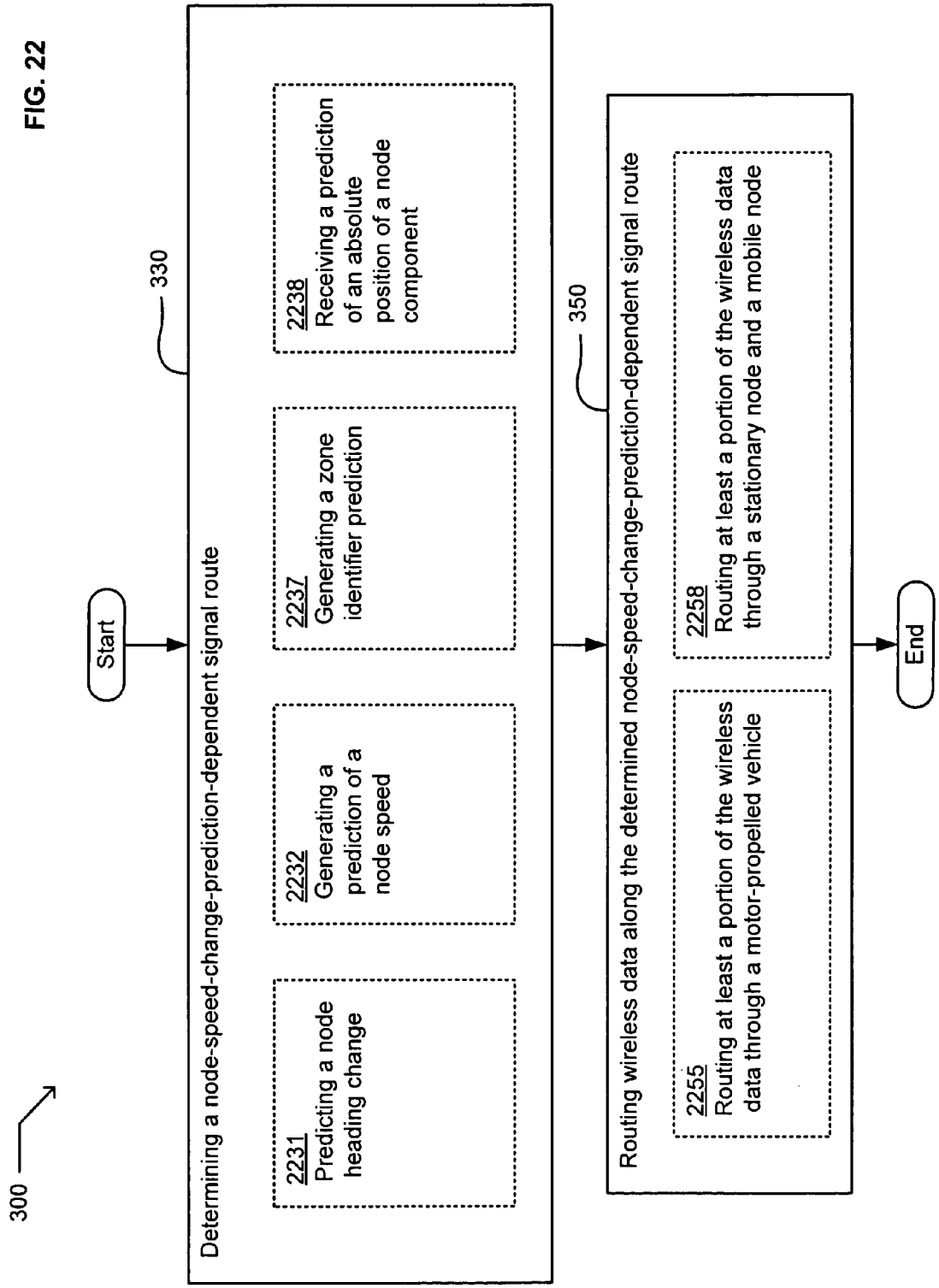
FIG. 22 shows further optional features defining variants of the flow of FIG. 3 or its variants.

Referring now to FIG. 22, there are further optional features defining variants of flow 300 of FIG. 3, 13, 14, 15, 16, 17, 18, 19, 20 or 21. For example, the operation 330 of determining a node-speed-change-prediction-dependent signal route can include one or more of an operation 2231 of predicting a node heading change, an operation 2232 of generating a prediction of a node speed, an operation 2237 of generating a zone identifier prediction, or an operation 2238 of receiving a prediction of an absolute position of a node component. One or more of operation 2231, operation 2232, operation 2237, or operation 2238 can be performed by system 1200 including signal-bearing medium 1240. Predicting operation 2231 is not limited to predicting the change by a route received from a vehicle navigation system, but can include using any statistical or other bases for prediction. Similarly, a "prediction" or predictive value may include a function of time, a single Boolean value, a prose description, a probabilistic model of future or other unknown behavior, or other characterization of a prediction.

System 1200 can perform operation 350 also, optionally by operation 2255 or by operation 2258. At operation 2255, system 1200 can route at least a portion of the wireless data through a motor-propelled vehicle. At operation 2258, system 1200 can route at least a portion of the wireless data through a stationary node and a mobile node, such as by transmitting an identifier of one or both of the nodes prior to a handshake operation for establishing a link to the identified node. Optionally, an identifier for the other of the nodes can later be included in a transmission through the link.

Figure 23:
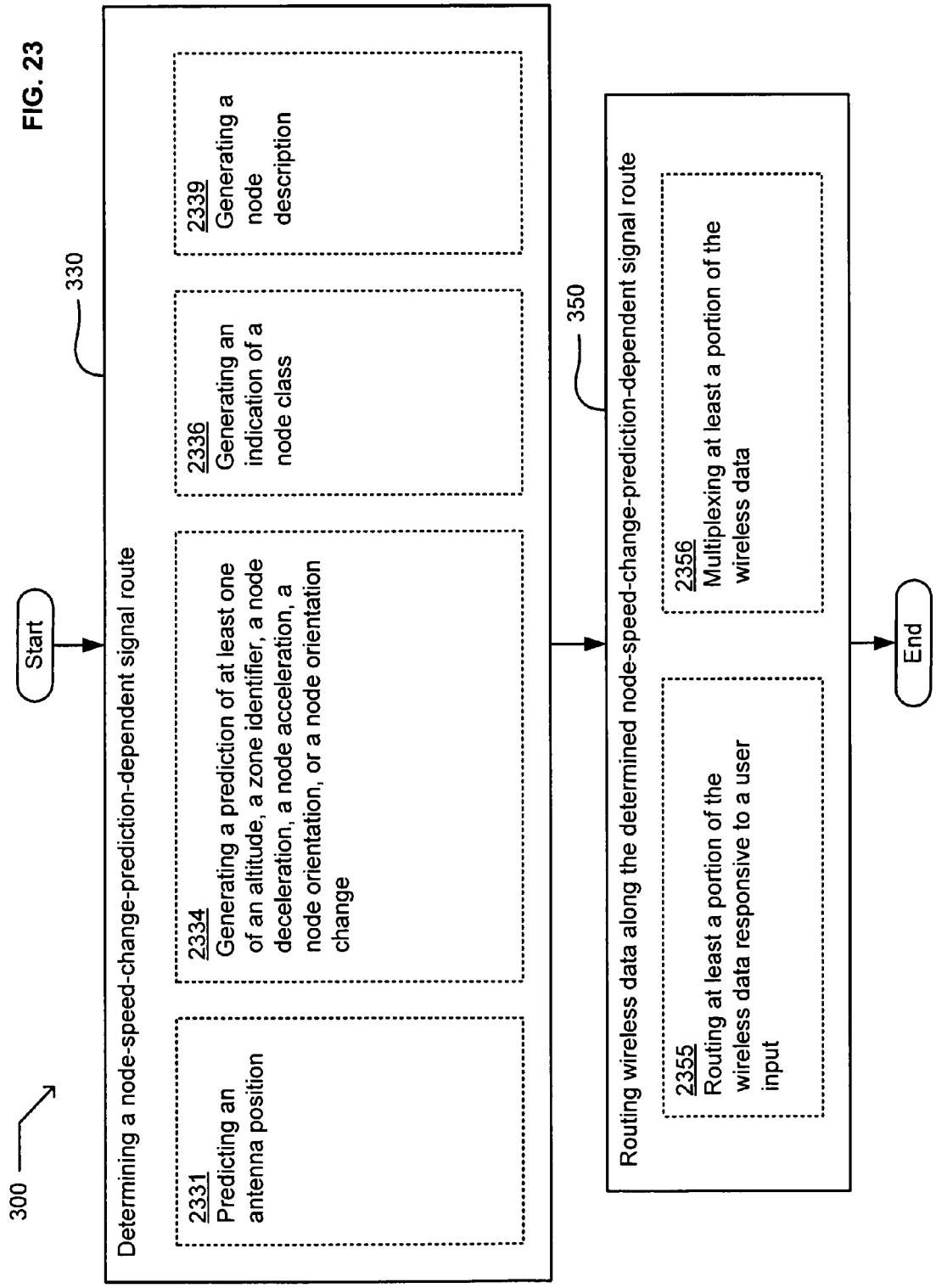
FIG. 23 shows further optional features defining variants of the flow of FIG. 3 or its variants.

Referring now to FIG. 23, there are further optional features defining variants of flow 300 of FIG. 3, 13, 14, 15, 16, 17, 18, 19, 20, 21, or 22. For example, the operation 330 of determining a node-speed-change-prediction-dependent signal route can include one or more of operation 2331, operation 2334, operation 2336, or operation 2339. Node 1060 of FIG. 10 can perform flow 300, optionally including operation 2331 of predicting an antenna position. The antenna position need not relate to an antenna of node 1060, but can relate to some other antenna having a motion pattern that node 1060 can predict, such as a steadily rotating antenna of a tower.

Node 1060 can also generate a prediction of at least one of an altitude, a zone identifier, a node deceleration, a node acceleration, a node orientation, or a node orientation change (by operation 2334, e.g.). For example, node 1060 can generate a prediction of a node orientation as defined in the column of operands 946. Such a generated value can optionally be used as an operand in a subsequent function call, or otherwise as a circuit input, alone or in concert with other operands. For example, node 1060 can also generate an indication of a node class (by operation 2336) or generate a node description (by operation 2339). The node class or other description can be used as a corresponding operand in a table like table 900.

In performing the operation 350 of routing wireless data along the determined node-speed-change-prediction-dependent signal route, node 1060 can perform operation 2355 of routing at least a portion of the wireless data responsive to a user input. A wireless link may already exist from node 1060 to another node within a wireless transmission range of node 1060 (such as node 1065 or node 1069, e.g.) as node 1060 tries to route a new message, for example, responsive to an earlier user input at node 1060. If so, node 1060 can take advantage of the existing link in routing at least a portion of the wireless data. The user input is not limited to an earlier input, but can be requested of the user in performing routing operation 2355.

Alternatively or additionally, node 1060 can perform operation 2356 of multiplexing at least a portion of the wireless data. For example, some or all of the data can be distributed across two or more parallel channels or multiplexed with other data through a single wireless channel.

Figure 24:
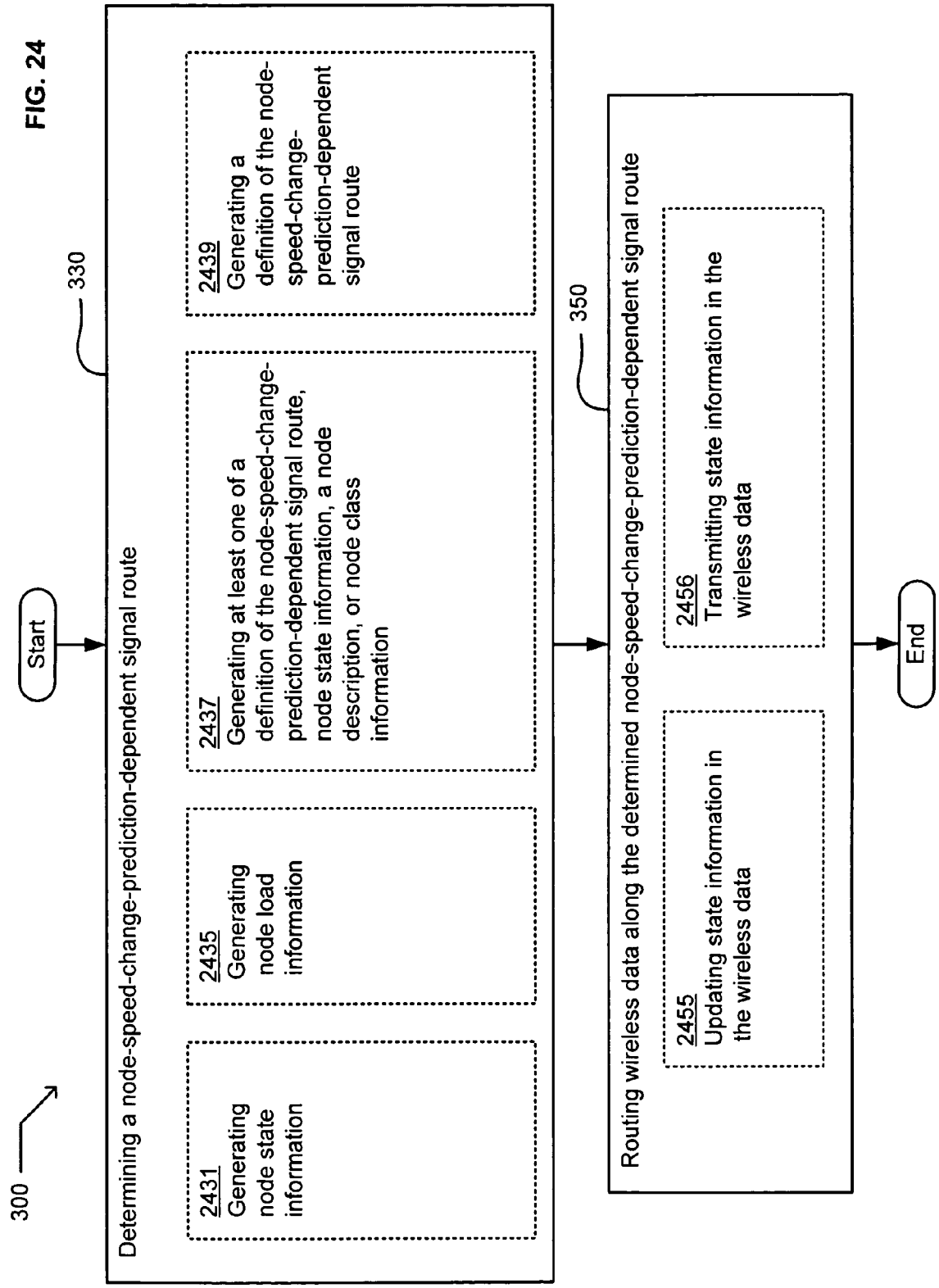
FIG. 24 shows further optional features defining variants of the flow of FIG. 3 or its variants.

Referring now to FIG. 24, there are further optional features defining variants of flow 300 of FIG. 3, 13, 14, 15, 16, 17, 18, 19, 20, 21, 22 or 23. For example, the operation 330 of determining a node-speed-change-prediction-dependent signal route can include one or more of operation 2431, operation 2435, operation 2437, or operation 2439. Operation 2431 includes generating node state information. Operation 2435 includes generating node load information. At operation 2437, a node or other system generates at least one of a definition of the node-speed-change-prediction-dependent signal route, node state information, a node description, or node class information. Operation 2439 includes generating a definition of the node-speed-change-prediction-dependent signal route. Module 750 of network subsystem 700 can perform one or more of operation 2431, operation 2435, operation 2437, or operation 2439, for example. The resulting information need not be used for routing or computations, but can alternatively or additionally be displayed via user interface 757 or stored by controller 759.

In performing the operation 350 of routing wireless data along the determined node-speed-change-prediction-dependent signal route, node circuitry 770 can perform one or more of updating state information in the wireless data (by operation 2455) or transmitting state information in the wireless data (by operation 2456).

Figure 25:
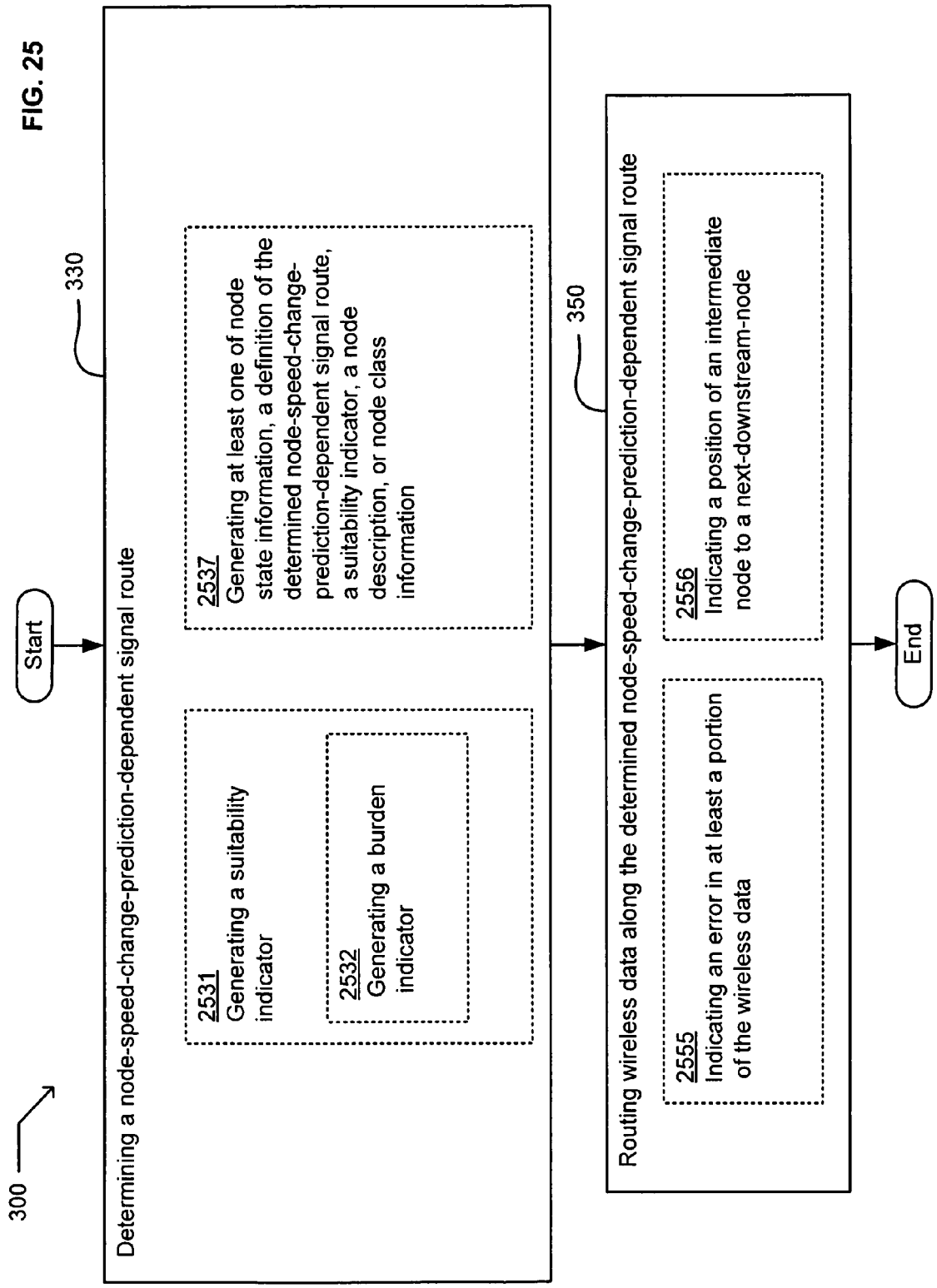
FIG. 25 shows further optional features defining variants of the flow of FIG. 3 or its variants.

Referring now to FIG. 25, there are further optional features defining variants of flow 300 of FIG. 3, 13, 14, 15, 16, 17, 18, 19, 20, 21, 22, 23, or 24. For example, the operation 330 of determining a node-speed-change-prediction-dependent signal route can include one or more of operation 2531, operation 2532, or operation 2537. Operation 2531 includes generating a suitability indicator, optionally by generating a burden indicator (by operation 2532). This illustrates how a suitability indicator can be expressed as a value that is inversely related to an actual suitability of a node. For example, if D is a variable such that D=0.9 for an unsuitable system, and D=0.3 for a moderately suitable system, and D =0.1 for a highly suitable system, then D can be a convenient burden indicator. Such values, generally ones that are inversely related to suitability, can be combined for evaluating a channel more exactly, in certain embodiments. With reference to channel 150 of FIG. 1, for example, operation 2532 can be performed by summing at least a burden indicator of node 154 with a burden indicator of node 156.

Operation 2537 includes generating at least one of node state information, a definition of the determined node-speed-change-prediction-dependent signal route, a suitability indicator, a node description, or node class information. Operation 2537 is optionally performed within a network subsystem that also performs operation 2555 (indicating an error in at least a portion of the wireless data) or operation 2556 (indicating a position of an intermediate node to a next-downstream-node). For example, in performing flow 300, node 154 of FIG. 1 can perform operation 2537 by generating a definition of the determined node-speed-change-prediction-dependent signal route, one that includes channel 150. In performing the routing operation 350, node 154 can indicate an error, for example by transmitting a re-send request to node 140. Alternatively, node 154 can indicate the error to trigger an error correction routine within node 154, or can forward the wireless data without any correction. Alternatively or additionally, node 154 can use link 155 to indicate its position (by one or more position indices) to next-downstream node 156.

Figure 26:
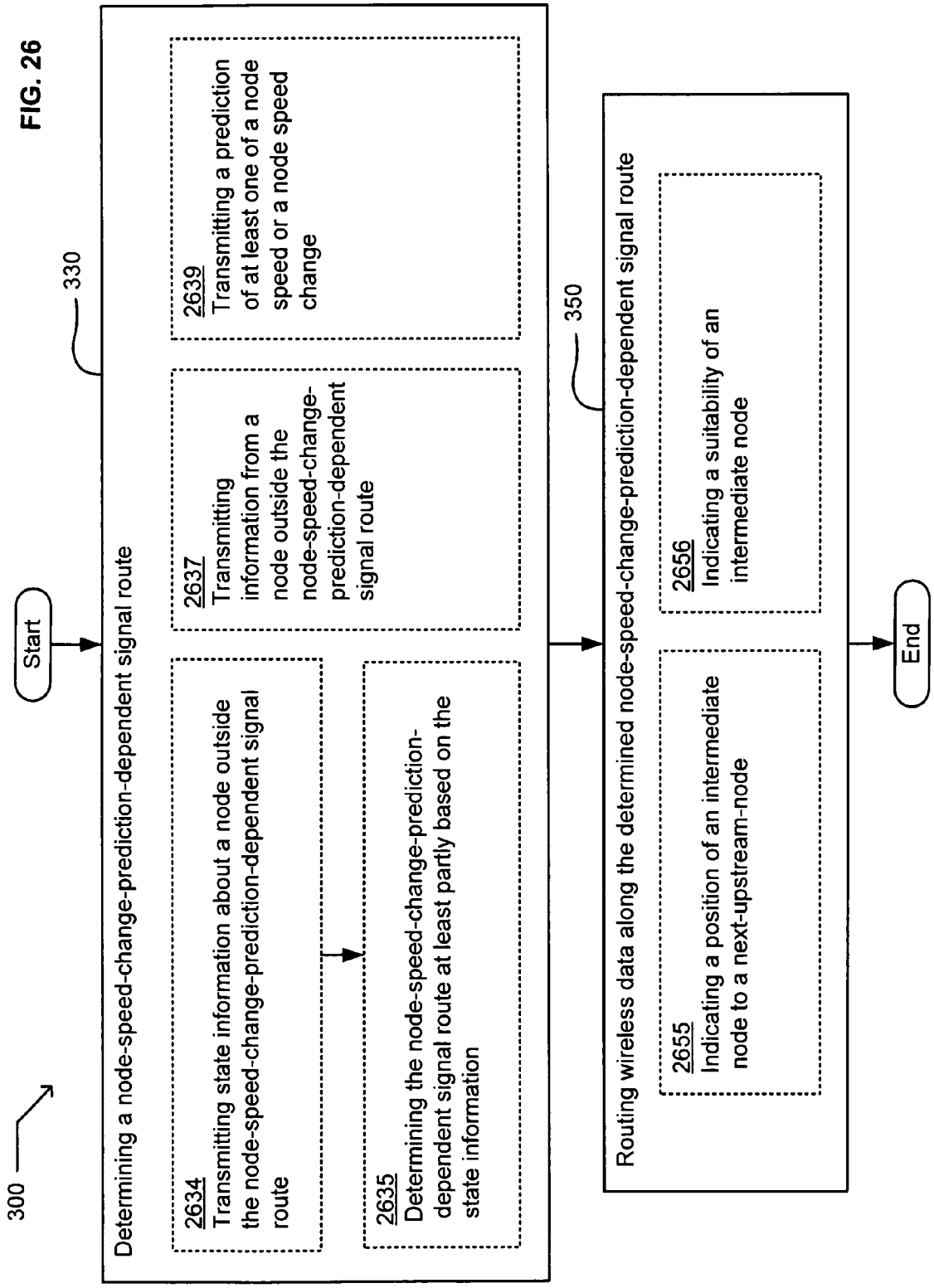
FIG. 26 shows further optional features defining variants of the flow of FIG. 3 or its variants.

Referring now to FIG. 26, there are further optional features defining variants of flow 300 of FIG. 3, 13, 14, 15, 16, 17, 18, 19, 20, 21, 22, 23, 24, or 25. For example, the operation 330 of determining a node-speed-change-prediction-dependent signal route can include one or more of operation 2634, operation 2635, operation 2637, or operation 2639. Any of these variants can be performed for example, alone or in concert with any of the optional features or operations described above with reference to FIG. 11. Processor 1153 can retrieve the state information about a node outside the node-speed-change-prediction-dependent signal route, for example, After such retrieval or other preparation, processor 1153 can transmit state information about a node outside the node-speed-change-prediction-dependent signal route (by operation 2634, e.g.) to circuitry 1170. Circuitry 1170 can then determine the node-speed-change-prediction-dependent signal route (through or around the node, by operation 2635, e.g.) at least partly based on the state information. Alternatively or additionally, circuitry 1170 performs operation 2639 of transmitting a prediction of at least one of a node speed or a node speed change. For example, circuitry 1170 can determine the signal route by operation 2635 and dependent on a prediction of a node speed change. Circuitry 1170 can store the prediction for a later transmission to a network server to facilitate network data aggregation.

In another embodiment, network subsystem 1100 can serve merely as a router. Subsystem 1100 can perform the determining operation 330 by determining a route from mobile node 1181 through node 1182 to tower 1183, for example. The determining operation 330 includes an operation 2637 of transmitting information from a node outside the node-speed-change-prediction-dependent signal route. For example, the information can include protocol information for completing a communication link from network subsystem 1100 to mobile node 1181.

In performing the operation 350 of routing wireless data along the determined node-speed-change-prediction-dependent signal route, circuitry 1170 can instruct node 1181 to transmit the wireless data to mobile node 1182. The routing operation 350 can also include one or more of indicating operation 2655 or indicating operation 2656. In indicating operation 2655, for example, circuitry 1170 can indicate a position of an intermediate node (node 1182, e.g.) to a next-upstream-node (node 1181, e.g.). In indicating operation 2656, circuitry 1170 can indicate a suitability of an intermediate node (node 1182, e.g.). The indication can be stored (in medium 1171, e.g.), used as an operational criterion (such as for determining a portion of the signal route), displayed, or transmitted to another node (such as tower 1183).

Figure 27:
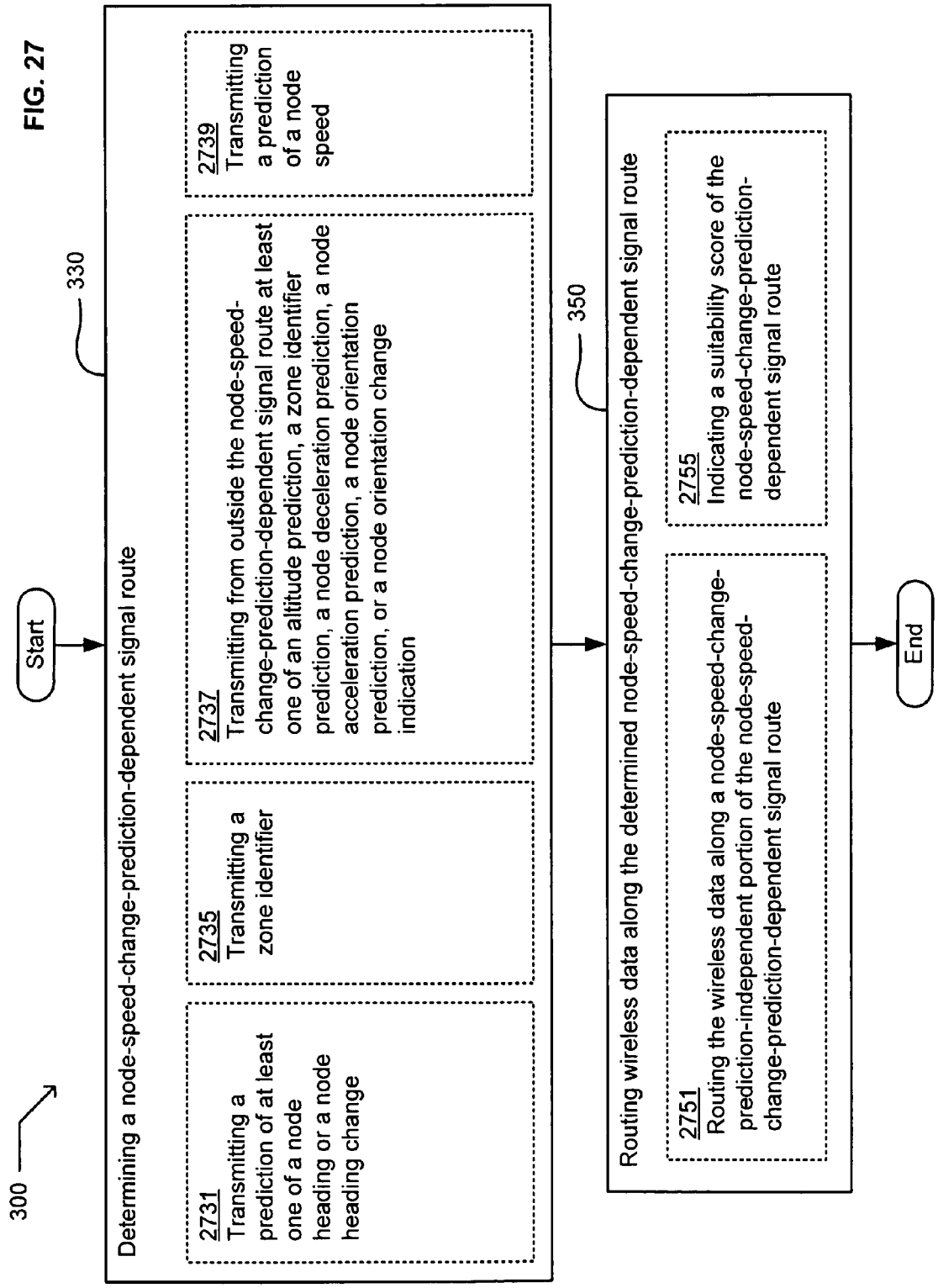
FIG. 27 shows further optional features defining variants of the flow of FIG. 3 or its variants.

Referring now to FIG. 27, there are further optional features defining variants of flow 300 of FIG. 3, 13, 14, 15, 16, 17, 18, 19, 20, 21, 22, 23, 24, 25 or 26. For example, the operation 330 of determining a node-speed-change-prediction-dependent signal route can include one or more of operation 2731, operation 2735, operation 2737, or operation 2739. Network subsystem 1100 can obtain and then transmit from outside the node-speed-change-prediction-dependent signal route at least one of an altitude prediction, a zone identifier prediction, a node deceleration prediction, a node acceleration prediction, a node orientation prediction, or a node orientation change indication (at operation 2737, e.g.). This information for transmission can describe node 1182, for example. Whether subsystem 1100 generates the prediction or obtains it in some other way, subsystem 1100 can perform the transmitting operation 2731 before, during or after other portions of the determining operation 330. This can likewise apply to transmitting a prediction of at least one of a node heading or a node heading change (operation 2731), transmitting a zone identifier (operation 2735) or transmitting a prediction of a node speed (operation 2739). Any of these transmitting operations 2731-2739 can optionally be performed by a network subsystem outside the node-speed-change-prediction-dependent signal route.

In performing the operation 350 of routing wireless data along the determined node-speed-change-prediction-dependent signal route, circuitry 1170 can optionally perform routing operation 2751 or indicating operation 2755. Circuitry 1170 can perform routing operation 2751 by routing the wireless data along a node-speed-change-prediction-independent portion of the node-speed-change-prediction-dependent signal route. Circuitry 1170 can perform indicating operation 2755 by indicating a suitability score of the node-speed-change-prediction-dependent signal route. Alternatively or additionally, circuitry 1170 can perform routing operation 1956 such as by routing the other wireless data along a parallel route, such as by a direct transmission through a free space medium to tower 1183. For a case in which network subsystem 1100 stays strictly outside the node-speed-change-prediction-dependent signal route, however, circuitry 1170 does not "send" any of the wireless data routed along the signal route, and subsystem 1100 is in that case inconsistent with awaiting operation 1956.

Figure 28:
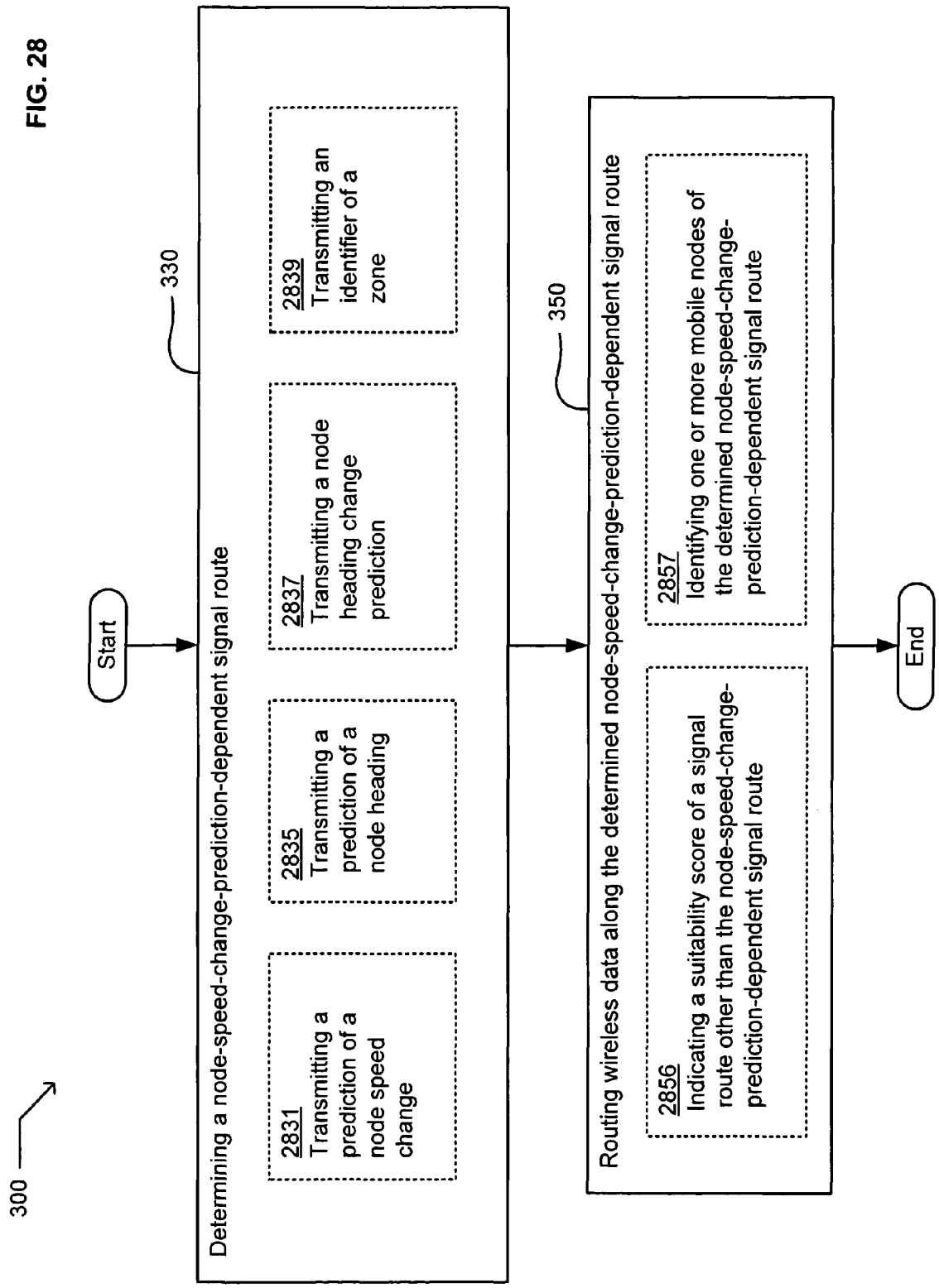
FIG. 28 shows further optional features defining variants of the flow of FIG. 3 or its variants.

Referring now to FIG. 28, there are further optional features defining variants of flow 300 of FIG. 3, 13, 14, 15, 16, 17, 18, 19, 20, 21, 22, 23, 24, 25, 26, or 27. For example, the operation 330 thereof can include one or more of operation 2831 of transmitting a prediction of a node speed change, operation 2835 of transmitting a prediction of a node heading, operation 2837 of transmitting a node heading change prediction, or operation 2839 of transmitting an identifier of a zone. Any of these transmitting operations 2831-2839 can be performed by any of the above-described nodes that receive or generate such a change, heading, prediction, identifier or related descriptive information. For example, referring again to FIG. 1, node 190 can receive and transmit such descriptive information through linkage 195 or via channel 162, optionally with a timestamp that describes the information. Such a timestamp can be used to evaluate the recency and reliability of the information, for example.

Node 140 can optionally perform one or more of operations 2831-2839 when performing flow 300. Alternatively or additionally, at operation 2856, node 140 can indicate a suitability score of a signal route other than the node-speed-change-prediction-dependent signal route. For example, node 140 can perform the determining operation 330 by comparing a suitability score of channel 150 with that of channel 160. Node 140 can determine the node-speed-change-prediction-dependent signal route 180 as including whichever of the channels was apparently more suitable, omitting the other channel from signal route 180. Node 140 can perform the indicating operation 2856 of the routing operation 350 for accumulating a history of suitability scores of selected and non-selected channels, for example. Node 140 can also identify one or more mobile nodes of the determined node-speed-change-prediction-dependent signal route, by operation 2857.

Figure 29:
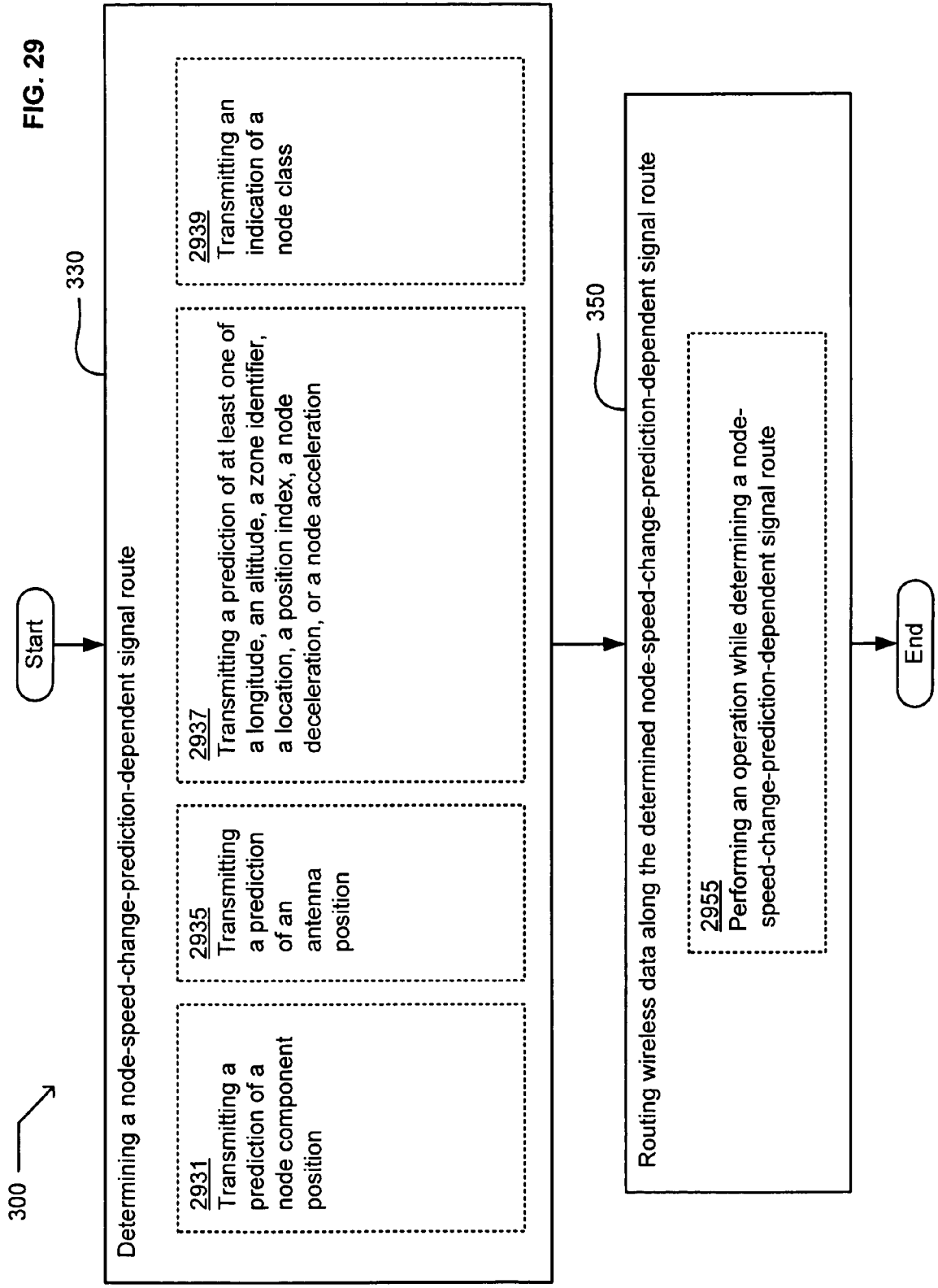
FIG. 29 shows further optional features defining variants of the flow of FIG. 3 or its variants.

Referring now to FIG. 29, there are more optional features relating to flow 300 and its multiple variants as describe above. For example, the operation 330 thereof can include one or more of operation 2931, operation 2935, operation 2937, or operation 2939. These are each a transmitting operation that can be performed as a part of flow 300 by network subsystem 220, for example. Module 225 can perform operation 2931 of transmitting a prediction of a node component position. Module 225 can further perform operation 2935 of transmitting a prediction of an antenna position, such as a position of an antenna of subsystem 220. Module 225 can also perform operation 2937 of transmitting a prediction of at least one of a longitude, an altitude, a zone identifier, a location, a position index, a node deceleration, or a node acceleration. Any, some, or all of these predictions can be either generated or received by module 225 before or during operation 2937. Alternatively or additionally, module 225 can transmit an indication of a node class (by operation 2939) after receiving or generating the indication.

Operation 2955 includes performing an operation (such as displaying operation 1858 or multiplexing operation 2356, e.g.) while determining a node-speed-change-prediction-dependent signal route (by one of the above-described variants of operation 330, e.g.). Subsystem 220 can perform operation 2955, for example, by using module 225 for the determining operation 330 while using circuitry 227 for performing the other operation. The "other" operation can include one or more of the above-described "indicating" operations (operation 2556, operation 2655, operation 2656, operation 2755, or operation 2856, e.g.) or one or more of the above-described variant "routing" operations (operation 1956, operation 2056, operation 2155, operation 2255, operation 2258, or operation 2355, e.g.) of routing operation 350, for example.

Figure 30:
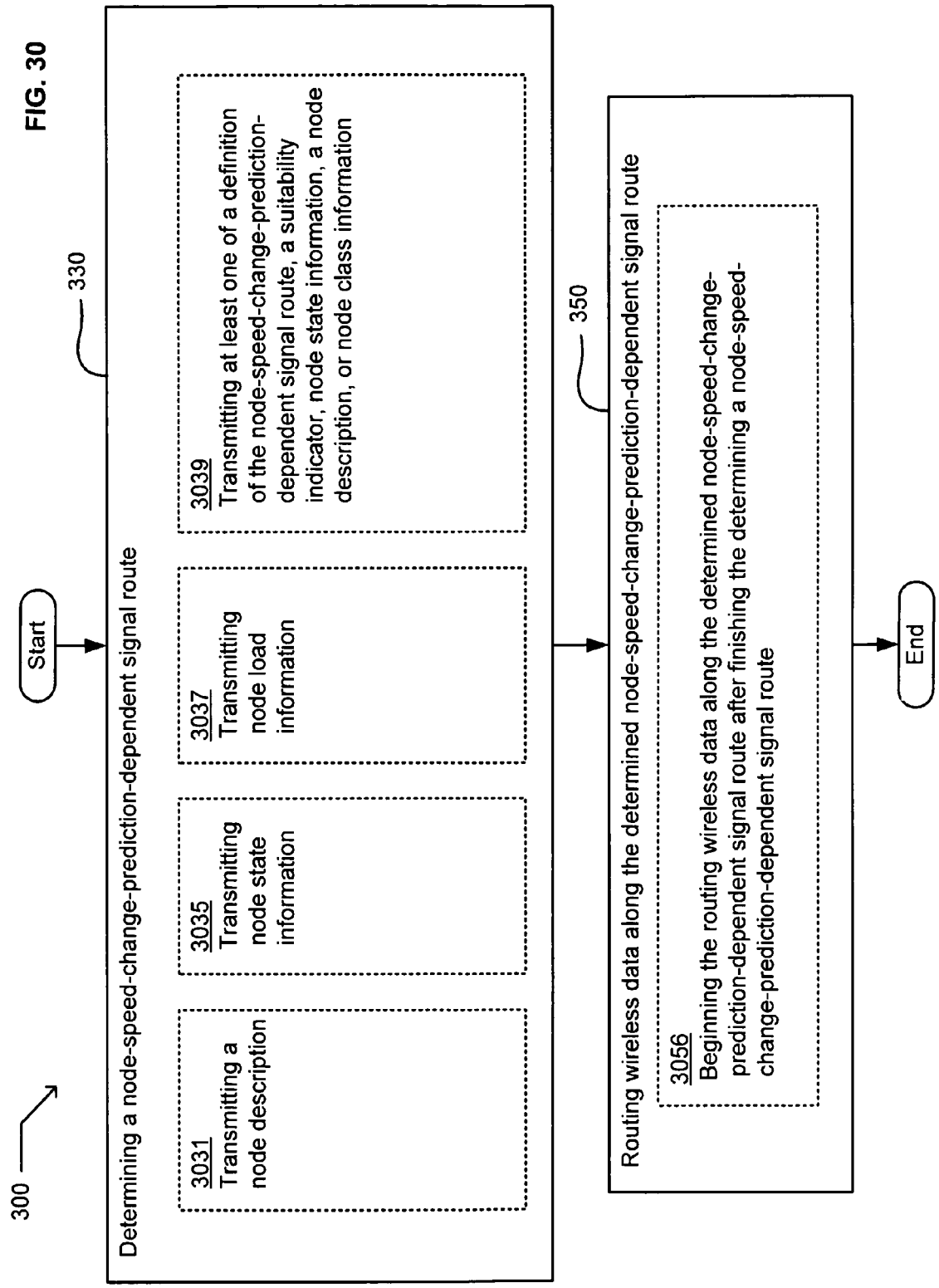
FIG. 30 shows further optional features defining variants of the flow of FIG. 3 or its variants.

Referring now to FIG. 30, there are further optional features relating to flow 300 and its multiple variant flows as describe above. For example, the operation 330 can include one or more of operation 3031 of transmitting a node description, operation 3035 of transmitting node state information, or operation 3037 of transmitting node load information. Part or all of channel 162 can perform flow 300 with one or more of these operations, such as by transmitting the information or other description from or about node 140 or node 190. Alternatively or additionally, part or all of channel 162 can transmit at least one of a definition of the node-speed-change-prediction-dependent signal route, a suitability indicator, node state information, a node description, or node class information, at operation 3039. One or more of these optionally describe a portion of channel 162. Channel 162 can optionally begin the routing wireless data along the determined node-speed-change-prediction-dependent signal route after finishing the determining a node-speed-change-prediction-dependent signal route, by operation 3056.

Figure 31:
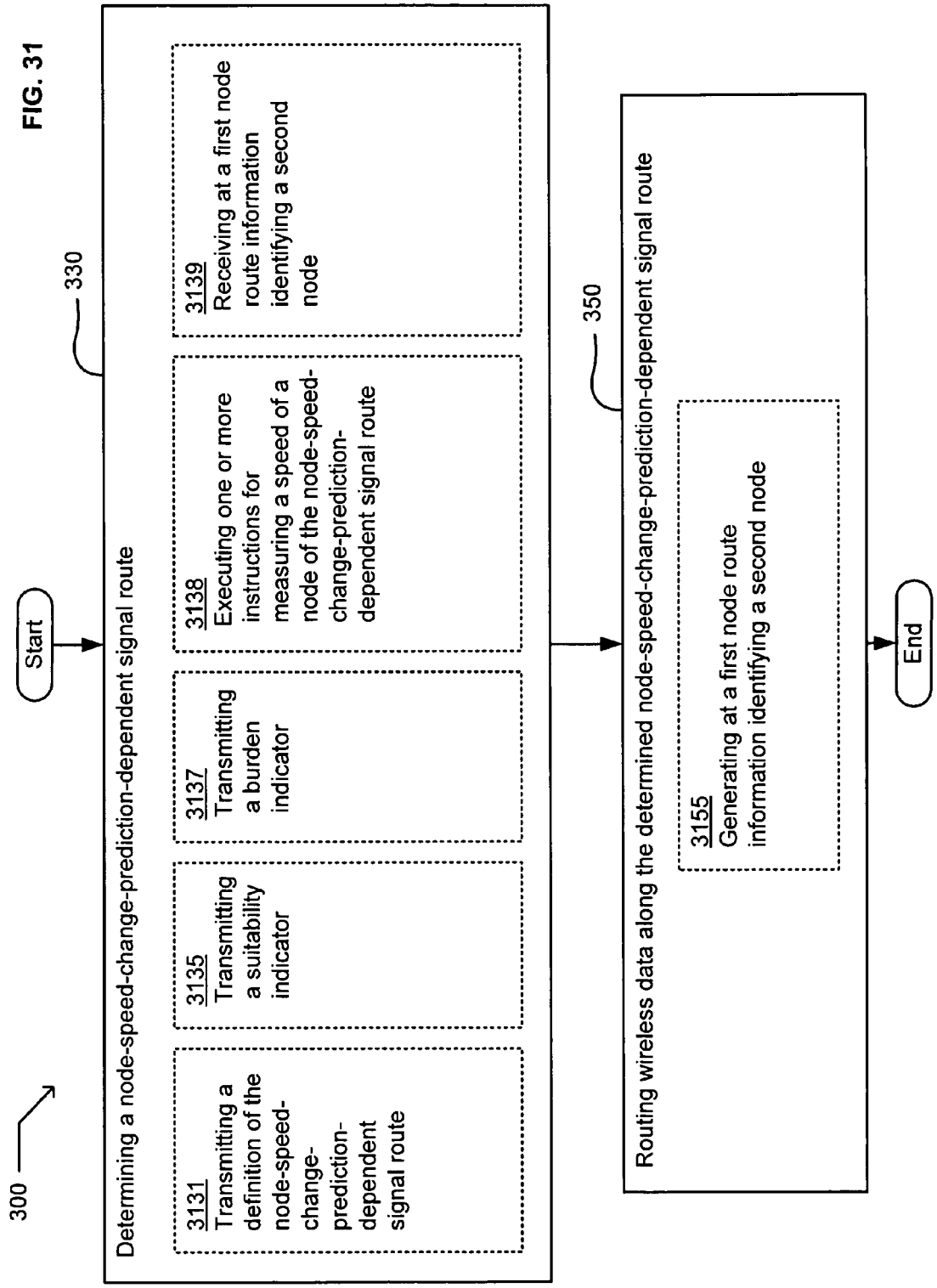
FIG. 31 shows further optional features defining variants of the flow of FIG. 3 or its variants.

Referring now to FIG. 31, there are further optional features relating to flow 300 and its multiple variant flows as describe above. For example, the operation 330 can include one or more of operation 3131, operation 3135, operation 3137, operation 3138, or operation 3139. Referring again to FIG. 1, for example, node 190 can perform the operation 3131 of transmitting a definition of the node-speed-change-prediction-dependent signal route, the operation 3135 of transmitting a suitability indicator, or the operation 3137 of transmitting a burden indicator. Any of these operations can cause information to be transmitted upstream via channel 162 or downstream via linkage 195, for example.

Some variants of flow 300 can be performed by controller 170, including many that incorporate one or more of executing operation 3138, receiving operation 3139, or generating operation 3155. Executing operation 3138 can be performed by executing one or more instructions for measuring a speed of a node of the node-speed-change-prediction-dependent signal route. For example, controller 170 can be configured as a device 600, including signal bearing medium 650 containing "one or more instructions for performing determining operation 330" of the instructions 653. The instructions 653 can further include the "one or more instructions for measuring a speed" for execution at operation 3138. Receiving operation 3139 includes receiving at a first node (such as node 140, e.g.) route information identifying a second node (such as a downstream node 154 or an upstream node 133, e.g.). Generating operation 3155 (of routing operation 350) includes generating at a first node (such as node 140, e.g.) route information identifying a second node (such as a node list including node 154 and node 156).

Figure 32:
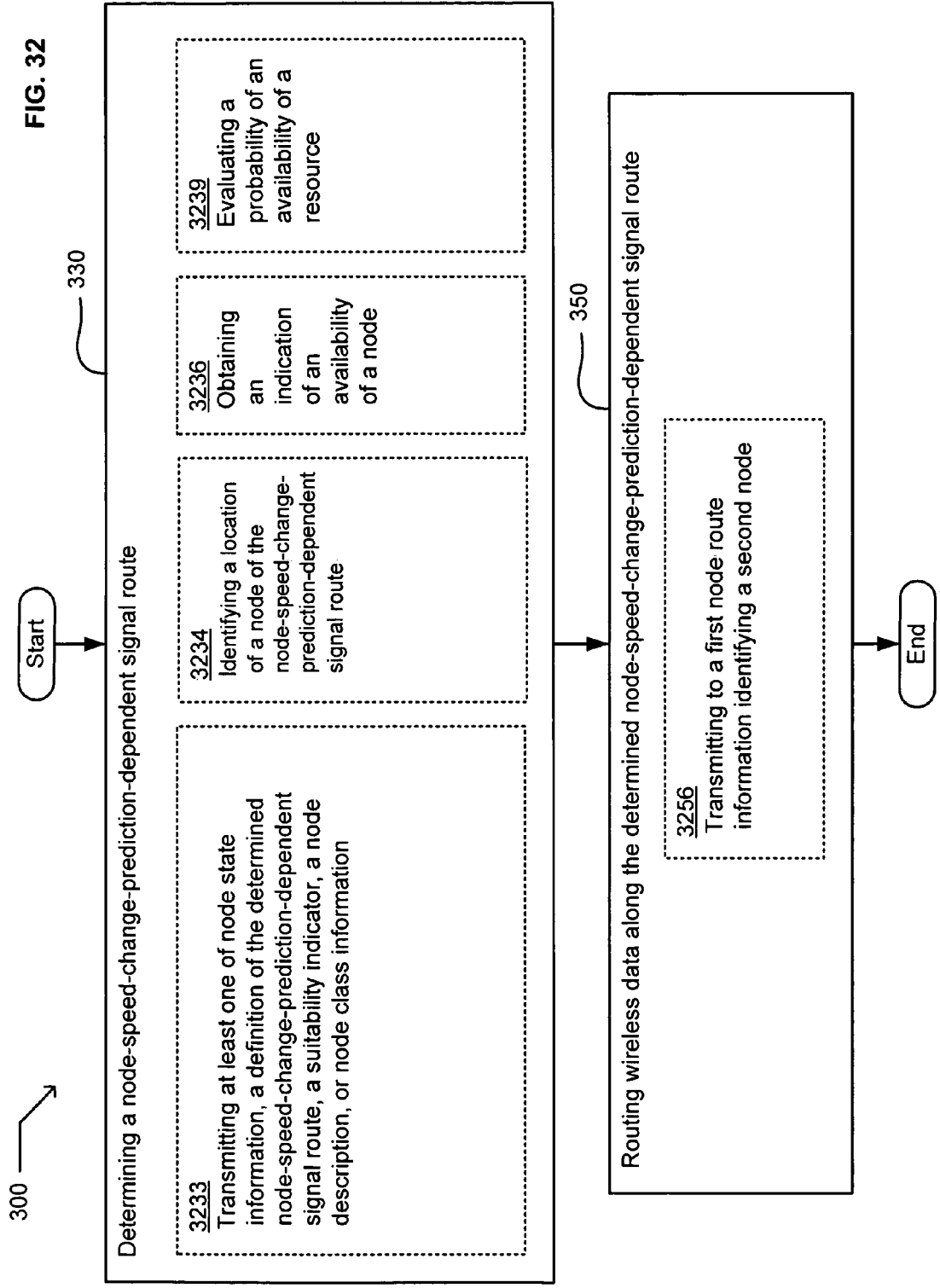
FIG. 32 shows further optional features defining variants of the flow of FIG. 3 or its variants.

Referring now to FIG. 32, there are further optional features relating to flow 300 and its multiple variant flows as describe above. For example, the operation 330 can include one or more of operation 3233, operation 3234, operation 3236, or operation 3239. Likewise the routing operation 350 can include a transmitting operation 3256. Any of these optional features can optionally be performed by network subsystem 110 performing flow 300. Module 1150 optionally transmits at least one of node state information, a definition of the determined node-speed-change-prediction-dependent signal route, a suitability indicator, a node description, or node class information (by operation 3233). Alternatively or additionally, module 1150 can perform one or more of operation 3239 of evaluating a probability of an availability of a resource or operation 3236 of obtaining an indication of an availability of a node. Module 1150 can optionally be configured to include a signal-bearing medium (such as memory 1159) bearing one or more instructions (such as instructions 653, e.g.) for identifying a location of a node (such as node 1181, e.g.) of the node-speed-change-prediction-dependent signal route (by operation 3234, e.g.). Circuitry 1170 can perform operation 3256 of transmitting to a first node route information identifying a second node.

Figure 33:
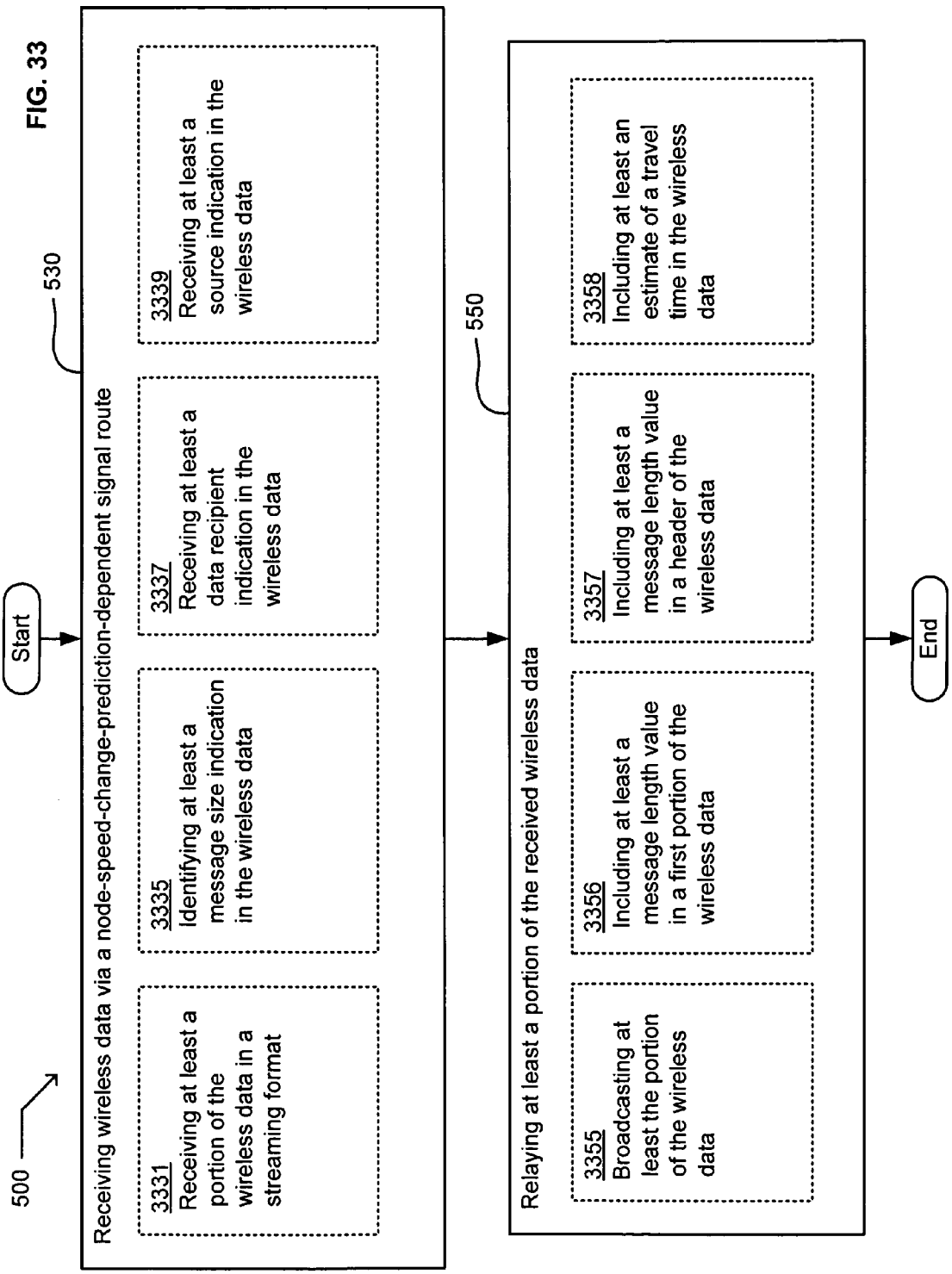
FIG. 33 shows several optional features each defining variants of the flows of FIG. 5.

Referring now to FIG. 33, there are shown several variants of flow 500 of FIG. 5, such as can be performed by network subsystem 700 of FIG. 7. Module 750 can optionally perform operation 530 of receiving wireless data via a node-speed-change-prediction-dependent signal route by performing one or more of receiving operation 3331, identifying operation 3335, receiving operation 3337, or receiving operation 3339. Receiving operation 3331 can be performed by receiving at least a portion of the wireless data in a streaming format. Identifying operation 3335 can be performed by identifying at least a message size indication in the wireless data, which can be used to estimate a transmission time or to characterize a load on a resource. Receiving operation 3337 can be performed by receiving at least a data recipient indication in the wireless data. Receiving operation 3339 can be performed by receiving at least a source indication in the wireless data. Optionally the recipient indication and/or source indication are included in the relayed portion of the wireless data.

Alternatively or additionally module 770 can optionally perform operation 550 of relaying at least a portion of the wireless data by performing one or more of broadcasting operation 3355, including operation 3356, including operation 3357, or including operation 3358. Broadcasting operation 3355 comprises broadcasting at least the portion of the wireless data. Including operation 3356 comprises including at least a message length value in a first portion of the wireless data. Including operation 3357 comprises including at least a message length value in a header of the wireless data. Including operation 3358 comprises including at least an estimate of a travel time in the wireless data. The travel time can describe a movement of a signal or data set, or a movement to a physical object or system, for example. One or more intermediate nodes can use the estimate in making a routing decision, such as by module 1150 determining the signal route dependent on a destination-node-movement speed.

Figure 34:
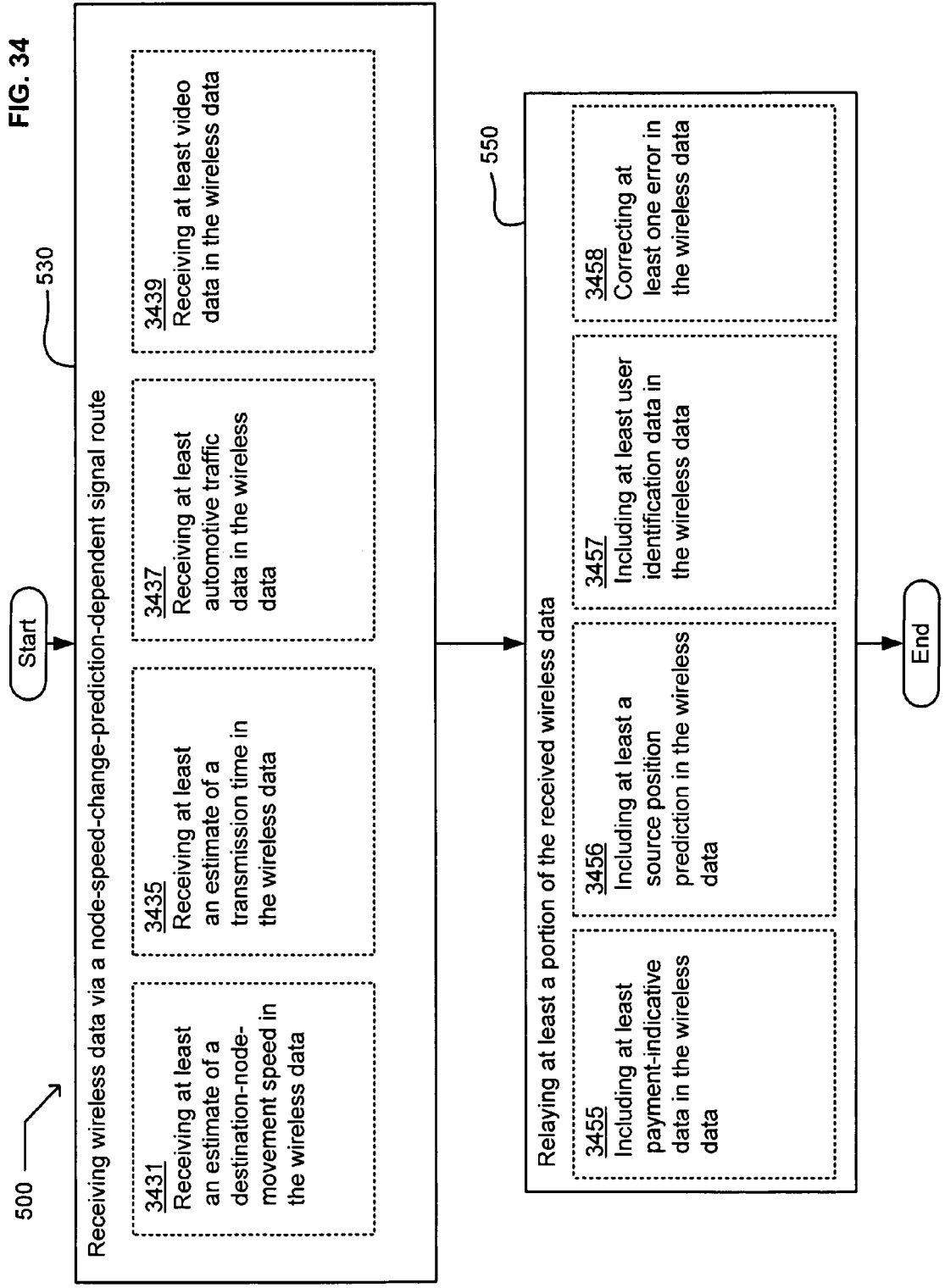
FIG. 34 shows several optional features each defining variants of the flows of FIG. 5 or their variants of FIG. 33.

Referring now to FIG. 34, there are shown several variants of flow 500 of FIG. 5 or 33, such as can be performed by network subsystem 700 of FIG. 7. Module 750 can optionally perform operation 530 of receiving wireless data via a node-speed-change-prediction-dependent signal route by performing one or more of operation 3431, operation 3435, operation 3437, or operation 3439. Operation 3431 comprises receiving at least an estimate of a destination-node-movement speed in the wireless data. Operation 3435 comprises receiving at least an estimate of a transmission time in the wireless data. Operation 3437 comprises receiving at least automotive traffic data in the wireless data. Operation 3439 comprises receiving at least video data in the wireless data.

Additionally or alternatively, module 770 can optionally perform operation 550 of relaying at least a portion of the wireless data by performing one or more of operation 3455, operation 3456, operation 3457, or operation 3458. Operation 3455 comprises including at least payment-indicative data in the wireless data. Operation 3456 comprises including at least a source position prediction in the wireless data. Part or all of the prediction optionally affects a routing decision or a message content. Operation 3457 comprises including at least user identification data in the wireless data. The data can be received from a user who sent the wireless data from a source node, for example. Operation 3458 comprises correcting at least one error in the wireless data, for example by using an error correction code or other constraint describing at least some of the data received at operation 530.

Figure 35:
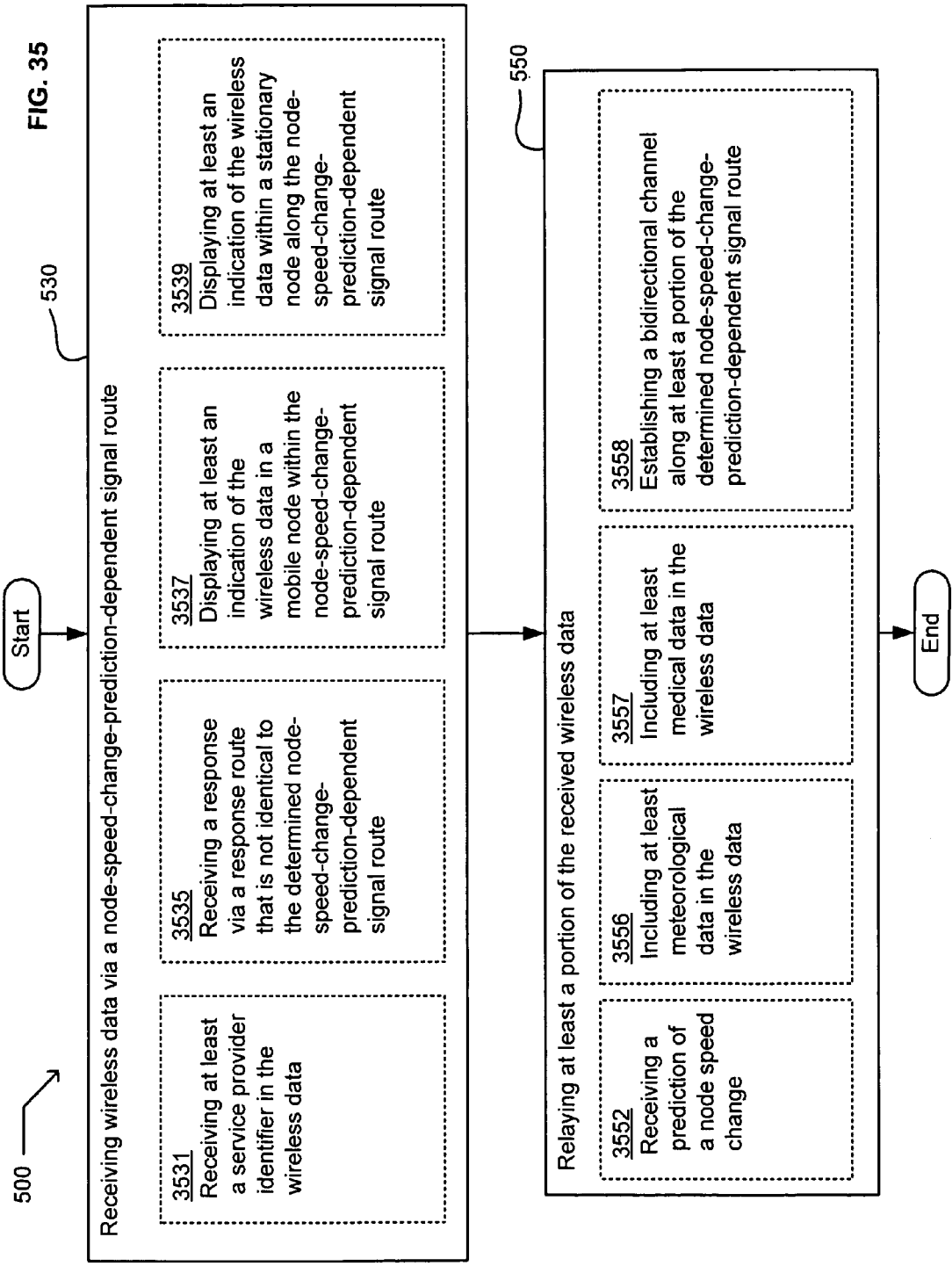
FIG. 35 shows several optional features each defining variants of the flows of FIG. 5 or their variants.

Referring now to FIG. 35, there are shown several variants of flow 500 of FIG. 5, 33, or 34, such as can be performed by network subsystem 800 of FIG. 8. Antenna system 839 can optionally perform operation 530 of receiving wireless data via a node-speed-change-prediction-dependent signal route by performing one or more of operation 3531, operation 3535, operation 3537, or operation 3539. Operation 3531 comprises receiving at least a service provider identifier in the wireless data. The received identifier need not be a company name but can include a network identifier, a service mark, or similar code or other name. Flow 500 optionally includes using the identifier in some fashion other than relaying it, such as by deciding whether to relay or broadcast the data portion at least partly dependent on the received identifier. Operation 3535 comprises receiving a response via a response route that is not identical to the determined node-speed-change-prediction-dependent signal route. For example, the response route is optionally generated after the relaying operation 550 is complete. Alternatively or additionally, subsystem 800 can define a circuitous data flow route through a destination node, fully specifying the response route to the destination node. Operation 3537 comprises displaying at least an indication of the wireless data in a mobile node within the node-speed-change-prediction-dependent signal route. For example, some or all of the received data may be displayed to user 885 via interface 836. Operation 3539 comprises displaying at least an indication of the wireless data within a stationary node along the node-speed-change-prediction-dependent signal route. For example, the indication may include displaying a title or owner or other message or network attribute(s), video or other content data, an indication of a data type or format, a transmission duration or size, or merely a "busy" light or icon.

Additionally or alternatively, communication system 830 can perform operation 550 of relaying at least a portion of the wireless data by performing one or more of operation 3552, operation 3556, operation 3557, or operation 3558. Operation 3552 comprises receiving a prediction of a node speed change. The prediction may relate to a node within the signal route or to a candidate for addition to a signal route, for example, or to some other node as may be convenient for regular or occasional sharing of useful routing information. The node may be redundant at the time of the relaying operation, for example, but become important later. Operation 3556 comprises including at least meteorological data in the wireless data. Operation 3557 comprises including at least medical or meteorological data in the wireless data. (Medical and meteorological data can be difficult to access or communicate satisfactorily by conventional techniques, especially from or at locations inadequately serviced by stationary antennas.).

Module 1150 of FIG. 11 can likewise perform operation 530, optionally including operation 3539 of displaying at least an indication of the wireless data within a stationary node along the node-speed-change-prediction-dependent signal route. Processor 1153 of module 1150 can optionally be configured to perform this operation, for example, in an embodiment in which the stationary node includes module 1150.

Alternatively or additionally, circuitry 1170 can perform the operation 550 of relaying at least a portion of the wireless data, optionally including operation 3558 of establishing a bidirectional channel along at least a portion of the determined node-speed-change-prediction-dependent signal route. Transceiver 1174 of circuitry 1170 can be configured to perform this operation, for example, by establishing the bidirectional channel (across a free space medium directly) to mobile node 1181.

Figure 36:
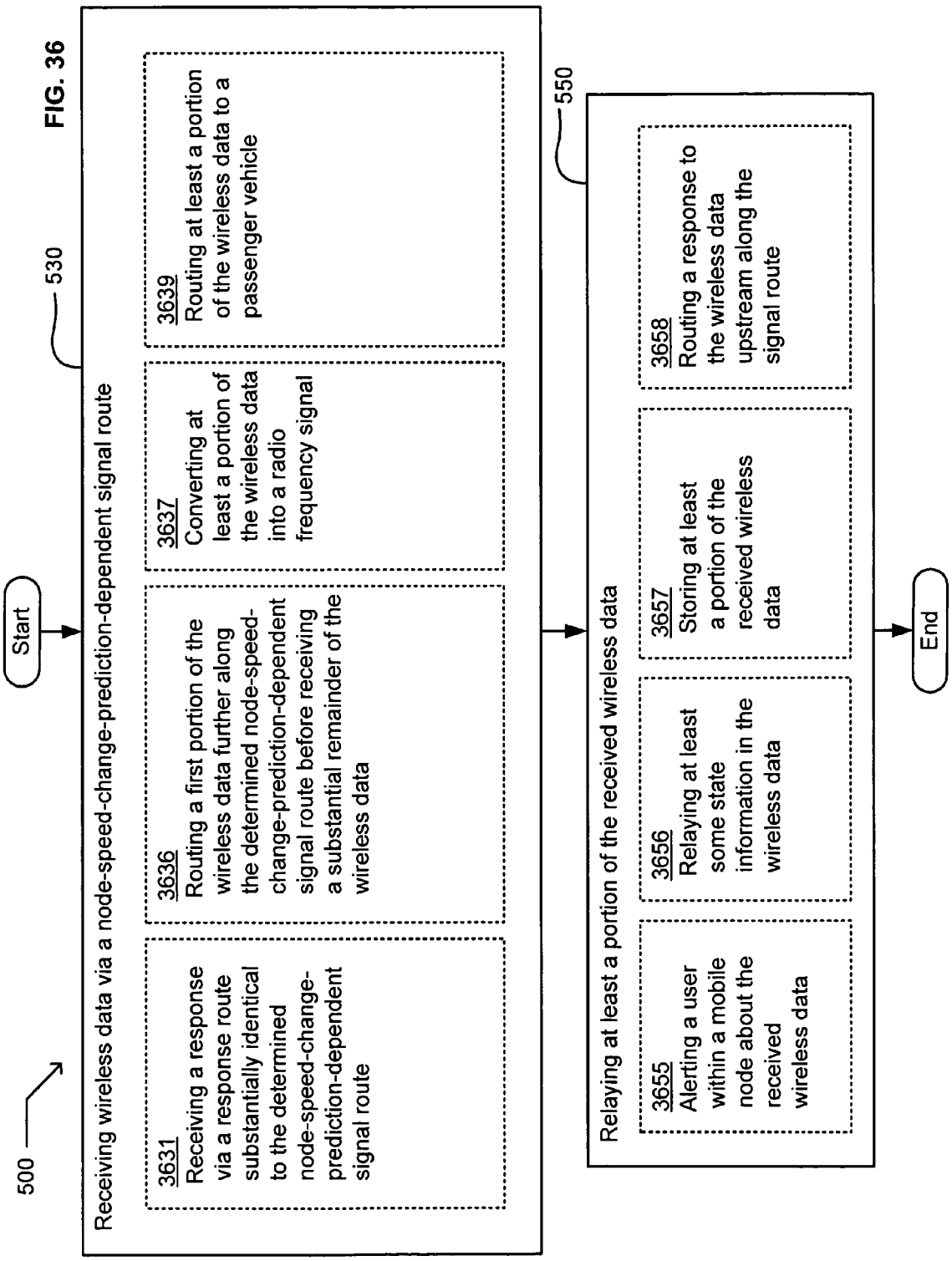
FIG. 36 shows several other optional features each defining variants of the flows of FIG. 5 or their variants.

Referring now to FIG. 36, there are shown several variants of flow 500 of FIG. 5, 33, 34, or 35. Network subsystem 700 of FIG. 7 can optionally be configured to perform one or more of these variants. Module 750 can optionally perform operation 530 of receiving wireless data via a node-speed-change-prediction-dependent signal route by performing one or more of operation 3631, operation 3636, operation 3637, or operation 3639. Antenna 754 can be configured to perform the operation 3631 of receiving a response via a response route substantially identical to the determined node-speed-change-prediction-dependent signal route, for example. Alternatively or additionally, controller 759 can be configured for performing the operation 3636 of routing a first portion of the wireless data further along the determined node-speed-change-prediction-dependent signal route (via circuitry 770, e.g.) before receiving a substantial remainder of the wireless data. Amplifier 751 can be configured to perform the operation 3637 of converting at least a portion of the wireless data into a radio frequency signal. This can be useful in an embodiment in which module 750 is not linked to circuitry 770 by any conduit, for example, to facilitate a short-range wireless transmission to circuitry 770 of some or all of the received data. Alternatively or additionally, controller 758 can perform the operation 3639 of routing at least a portion of the wireless data to a passenger vehicle. Controller 758 can do so by identifying the passenger vehicle with the data to be transmitted to the circuitry 770, for example.

Circuitry 770 can optionally perform operation 550 of relaying at least a portion of the wireless data by performing one or more of operation 3655, operation 3656, operation 3657, or operation 3658. Circuitry 770 can optionally perform operation 3655 of alerting a user within a mobile node about the received wireless data. For example, controller 778 can optionally be configured to alert the user. Subsystem 700 can be a tower or other stationary structure or a hand-held device operable to alert the user.

Alternatively or additionally, controller 778 can also be a vehicle having a driver or other occupant as the user within the mobile node. Controller 778 can optionally perform operation 3656 of relaying at least some state information in the wireless data. Memory 779 can optionally perform operation 3657 of storing at least a portion of the received wireless data. Circuitry 770 can optionally perform operation 3658 of routing a response to the wireless data upstream along the signal route. The response can include an acknowledgment or an asynchronous signal, for example.

Figure 37:
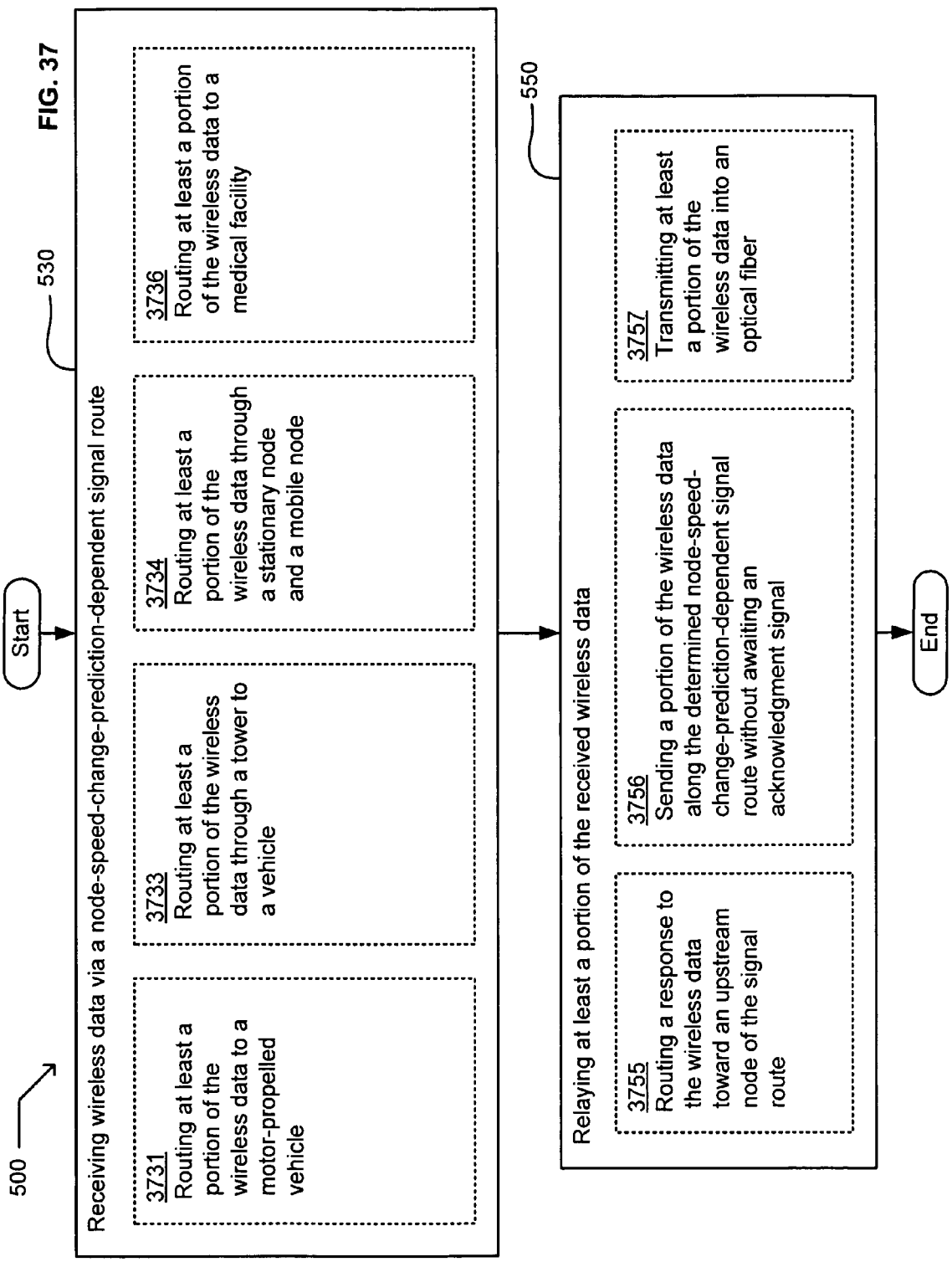
FIG. 37 shows several other optional features each defining variants of the flows of FIG. 5 or their variants.

Referring now to FIG. 37, there are shown several variants of flow 500 of FIG. 5, 33, 34, 35 or 36. Node 140 of FIG. 1 can optionally be configured to perform one or more of these variants, for example. Node 140 can likewise perform one or more of operation 3731 of routing at least a portion of the wireless data to a motor-propelled vehicle, operation 3733 of routing at least a portion of the wireless data through a tower to a vehicle, or operation 3736 of routing at least a portion of the wireless data to a medical facility. A "motor-propelled vehicle" is not limited to a vehicle currently in transit, but also includes motorized vehicles that are stationary and/or powered off. Alternatively or additionally, node 140 can perform operation 3734 of routing at least a portion of the wireless data through a stationary node and a mobile node. The stationary node and the mobile node can be node 154 and node 156, for example, optionally respectively.

Alternatively or additionally, node 140 can perform one or more of operation 3755 of routing a response to the wireless data toward an upstream node of the signal route or operation 3757 of transmitting at least a portion of the wireless data into an optical fiber. Node 140 can likewise perform operation 3756 of sending a portion of the wireless data along the determined node-speed-change-prediction-dependent signal route without awaiting an acknowledgment signal. Operation 3756 does not preclude taking some other action responsive to an acknowledgment signal, though, such as sending another portion.

Figure 38:
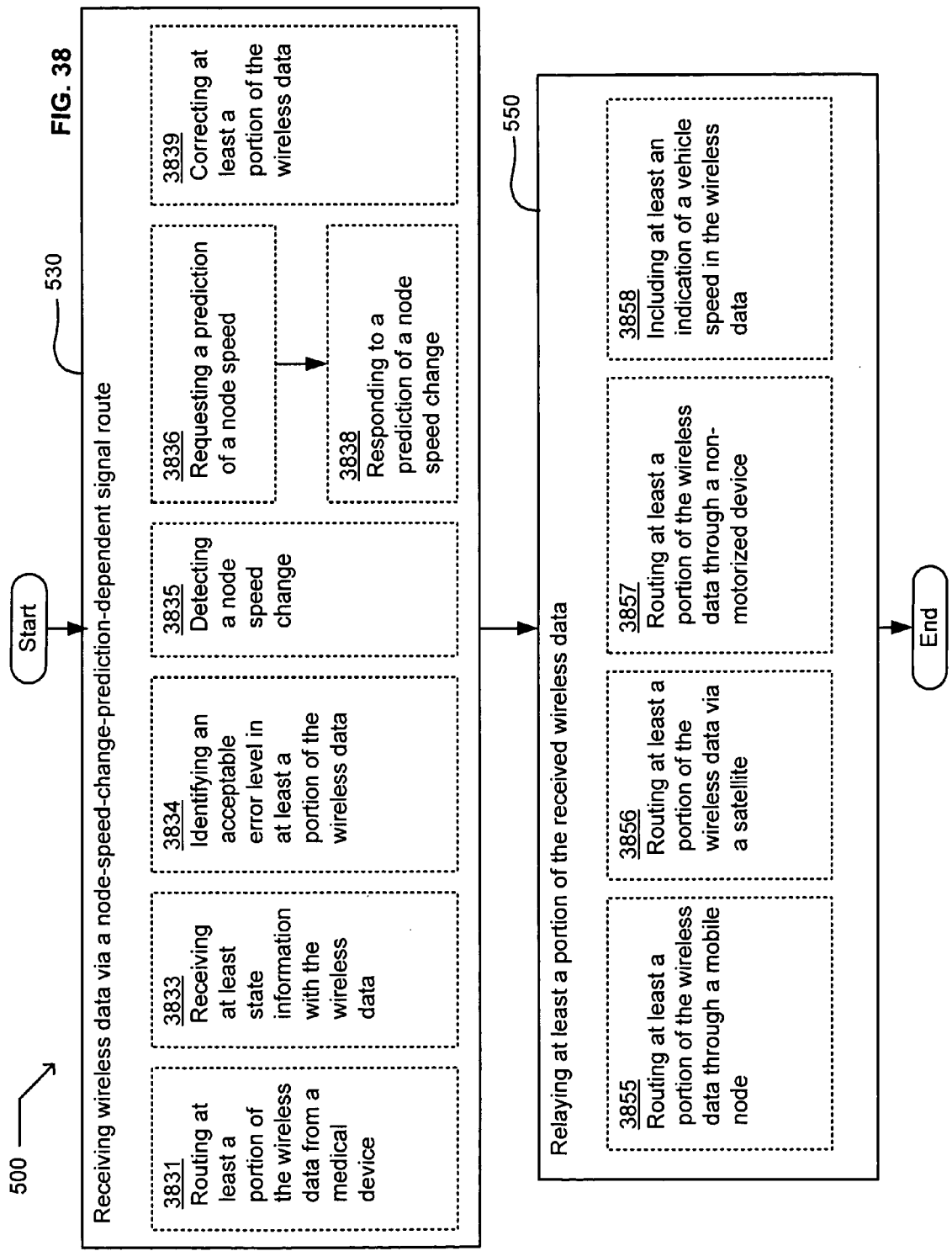
FIG. 38 shows several other optional features each defining variants of the flows of FIG. 5 or their variants.

Referring now to FIG. 38, there are shown several variants of flow 500 of FIG. 5, 33, 34, 35, 36 or 37. Node 154 of FIG. 1 can optionally be configured to perform one or more of these variants. Node 154 can perform one or more of operation 3831 of routing at least a portion of the wireless data from a medical device, operation 3833 of receiving at least state information with the wireless data, operation 3834 of identifying an acceptable error level in at least a portion of the wireless data, operation 3835 of detecting a node speed change, or operation 3839 of correcting at least a portion of the wireless data. Alternatively or additionally, node 154 can perform operation 3836 of requesting a prediction of a node speed change. Node 154 can perform operation 3838 of responding to a prediction of a node speed change, for example after receiving a response or other information that includes a prediction of a node speed change, Alternatively or additionally, node 156 is configured to perform part or all of flow 500, including performing relaying operation 550 by performing one or more of operation 3855, operation 3856, operation 3857, or operation 3858. Operation 3855 comprises routing at least a portion of the wireless data through a mobile node (which can be node 190, e.g.). Operation 3856 comprises routing at least a portion of the wireless data via a satellite (which can be node 190, e.g.). Operation 3857 comprises routing at least a portion of the wireless data through a non-motorized device (which can be node 190, e.g.). Operation 3858 comprises including at least an indication of a vehicle speed in the wireless data. Optionally the speed describes a measured or estimated speed of a vehicle having a wireless communication device such as a receiver.

Figure 39:
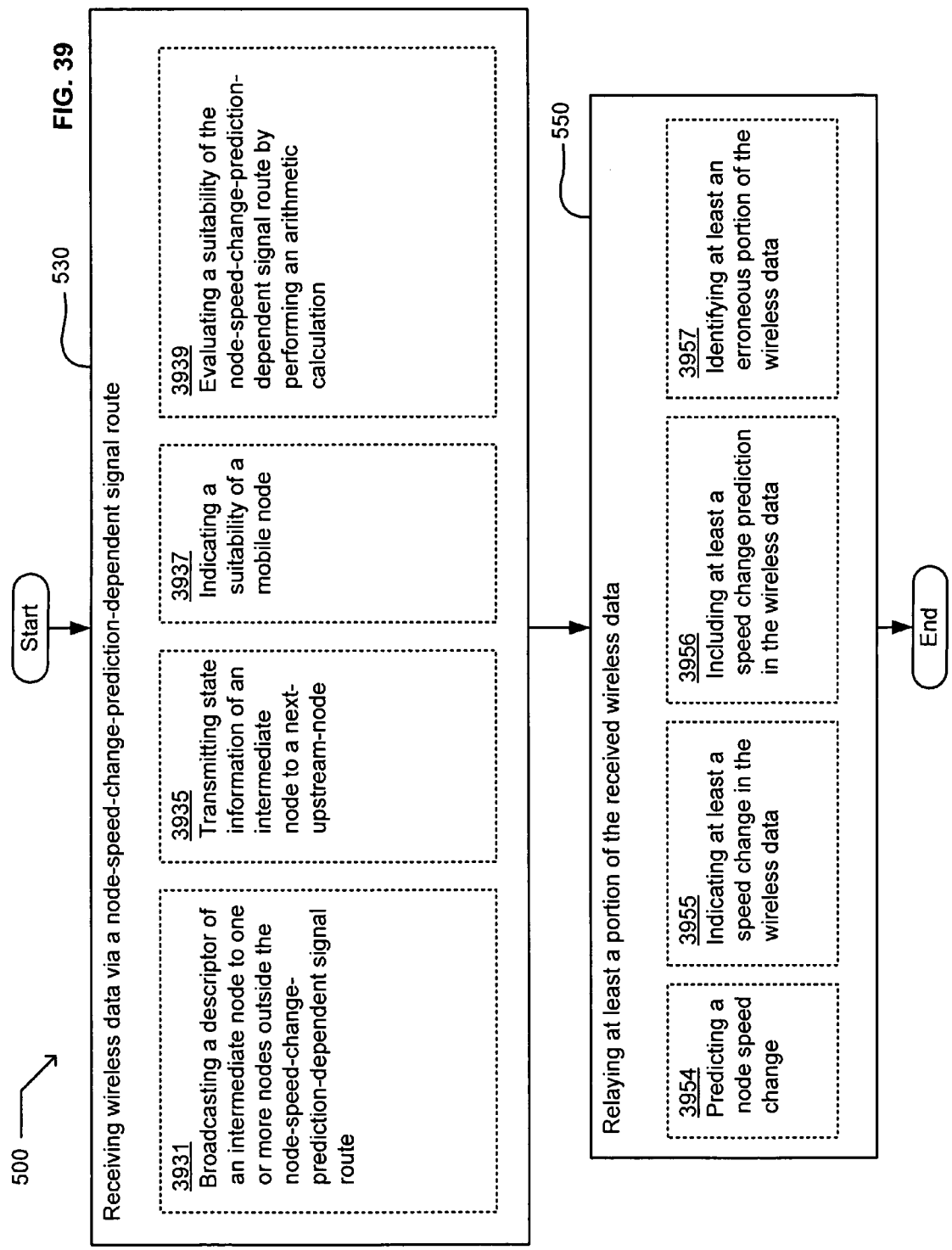
FIG. 39 shows several other optional features each defining variants of the flows of FIG. 5 or their variants.

Referring now to FIG. 39, there are shown several variants of flow 500 of FIG. 5, 33, 34, 35, 36, 37, or 38. Node 154 of FIG. 1 can optionally be configured to perform one or more of these variants that include one or more of operation 3931, operation 3935, operation 3937, or operation 3939. Operation 3931 includes broadcasting a descriptor of an intermediate node to one or more nodes outside the node-speed-change-prediction-dependent signal route. The broadcast operation 3931 can optionally be performed by the intermediate node (such as by node 154, e.g.). Alternatively, a node (such as node 154) can broadcast a descriptor of a downstream intermediate node (such as node 156, e.g.), an upstream intermediate node (such as node 140, e.g.), or a node (such as node 190, e.g.) that is not consecutive with the broadcasting node. A node that receives the descriptor can be a destination node (such as node 197) not yet within the signal route, for example, or a candidate or other node that is not yet within the signal route from the source node(s). Also a receiving node can receive the broadcast via other nodes within the signal route.

At operation 3935, a system (such as node 154, e.g.) can transmit state information of an intermediate node (such as node 140, node 154, node 156, or node 190, e.g.) to a next-upstream-node (such as node 140, e.g., in an embodiment in which node 140 is consecutive with node 154). Operation 3937 includes indicating a suitability of a mobile node, such as by transmitting a suitability-indicative scalar to a router. Node 154 can also perform operation 3937 by receiving and using a suitability indicator of a mobile node. Alternatively or additionally, node 154 can perform operation 3939 of evaluating a suitability of the node-speed-change-prediction-dependent signal route by performing an arithmetic calculation.

Many of the above-described variants can be performed by a downstream node 156 as well. Alternatively or additionally, node 156 can be configured to perform one or more of operation 3954 of predicting a node speed change, operation 3955 of indicating at least a speed change in the wireless data, operation 3956 of including at least a speed change prediction in the wireless data, operation 3957 of identifying at least an erroneous portion of the wireless data.

Figure 40:
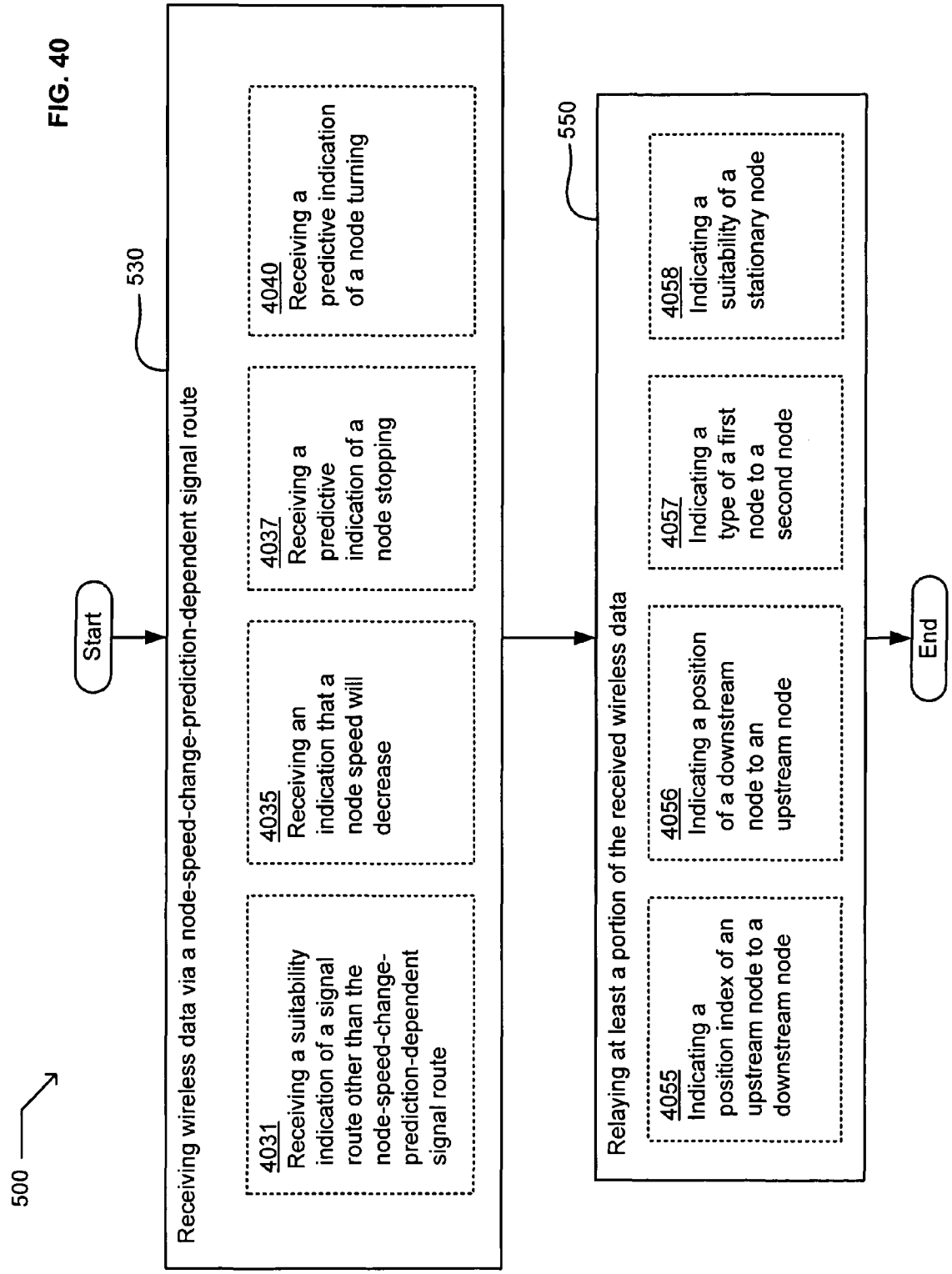
FIG. 40 shows several other optional features each defining variants of the flows of FIG. 5 or their variants.

Referring now to FIG. 40, there are shown several variants of flow 500 of FIG. 5, 33, 34, 35, 36, 37, 38, or 39. Subsystem 700 of FIG. 7 can, in various embodiments, perform any of these flow variants. An embodiment of subsystem 700 that includes none of the optional features of FIG. 7 (i.e., those labeled conventionally by dashed lines) can optionally perform operation 4031, operation 4035, operation 4037, operation 4040, operation 4055, operation 4056, operation 4057, or operation 4058. For example, module 750 can perform operation 4031 of receiving a suitability indication of a signal route (such as route 182 of FIG. 1, e.g.) other than the node-speed-change-prediction-dependent signal route (such as route 180, e.g.). Module 750 can perform operation 4035 of receiving an indication that a node speed will decrease. Module 750 can perform operation 4037 receiving a predictive indication of a node stopping. Alternatively or additionally, module 750 can perform operation 4040 of receiving a predictive indication of a node turning. For an embodiment in which subsystem 700 is a land vehicle, the predictive indication may include a non-linear route or schedule of non-colinear stops, for example.

Also circuitry 770 can perform operation 4055 of indicating a position index of an upstream node to a downstream node (such as by indicating a position index of node 154 to node 190 of FIG. 1, e.g.). Circuitry 770 can perform operation 4056 of indicating a position of a downstream node to an upstream node (such as by indicating a position index of node 154 to node 140, e.g.). Circuitry 770 can perform operation 4057 of indicating a type of a first node to a second node. Alternatively or additionally, circuitry 770 can perform operation 4058 of indicating a suitability of a stationary node.

Figure 41:
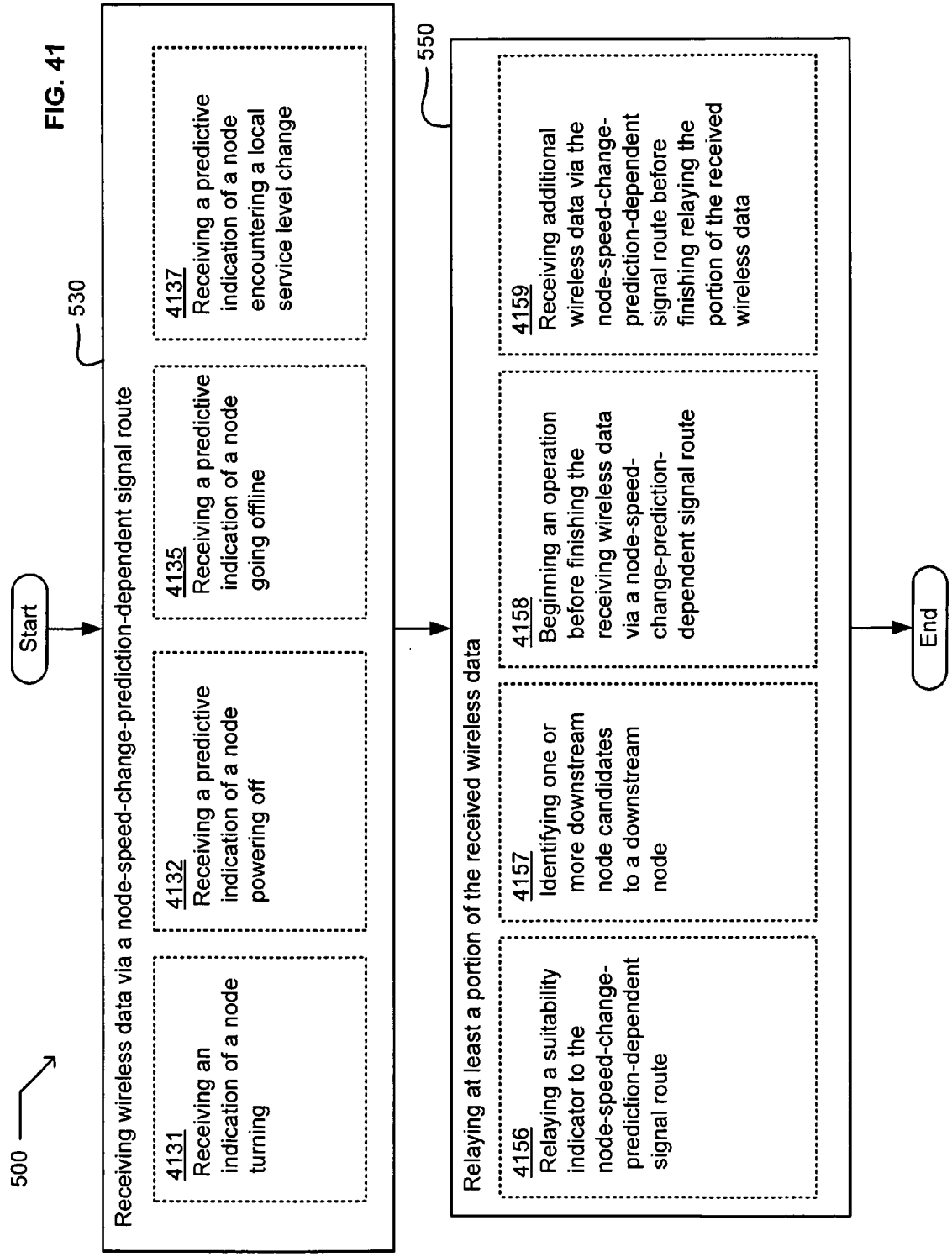
FIG. 41 shows several other optional features each defining variants of the flows of FIG. 5 or their variants.

Referring now to FIG. 41, there are shown several variants of flow 500 of FIG. 5, 33, 34, 35, 36, 37, 38, 39, or 40. Subsystem 700 of FIG. 7 can perform optional operation 4131, operation 4132, operation 4135, operation 4137, operation 4156, operation 4157, operation 4158, or operation 4159. Any of these optional operations 4131-4159 can be performed substantially in concert with any of the other variants of flow 500 described above.

For example, module 750 can perform operation 4131 of receiving an indication of a node turning. Module 750 can perform operation 4132 of receiving a predictive indication of a node powering off. This can be implemented in concert with circuitry 772 for implementing a time-dependent traffic model, for example, to generate or otherwise obtain a prediction that a vehicle will power off imminently. (Such a prediction may arise by detecting a vehicle entering a residential lot at 11 p.m., for example.) Module 750 can likewise perform operation 4135 of receiving a predictive indication of a node going offline. Alternatively or additionally, module 750 can perform operation 4137 of receiving a predictive indication of a node encountering a local service level change. Such an indication may depend on one or more speed limits, for example, especially if expressed as an amount of time.

Also circuitry 770 can perform operation 4156 of relaying a suitability indicator to the node-speed-change-prediction-dependent signal route. Circuitry 770 can perform operation 4157 of identifying one or more downstream node candidates to a downstream node. Circuitry 770 can perform operation 4158 of beginning an operation before finishing the receiving wireless data via a node-speed-change-prediction-dependent signal route. Alternatively or additionally, circuitry 770 can perform operation 4159 of receiving additional wireless data via the node-speed-change-prediction-dependent signal route before finishing relaying the portion of the received wireless data.

Figure 42:
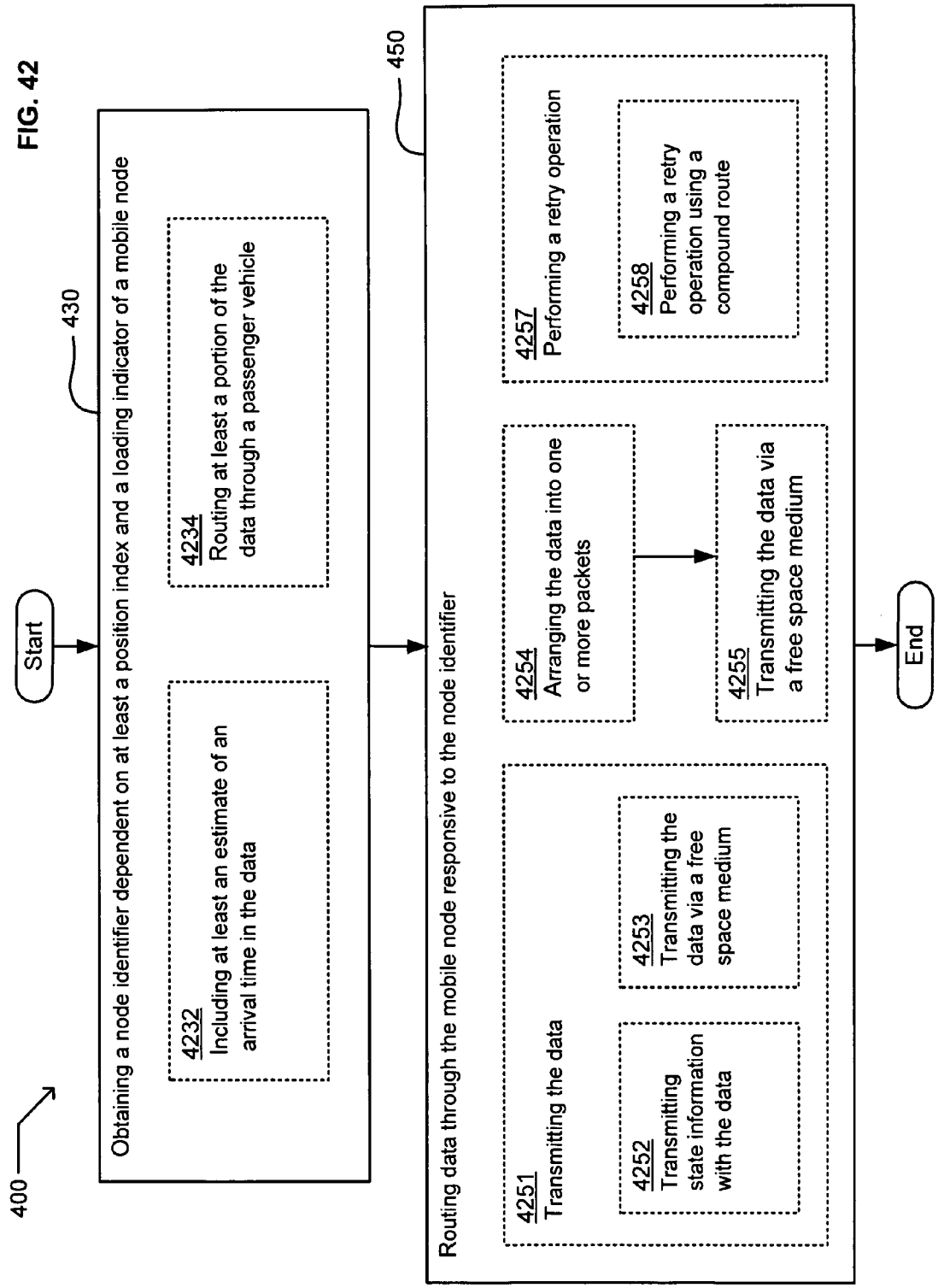
FIG. 42 shows several optional features each defining variants of the flows of FIG. 4.

Referring now to FIG. 42, there are shown several additional variants of flow 400 of FIG. 4 or 41. For example, subsystem 1100 of FIG. 11 can optionally perform operation 4232 of including at least an estimate of an arrival time in the data or operation 4234 of routing at least a portion of the data through a passenger vehicle. The including operation 4232 can optionally be complete before circuitry 1170 begins routing operation 450. Operation 450 can optionally include operation 4251 of transmitting the data, operation 4254 of arranging the data into one or more packets and operation 4255 of transmitting the data via a free space medium, or operation 4257 of performing a retry operation. Operation 4251 can be performed by controller 1171, for example, and can optionally include operation 4252 of transmitting state information with the data or operation 4253 of transmitting the data via a free space medium. Operation 4254 or operation 4257 can optionally be performed by controller 1171, alternatively or additionally, as can operation 4258 of performing a retry operation using a compound route.

Referring now to FIG. 43, there are shown several additional variants of flow 400 of FIG. 4, 41, or 42. For example, module 1150 of FIG. 11 can optionally perform operation 430 of obtaining a node identifier dependent on at least a position index and a loading indicator of a mobile node by performing one or more of operation 4332, 4334, or operation 4336. Processor 1153 of module 1150 can optionally perform one or more of operation 4332 of updating state information in the data, operation 4334 of indicating a position of an intermediate node to a next-upstream-node, or operation 4336 of broadcasting the load indicator, for example.

Module 1170 can optionally perform one or more of the operation 4355 of including at least a data priority indication in the data, the operation 4357 of including at least a data ownership indication in the data, or the operation 4358 of including at least a destination indication in the data. Medium 1172 can optionally perform the operation 4351 of displaying at least an indication of the data at the mobile node. Alternatively or additionally, transmitter 1173 can perform the operation 4354 of streaming at least a portion of the data.

Referring now to FIG. 44, there are shown several additional variants of flow 400 of FIG. 4, 42, or 43. For example, node 140 of FIG. 1 can optionally perform flow 400 such as by substantially any of the above variants of flow 400. Alternatively or additionally, node 140 can perform one or more of operation 4431 of indicating a suitability of a signal route (optionally including operation 4432 of indicating a suitability of an intermediate node), operation 4433 of performing an operation while routing data through the mobile node responsive to the node identifier, or operation 4436 of receiving a latitude and a longitude of the mobile node.

Node 133 of FIG. 1 can likewise perform flow 400 such as by substantially any of the above variants of flow 400. Alternatively or additionally, node 133 can perform one or more of operation 4451 of including at least a destination position index in the data, operation 4452 of encrypting at least a portion of the data, operation 4454 of reserving a route, operation 4455 of displaying at least a portion of the data via an element of a mobile node, or operation 4456 of awaiting an acknowledgment signal before sending a portion of the data. For example, node 133 can receive the acknowledgment signal from node 140.

Node 190 of FIG. 1 can likewise perform flow 400 such as by substantially any of the above variants of flow 400. Alternatively or additionally, node 190 can perform one or more of operation 4458 of converting at least a portion of the data into an optical signal or operation 4457 of multiplexing at least a portion of the data. The former will be expedient if, for example, linkage 195 includes a long haul fiberoptic conduit.

Referring again to FIG. 12, in an alternate embodiment, computer program product 1220 can be configured to include a recordable medium 1246 as the signal-bearing medium 650 of FIG. 6. More particularly the recordable medium 1246 can contain instructions 654 including one or more instructions for performing routing operation 450. The one or more included instructions can optionally comprise: one ore more instructions for performing one or more operations of operations 4251 through 4458. One embodiment, for example, is a computer program product (product 1220, e.g.) comprising a signal-bearing medium (medium 650, e.g.) bearing at least one of: one or more instructions for obtaining a node identifier dependent on at least a position index and a loading indicator of a mobile node; and one or more instructions for streaming at least a portion of the data and for routing data through the mobile node responsive to the node identifier (by operation 450 with operation 4354, e.g.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "can" and "optionally" and other permissive terms are used herein for describing optional features of various embodiments. These terms likewise describe selectable or configurable features generally, unless the context dictates otherwise.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interactable and/or logically interacting components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A communication method comprising:
    (a) receiving wireless data to be routed to a destination node;
    (b) determining an initial node-speed-change-prediction-dependent signal route;
    (c) determining a suitability indicator for at least one intermediate node on the initial, node-speed-change-prediction-dependent signal route, including:
        (i) receiving state information about the at least one intermediate node;
        (ii) using the state information and a look-up table, which has speed as an operand, to generate a location-dependent speed model and a vehicle-dependent speed model for the at least one intermediate node; and
        (iii) generating the suitability indicator for the at least one intermediate node using the location-dependent speed model and a vehicle-dependent speed model;
    (d) determining a suitability indicator for at least one outside node that is outside the initial node-speed-change-prediction-dependent signal route, including:
        (i) receiving a zone identifier from outside the initial node-speed-change-prediction-dependent signal route;
        (ii) generating a prediction of a node characteristic of the at least one outside node based on the zone identifier; and
        (iii) generating the suitability indicator for the at least one outside node based on the prediction of the node characteristic;
    (e) modifying the initial node-speed-change-prediction-dependent signal route to generate a node-speed-change-prediction-dependent signal route, including:

(i) using the suitability indicator for the at least one intermediate node to exclude an intermediate node from the node-speed-change-prediction-dependent signal route; and (ii) using the suitability indicator for the at least one outside node to include an outside node on the node-speed-change-prediction-dependent signal route; and (f) routing the wireless data along the generated node-speed-change-prediction-denendent signal route.

2. The communication method of claim 1, wherein determining a suitability indicator for at least one intermediate node on the node-speed-change-prediction-dependent signal route comprises:
receiving a burden indicator.

3. The communication method of claim 1, wherein determining a suitability indicator for at least one intermediate node on the node-speed-change-prediction-dependent signal route comprises:
requesting information from outside the node-speed-change-prediction-dependent signal route.

4. The communication method of claim 1, wherein determining a suitability indicator for at least one intermediate node on the node-speed-change-prediction-dependent signal route comprises:
predicting a node heading change.

5. The communication method of claim 1, wherein determining a suitability indicator for at least one intermediate node on the node-speed-change-prediction-dependent signal route comprises:
generating a prediction of at least one of an altitude, a zone identifier, a node deceleration, a node acceleration, a node orientation, and a node orientation change.

6. The communication method of claim 1, wherein determining a suitability indicator for at least one intermediate node on the node-speed-change-prediction-dependent signal route comprises:
transmitting an indication of a node class.

7. The communication method of claim 1, wherein routing the wireless data along the generated node-speed-change-prediction-dependent signal route comprises:
including at least a data ownership indication in the wireless data.

8. The communication method of claim 1, wherein routing the wireless data along the generated node-speed-change-prediction-dependent signal route comprises:
including at least an estimate of a destination's position index in the wireless data.

9. The communication method of claim 1, wherein routing the wireless data along the generated node-speed-change-prediction-dependent signal route comprises:
including at least audio data in the wireless data.

10. The communication method of claim 1, wherein routing the wireless data along the generated node-speed-change-prediction-dependent signal route comprises:
displaying at least a portion of the wireless data within a mobile node.

11. The communication method of claim 1, wherein routing the wireless data along the generated node-speed-change-prediction-dependent signal route comprises:
converting at least a portion of the wireless data into optical data.

12. The communication method of claim 1, wherein routing the wireless data along the generated node-speed-change-prediction-dependent signal route comprises:
routing at least a portion of the wireless data through a motor-propelled vehicle.

13. The communication method of claim 1, wherein routing the wireless data along the generated node-speed-change-prediction-dependent signal route comprises:
multiplexing at least a portion of the wireless data.

14. The communication method of claim 1, wherein routing the wireless data along the generated node-speed-change-prediction-dependent signal route comprises:
updating state information in the wireless data.

15. The communication method of claim 1, wherein routing the wireless data along the generated node-speed-change-prediction-dependent signal route comprises:
indicating a position of an intermediate node to a next-upstream-node.

16. The communication method of claim 1, wherein routing the wireless data along the generated node-speed-change-prediction-dependent signal route comprises:
indicating a suitability of an intermediate node.

17. The communication method of claim 1, wherein routing the wireless data along the generated node-speed-change-prediction-dependent signal route comprises:
transmitting to a first node route information identifying a second node.

18. The communication method of claim 1, wherein routing the wireless data along the generated node-speed-change-prediction-dependent signal route comprises:
including at least a data ownership indication, or an estimate of a destination's position index in the wireless data;
indicating an error in at least a portion of the wireless data;
converting at least a portion of the wireless data into optical data;
displaying at least a portion of the wireless data within a mobile node;
routing at least a portion of the wireless data through a motor-propelled vehicle;
multiplexing at least a portion of the wireless data; and
updating state information in the wireless data.

19. A computer program product comprising a non-transitory computer-readable medium storing computer-executable instructions for:

(a) receiving wireless data to be routed to a destination node;

(b) determining an initial node-speed-change-prediction-dependent signal route;

(c) determining a suitability indicator for at least one intermediate node on the initial node-speed-change-prediction-dependent signal route, including:
(i) receiving state information about the at least one intermediate node;
(ii) using the state information and a look-up table, which has speed as an operand, to generate a location-dependent speed model and a vehicle-dependent speed model for the at least one intermediate node; and
(iii) generating the suitability indicator for the at least one intermediate node using the location-dependent speed model and a vehicle-dependent speed model;

(d) determining a suitability indicator for at least one outside node that is outside the initial node-speed-change-prediction-dependent signal route, including:
(i) receiving a zone identifier from outside the initial node-speed-change-prediction-dependent signal route;
(ii) generating a prediction of a node characteristic of the at least one outside node based on the zone identifier; and (iii) generating the suitability indicator for the at least one outside node based on the prediction of the node characteristic;
(e) modifying the initial node-speed-change-prediction-dependent signal route to generate a node-speed-change-prediction-dependent signal route, including
  (i) using the suitability indicator for the at least one intermediate node to exclude an intermediate node from the node-speed-change-prediction-dependent signal route; and
  (ii) using the suitability indicator for the at least one outside node to include an outside node on the node-speed-change-prediction-dependent signal route; and
(f) routing the wireless data along the generated node-speed-change-prediction-dependent signal route.

20. The computer program product of claim 19 further comprising:
computer-executable instructions for receiving a prediction of the zone identifier.

21. The computer program product of claim 19 further comprising:
computer-executable instructions for receiving a prediction of a node component position.

22. The computer program product of claim 19 further comprising:
computer-executable instructions for receiving a burden indicator.

23. The computer program product of claim 19 further comprising:
computer-executable instructions for requesting information from outside the node speed-change-prediction-dependent signal route.

24. The computer program product of claim 19 further comprising:
computer-executable instructions for predicting a node heading change.

25. The computer program product of claim 19 further comprising:
computer-executable instructions for generating a prediction of at least one of an altitude, a node deceleration, a node acceleration, a node orientation, and a node orientation change.

26. The computer program product of claim 19 further comprising:
computer-executable instructions for transmitting an indication of a node class.

27. The computer program product of claim 19 further comprising:
computer-executable instructions for transmitting the suitability indicator.

28. The computer program product of claim 19 further comprising:
computer-executable instructions for receiving at the initial node route information identifying the intermediate node.

29. The computer program product of claim 19 further comprising:
computer-executable instructions for including at least a data ownership indication in the wireless data.

30. The computer program product of claim 19 further comprising:
computer-executable instructions for including at least an estimate of a destination's position index in the wireless data.

31. The computer program product of claim 19 further comprising:
computer-executable instructions for including at least audio data in the wireless data.

32. The computer program product of claim 19 further comprising:
computer-executable instructions for displaying at least a portion of the wireless data within a mobile node.

33. The computer program product of claim 19 further comprising:
computer-executable instructions for routing at least a portion of the wireless data through a motor-propelled vehicle.

34. The computer program product of claim 19 further comprising:
receiving a burden indicator; and
generating a prediction of at least one of an altitude, a node deceleration, a node acceleration, a node orientation, and a node orientation change.

* * * * *